United States Patent
Lee et al.

(10) Patent No.: US 10,991,966 B1
(45) Date of Patent: Apr. 27, 2021

(54) DOPED POLYMER ELECTROLYTES AND METHODS OF MAKING AND USING THE SAME

(71) Applicant: Triad National Security, LLC, Los Alamos, NM (US)

(72) Inventors: Albert Sung Soo Lee, Los Alamos, NM (US); Yu Seung Kim, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 54 days.

(21) Appl. No.: 16/024,395

(22) Filed: Jun. 29, 2018

Related U.S. Application Data

(60) Provisional application No. 62/684,581, filed on Jun. 13, 2018.

(51) Int. Cl.
| | |
|---|---|
| *H01M 8/1051* | (2016.01) |
| *H01M 8/1023* | (2016.01) |
| *H01M 8/1027* | (2016.01) |
| *H01M 8/1032* | (2016.01) |
| *H01M 8/1018* | (2016.01) |

(52) U.S. Cl.
CPC ....... *H01M 8/1051* (2013.01); *H01M 8/1023* (2013.01); *H01M 8/1027* (2013.01); *H01M 8/1032* (2013.01); *H01M 2008/1095* (2013.01); *H01M 2300/0082* (2013.01); *H01M 2300/0091* (2013.01)

(58) Field of Classification Search
None
See application file for complete search history.

(56) References Cited

U.S. PATENT DOCUMENTS

| | | |
|---|---|---|
| 5,525,436 A | 6/1996 | Savinell et al. |
| 6,468,684 B1 | 10/2002 | Chisholm et al. |
| 6,946,211 B1 | 9/2005 | Bjerrum et al. |
| 7,108,934 B2 | 9/2006 | Narayanan et al. |
| 7,618,732 B2 | 11/2009 | Nakato et al. |
| 7,662,194 B2 | 2/2010 | Kim et al. |
| 7,858,260 B2 | 12/2010 | Lee et al. |
| 7,883,791 B2 | 2/2011 | Nakato et al. |
| 7,888,397 B1 | 2/2011 | Hibbs et al. |
| 8,809,483 B1 | 8/2014 | Hibbs |
| 2005/0095486 A1 | 5/2005 | Hamamoto et al. |
| 2007/0065699 A1* | 3/2007 | Larson ................ H01M 8/1051 429/494 |
| 2012/0225371 A1 | 9/2012 | Kim et al. |
| 2015/0307654 A1 | 10/2015 | Hibbs |
| 2017/0190831 A1 | 7/2017 | Kim et al. |

(Continued)

FOREIGN PATENT DOCUMENTS

JP      2006260993 A  *  9/2006

OTHER PUBLICATIONS

JP-2006260993-A machine English translation (Year: 2006).*

(Continued)

*Primary Examiner* — Scott J. Chmielecki
(74) *Attorney, Agent, or Firm* — Klarquist Sparkman, LLP

(57) ABSTRACT

Disclosed herein are electrolytes comprising a cationic-functionalized polymer and a polyacid dopant. Also disclosed herein are methods of making and using the disclosed doped polymer electrolytes.

18 Claims, 8 Drawing Sheets

(56) References Cited

U.S. PATENT DOCUMENTS

2017/0298179 A1* 10/2017 Jung .................. C08J 5/22

OTHER PUBLICATIONS

Atanasov et al (Phosphonic acid functionalized poly(pentafluorostyrene) as polyelectrolyte membrane for fuel cell application; Journal of Power Sources, vol. 343, Mar. 1, 2017, pp. 364-372) (Year: 2017).*
Choe et al (Alkaline Stability of Benzyl Trimethyl Ammonium Functionalized Polyaromatics: A Computational and Experimental Study, Chem. Mater. 2014, 26, 5675-5682) (Year: 2014).*
Montoneri et al (A new polyfunctional acid material for solid state proton conductivity in dry environment: Nafion doped with DFMDPA, Solid State Ionics, vol. 181, Issues 13-14, May 21, 2010, pp. 578-585) (Year: 2010).*
Bozkurt et al., "Proton-conducting Polymer Electrolytes based on Phosphoric Acid," *Solid State Ionics* 125(1-4):225-233 (1999).
Chen et al., "Chemically stable hybrid polymer electrolyte membranes prepared by radiation grafting, sulfonation, and silane-crosslinking techniques," *Journal of Polymer Science Part A Polymer Chemistry* 46(16):5559-5567 (2008).
Choe et al., "Alkaline Stability of Benzyl Trimethyl Ammonium Functionalized Polyaromatics: A Computational and Experimental Study," *Chemistry of Materials*, 26(19): 5675-5682, Sep. 17, 2014.
Fu et al., "SPEEK/epoxy resin composite membranes in situ polymerization for direct methanol fuel cell usages," *Journal of Power Sources* 165(2):708-716, Mar. 20, 2007.
Fujimoto et al., "Backbone stability of quaternized polyaromatics of alkaline membrane fuel cells," *Journal of Membrane Science*, vol. 423-424, pp. 438-449, Sep. 1, 2012.
Gupta et al., "Comparison of conversion and deposit formation of ethanol and butane under SOFC conditions," *Journal of Power Sources* 158(1):497-503, available online Nov. 14, 2005.
Hibbs et al., "Synthesis and Characterization of Poly(phenyene)-Based Anion Exchange Membranes for Alkaline Fuel Cells," *Macromolecules*, vol. 42, pp. 8316-8321, Aug. 24, 2009.
Huang et al., "Effects of dopant on the electrochemical performance of Li4Ti5O12 as electrode material for lithium ion batteries," *Journal of Power Sources* 165(1):408-412, available online Dec. 16, 2006.
Janarthanan et al., "A Direct Methanol Alkaline Fuel Cell Based on Poly(phenylene) Anion Exchange Membranes," *Journal of the Electrochemical Society*, 161(9): F944-F950, Jun. 24, 2014.
Jeong et al., "Cross-Linking Density Effect of Fluorinated Aromatic Polyethers on Transport Properties," *Macromolecules* 42(5):1652-1658, Feb. 4, 2009.
Jin et al., "Proton conduction in metal pyrophosphates (MP2O7) at intermediate temperatures," *Journal of Materials Chemistry* 20(30):6214-6217, Feb. 16, 2010.
Kim et al., "Processing induced morphological development in hydrated sulfonated poly(arylene ether sulfone) copolymer membranes," *Polymer* 44(19):5729-5736, Sep. 2003.
Kundu et al., "Mechanical Properties of Nafion™ Electrolyte Membranes under Hydrated Conditions," *Polymer* 46(25):11707-11715, 2005.
Lee et al., "An operationally flexible fuel cell based on quaternary ammonium-biphosphate ion pairs," *Nature Energy*, vol. 1, 7 pages, Aug. 22, 2016.
Lee et al., "Robust Hydroxide Ion Conducting Poly(biphenyl alkylene)s for Alkaline Fuel Cell Membranes," *ACS Macro Letters* 4(8):814-818, Jul. 16, 2015.
Liang et al., "FT-IR study of the microstructure of Nafion® membrane," *Journal of Membrane Science* 233(1-2):39-44, Apr. 15, 2004.
Schmidt et al., "Properties of High Temperature PEFC Celtex®-P1000 MEAs in Start/Stop Operation Mode," *Journal of Power Sources* 176(2):428-434, Feb. 1, 2008.
Switzer et al., "Novel FOH-free anion-exchange membrane fuel cell: Performance comparison of alternative anion-exchange ionomers in catalyst ink," *Electrochimica Acta*, vol. 55, pp. 3404-3408, Jan. 11, 2010.
Xiao et al., "High-Temperature Polybenzimidazole Fuel Cell Membranes via a Sol-Gel Process," *Chemistry of Materials* 17(21):5328-5333, published online Sep. 21, 2005.
Zhang et al., "A new and facile approach for the preparation of cross-linked sulfonated poly(sulfide sulfone) membranes for fuel cell application," *Journal of Power Sources* 170(1):42-45, Jun. 30, 2007.

* cited by examiner

DOPED POLYMER ELECTROLYTES AND METHODS OF MAKING AND USING THE SAME

CROSS-REFERENCE TO RELATED APPLICATION

This application claims the benefit of the earlier filing date of U.S. Provisional Patent Application No. 62/684,581, filed on Jun. 13, 2018, the entirety of which is incorporated herein by reference.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

The present disclosure concerns doped polymer electrolytes for fuel cells and methods of making and using the same.

BACKGROUND

Current fuel cells that use commercially available sulfonated polymers or phosphoric acid-doped polymers (e.g., automotive fuel cells) cannot operate in the temperature range of 80° C. to 150° C. without humidification. Industrial standard automotive fuel cells employing perfluorosulfonic acid, Nafion®, operate at ~80° C. and require humidified inlet streams and large radiators to dissipate waste heat. Other fuel cells used in the art that comprise polymer electrolytes can operate at 140° C. to 180° C., but they are unsuitable for automotive applications. In particular, such polymers comprise a phosphoric acid dopant, which is leached out under water condensation from frequent cold start-ups and oxygen reduction reaction at the fuel cell cathode at lower operating temperatures. New polymer electrolytes that resist leaching and that can operate at high temperatures are needed in the art.

SUMMARY

Disclosed herein are embodiments of a polymer electrolyte, comprising a cationic-functionalized polymer; and a polyacid dopant. In some embodiments, the cationic-functionalized polymer comprises a polymer and least one cationic functional group, wherein the polymer is selected from polyaryl polymers, polyarylamides, polyimides, polystyrenes, polysulfones, polyethers, polyether sulfones, polyketones, polyetherketones, polyarylethers, polyolefins, and polynitriles, and wherein the at least one cationic functional group (CFG) is selected from ammonium —NH$_3^+$,

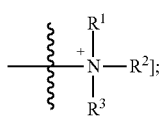

imidazolium

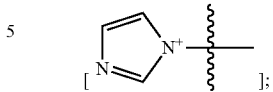

guanidinium

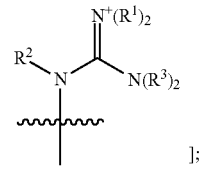

phosphazenium

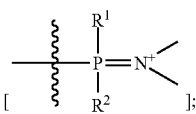

sulfonium [sulfonium

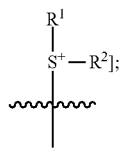

oxonium

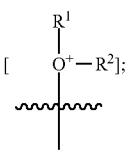

piperidinium

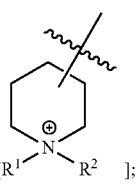

pyridinium

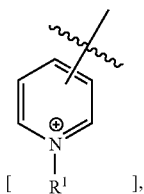

quinolinium

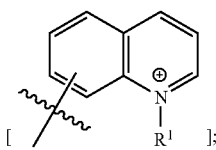

and phosphonium

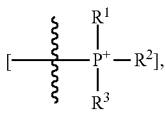

wherein $R^1$, $R^2$, and $R^3$ are independently hydrogen, $C_{1-10}$ alkyl, or benzyl. In some particular embodiments, the cationic-functionalized polymer has a structure satisfying Formula I

[Polymer repeating unit]$_m$-[Optional Linker]$_s$-[Cationic Functional Group (CFG)]$_n$    Formula I where m is an integer ranging from two or more; s is an integer ranging from 0 up to m; and n is an integer ranging from 1 to at least s.

In some additional embodiments, the cationic-functionalized polymer has a structure satisfying Formula II or Formula III Formula II

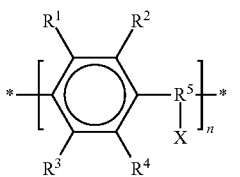

Formula III

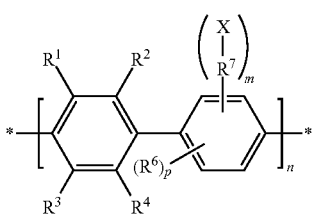

wherein each of $R^1$, $R^2$, $R^3$, $R^4$, and $R^6$ independently is selected from hydrogen, fluoro, an aliphatic group, an aryl group, or a combination thereof; $R^7$ is selected from aliphatic, aryl, carbonyl, sulfonyl, or a combination thereof; each X independently is selected from ammonium, sulfo-nium, phosphonium, guanidinium, oxonium, imidazolium, quinolinium, piperidinium, pyridinium, phosphazinium, or combinations thereof; n ranges from 2 to 1000, m ranges from 1 to 4; and p ranges from 0 to 3. Other cationic-functionalized polymers are disclosed herein.

In some embodiments, the cationic-functionalized polymer is crosslinked. The cationic-functionalized polymer can be doped with a polyacid, wherein the polyacid dopant has a structure satisfying a formula R—[PO(OH)$_2$]$_n$ or R—[S(O)$_2$OH]$_n$ wherein R is aliphatic, aromatic, or heteroaliphatic and n is an integer selected from 2 to 4. In some embodiments, the polyacid is a diacid having structure satisfying a formula

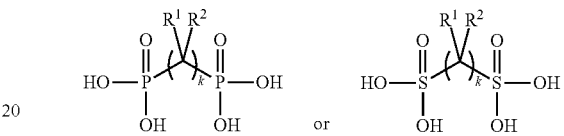

wherein $R^1$ and $R^2$ independently can be H, F, OH, aliphatic, heteroaliphatic, or aromatic; k can be an integer selected from 1 to 20. In some embodiments, the polyacid dopant is present in an amount such that a mole of acid per cationic functional group is 1 to 15.

Also disclosed herein are embodiments of a fuel cell comprising an anode, a cathode, and a polymer electrolyte as disclosed herein. In some embodiments, the fuel cell can further comprise a phosphonated ionomer, such as a phosphonated poly(pentafluorostyrene) polymer.

DSA") exhibit superior water tolerance and proton conductivity as compared with a PBI/PA membrane, and a polymer membrane doped with phosphate ("QAP/PA").

Figure 6:
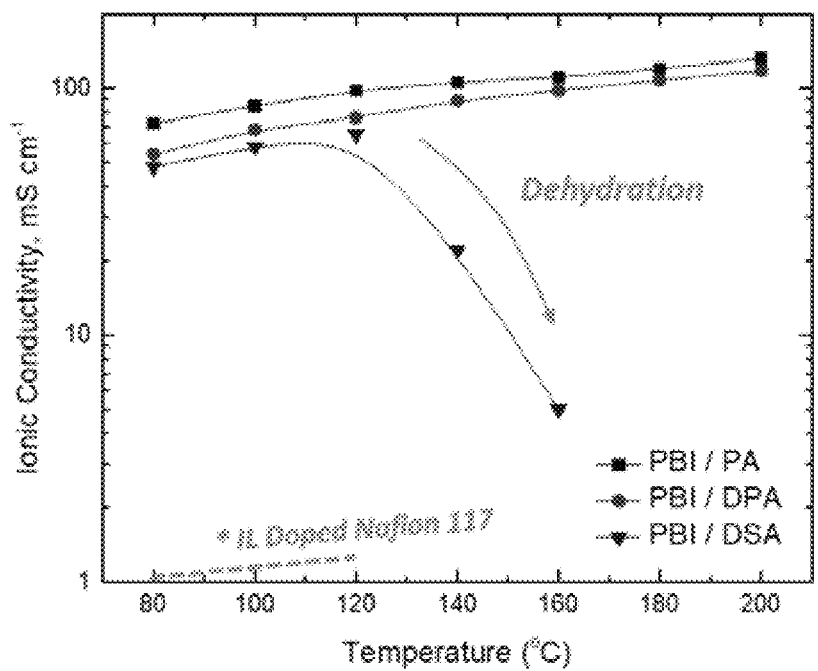

FIG. 6 is a graph of ionic conductivity (mS/cm) as a function of temperature (° C.), which illustrates that polymer electrolytes doped with polyacid embodiments described herein exhibit consistent ionic conductivities even at temperatures above 180° C.

Figure 7:
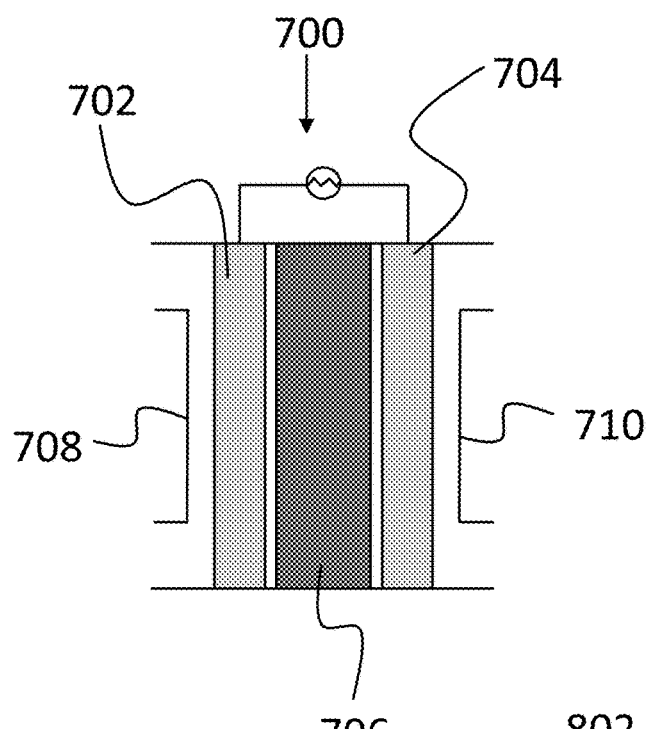

FIG. 7 is a cross-sectional view of a representative polymer electrolyte fuel cell comprising a doped polymer electrolyte membrane as described herein.

Figure 8:
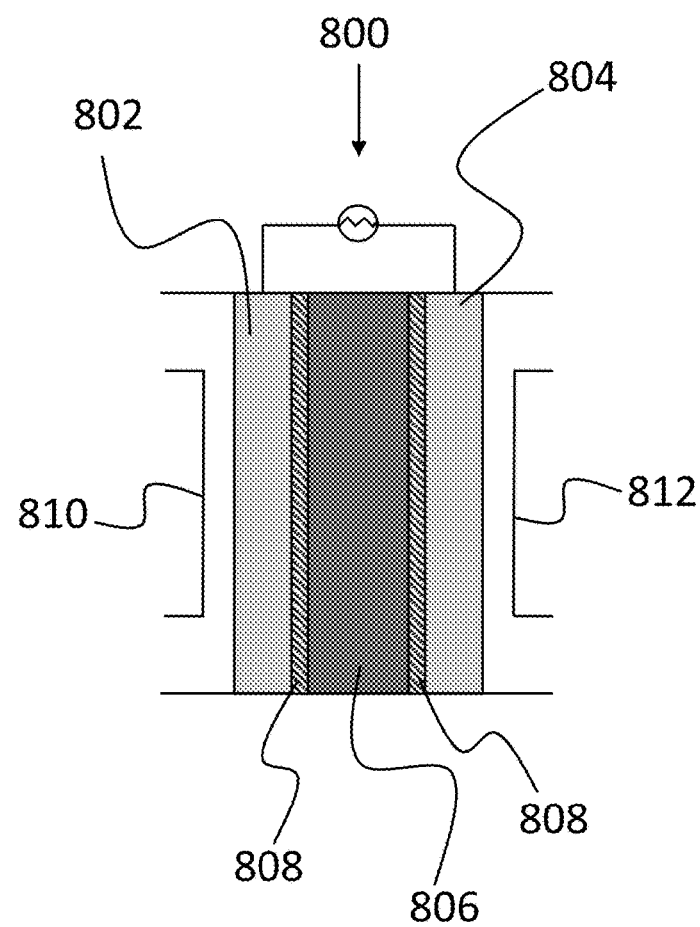

FIG. 8 is a cross-sectional view of a representative polymer electrolyte fuel cell comprising a doped polymer electrolyte membrane and a phosphonated, polyfluorinated ionomer component as described herein.

Figure 9:
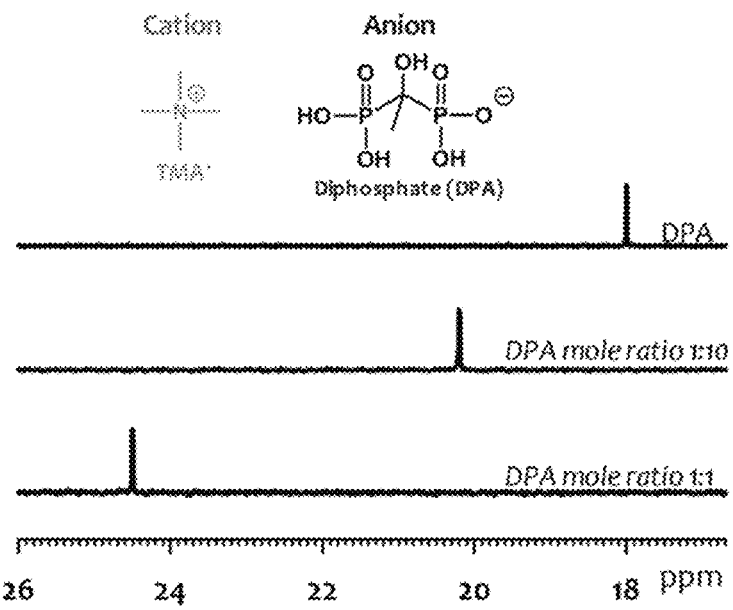

FIG. 9 is a combined $^{31}$P NMR spectrum comparing chemical shifts of diphosphate alone (top spectrum), diphosphate coordinated with tetramethyl ammonium ("TMA") at a 1:10 ratio (middle spectrum); and diphosphate coordinated with TMA at a 1:1 ratio (bottom spectrum).

Figure 10:
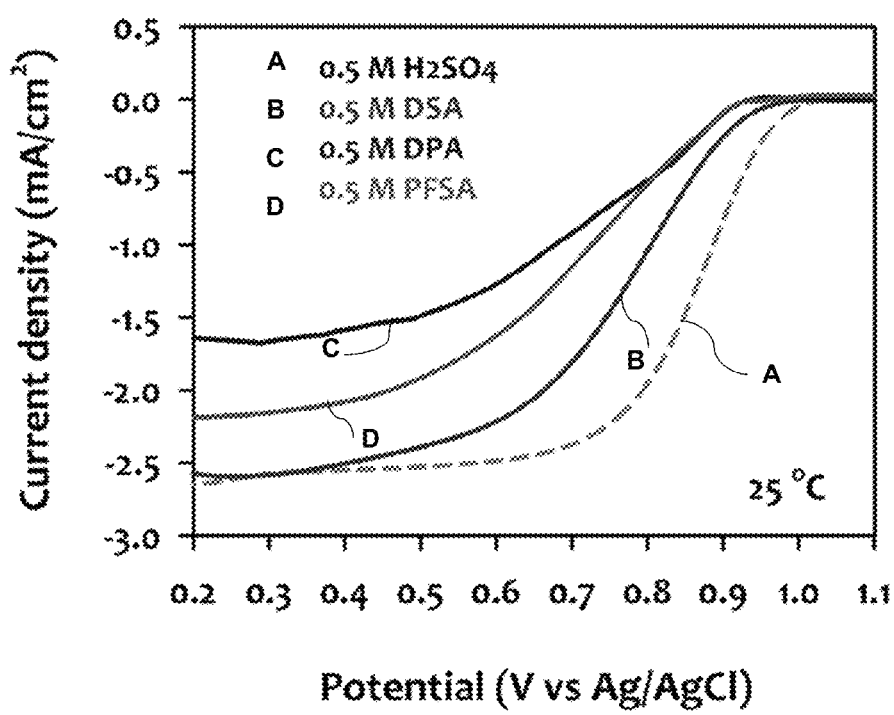

FIG. 10 is a graph of current density (mA/cm$^2$) as a function of potential (V vs Ag/AgCl), which shows oxygen reduction reaction (ORR) voltammograms of Pt/C in 0.5 M liquid electrolytes (PFSA: perfluorobutanesulfonic acid), as measured with a rotating disk electrode (RDE) at 900 rpm.

Figure 11:
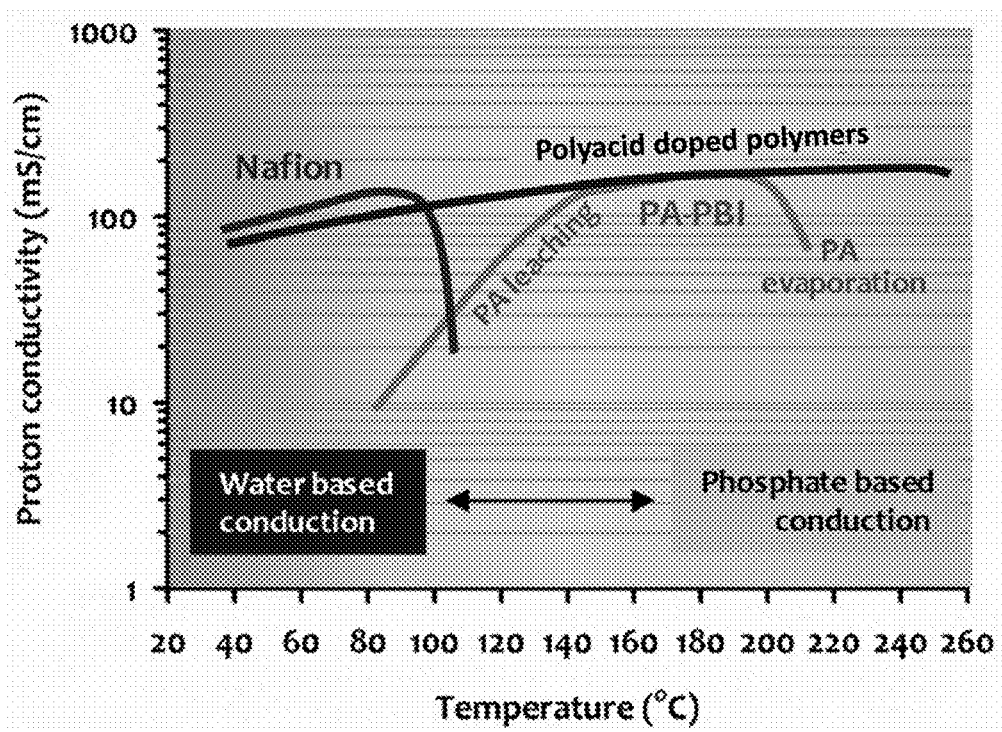

FIG. 11 is a graph of proton conductivity (mS/cm) as a function of temperature (° C.), which provides an illustration of the different proton conductivity behavior of different polymer electrolytes, including Nafion®, PBI/PA (referred to as "PA-PBI" in the figure), and embodiments of the doped polymer electrolyte disclosed herein.

Figure 12:
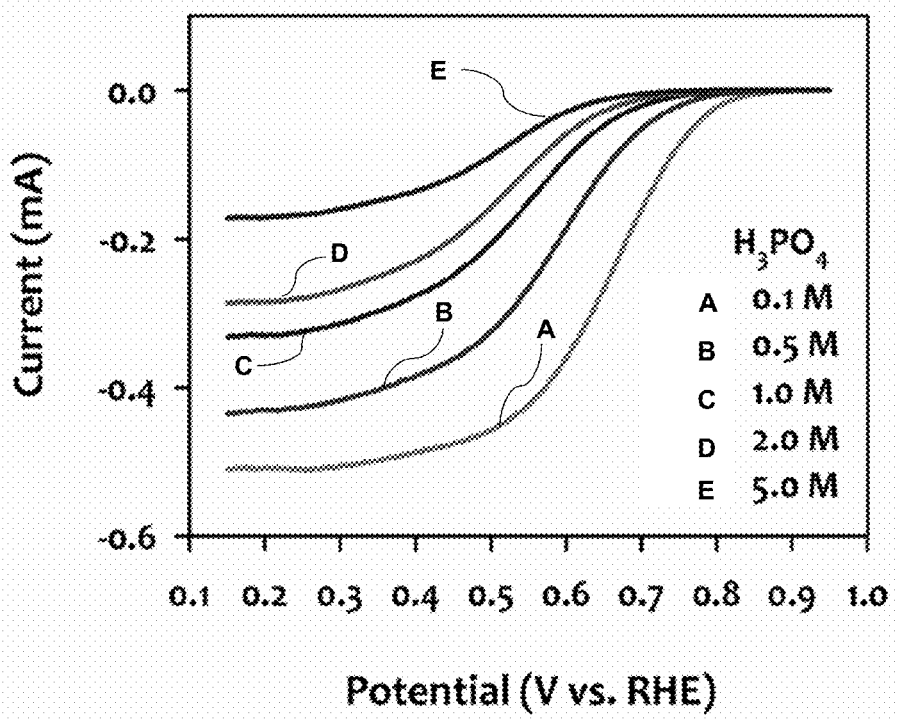

FIG. 12 is a graph of current (mA) as a function of potential (V vs. RHE), which illustrates ORR voltammograms of platinum (Pt) in H$_3$PO$_4$ solution, measured with an RDE at 900 rpm, 20 mV/s.

Figure 13:
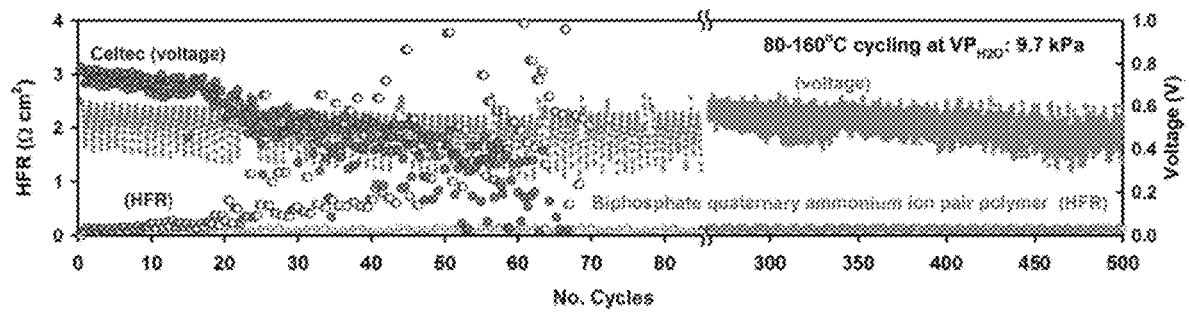

FIG. 13 is a graph of high frequency resistance (HFR) and cell voltage change of membrane electrode assemblies comprising a biphosphate-quaternary ammonium ion-pair-coordinated polymer electrode membrane (light grey) and PA-doped PBI Celtec® (dark grey).

Figure 14:
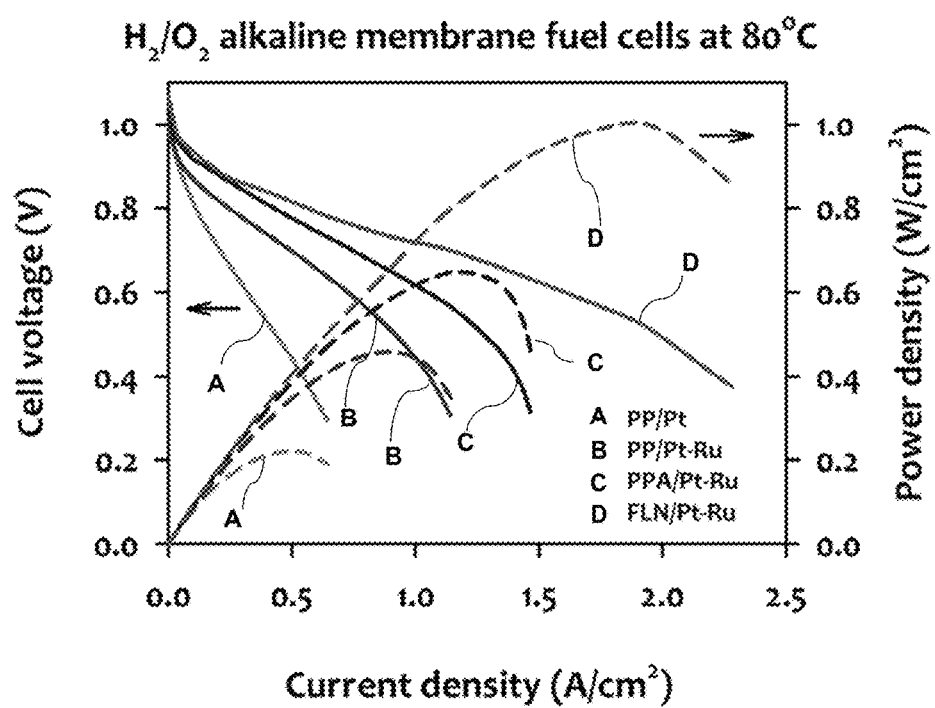

FIG. 14 is a graph of cell voltage (V) and power density (W/cm$^2$) as a function of current density (A/cm$^2$), which illustrates H$_2$/O$_2$ performance improvement of alkaline membrane fuel cells by mitigation of phenyl group adsorption on hydrogen oxidation reaction (HOR) catalysts using a polyphenylene ionomer [PP/Pt (0.6 mg$_{Pt}$/cm$^2$) and PP/Pt—Ru (0.5 mg$_{Pt}$/cm$^2$)], a polyphenylalkylene ionomer [PPA/Pt—Ru (0.5 mg$_{Pt}$/cm$^2$)], and a polyfluorene ionomer [FLN/Pt—Ru (0.5 mg$_{Pt}$/cm$^2$)] as the anode.

Figure 15:
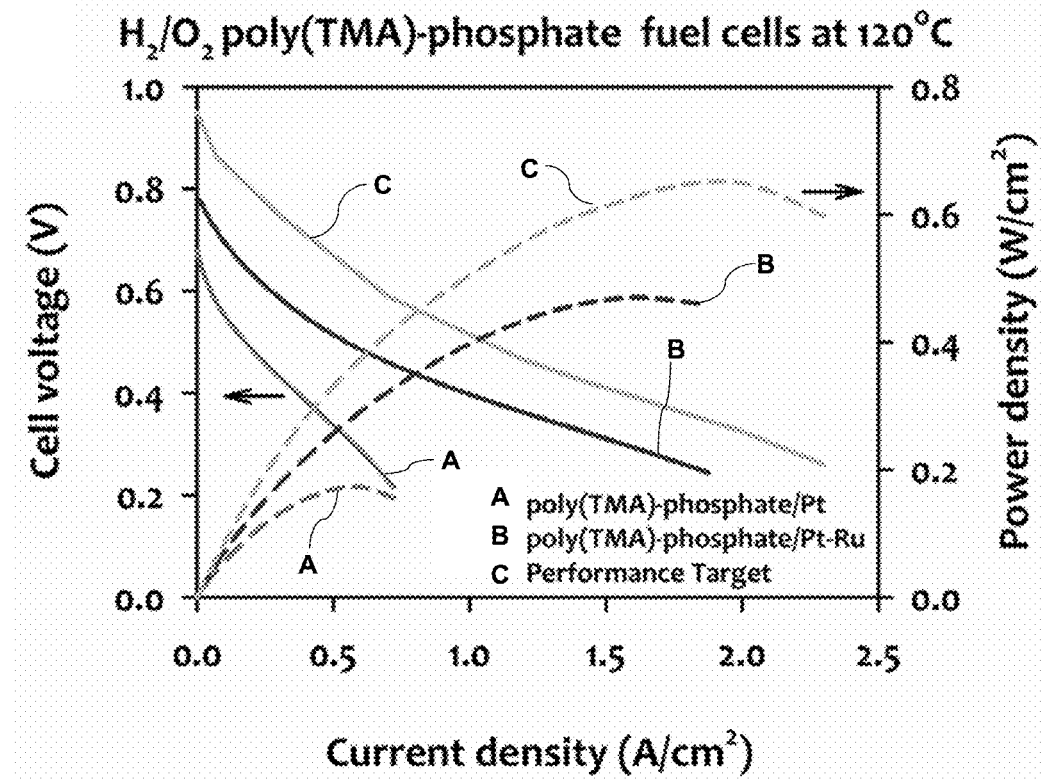

FIG. 15 is a graph of cell voltage (V) and power density (W/cm$^2$) as a function of current density (A/cm$^2$), which illustrates H$_2$/O$_2$ performance improvement of poly(TMA)-phosphate coordinated high temperature polymer electrode fuel cells (HT-PEMFCs) by mitigation of phenyl group adsorption on HOR catalysts using poly(TMA)/Pt (0.6 mg$_{Pt}$/cm$^2$) and poly(TMA)/Pt—Ru (0.2 mg$_{Pt}$/cm$^2$), wherein line C represents the expected performance of a polyacid-doped polymer electrolyte embodiment.

Figure 16:
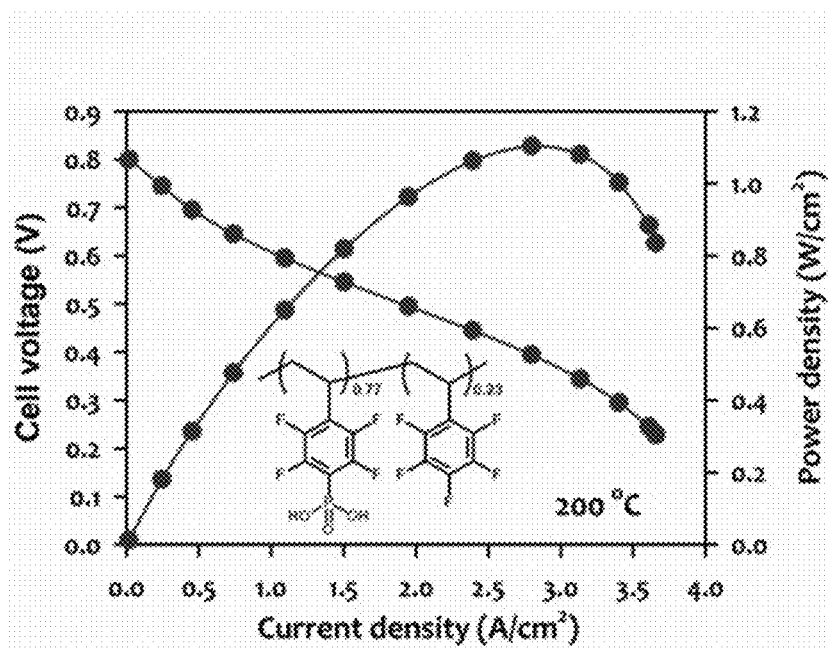

FIG. 16 is a graph of cell voltage (V) and power density (W/cm$^2$) as a function of current density (A/cm$^2$), which shows H$_2$/O$_2$ fuel cell performance of a membrane electrode assembly using a poly(TMA)/phosphate ion-pair coordinated membrane and a phosphonated ionomer measured at 200° C., wherein the anode was Pt—Ru/C 0.5 mg$_{Pt}$/cm$^2$, the cathode was Pt/C 0.6 mg$_{Pt}$/cm$^2$ and a backpressure of 147 kPa$_{abs}$ was used.

DETAILED DESCRIPTION

I. Explanation of Terms

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms are provided.

Aliphatic: A hydrocarbon group having at least one carbon atom to 50 carbon atoms (C$_{1-50}$), such as one to 25 carbon atoms (C$_{1-25}$), or one to ten carbon atoms (C$_{1-10}$), and which includes alkanes (or alkyl), alkenes (or alkenyl), alkynes (or alkynyl), including cyclic versions thereof, and further including straight- and branched-chain arrangements, and all stereo and position isomers as well.

Alkenyl: An unsaturated monovalent hydrocarbon having at least two carbon atom to 50 carbon atoms (C$_{2-50}$), such as two to 25 carbon atoms (C$_{2-25}$), or two to ten carbon atoms (C$_{2-10}$), and at least one carbon-carbon double bond, wherein the unsaturated monovalent hydrocarbon can be derived from removing one hydrogen atom from one carbon atom of a parent alkene. An alkenyl group can be branched, straight-chain, cyclic (e.g., cycloalkenyl), cis, or trans (e.g., E or Z).

Alkyl: A saturated monovalent hydrocarbon having at least one carbon atom to 50 carbon atoms (C$_{1-50}$), such as one to 25 carbon atoms (C$_{1-25}$), or one to ten carbon atoms (C$_{1-10}$), wherein the saturated monovalent hydrocarbon can be derived from removing one hydrogen atom from one carbon atom of a parent compound (e.g., alkane). An alkyl group can be branched, straight-chain, or cyclic (e.g., cycloalkyl).

Aliphatic-aryl: R$^a$-aliphatic-aryl-, wherein R$^a$ is an atom of a phenyl ring making up the polymeric backbone of a polymer described herein to which the aliphatic group is bound. In some embodiments, the aliphatic group can be an alkyl group, and alkenyl group, or an alkynyl group. In some embodiments, the aryl group can further be bound to a cationic functional group (e.g., $R^a$-aliphatic-aryl-X, wherein X is the cationic functional group), or it simply can be a terminal aryl group (e.g., $R^a$-aliphatic-aryl-H).

Alkynyl: An unsaturated monovalent hydrocarbon having at least two carbon atom to 50 carbon atoms ($C_{2-50}$), such as two to 25 carbon atoms ($C_{2-25}$), or two to ten carbon atoms ($C_{2-10}$), and at least one carbon-carbon triple bond, wherein the unsaturated monovalent hydrocarbon can be derived from removing one hydrogen atom from one carbon atom of a parent alkyne. An alkynyl group can be branched, straight-chain, or cyclic (e.g., cycloalkynyl).

Ammonium: —$NH_3^+$ or a functional group having a formula

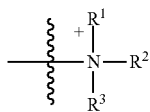

where $R^1$, $R^2$, and $R^3$ independently are selected from hydrogen, aliphatic, aryl, and heteroaryl, and more typically are hydrogen, alkyl, such as $C_{1-10}$ alkyl, or combinations thereof.

Anionic: An anionic group is any group that has a negative charge, such as sulfate, phosphate, carboxylate, etc.

Anode: An electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. For proton exchange membrane fuel cells, protons move from the anode to the cathode.

Aromatic: A cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Hückel rule (4n+2). The point of attachment to the parent structure typically is through an aromatic portion of the condensed ring system. For example,

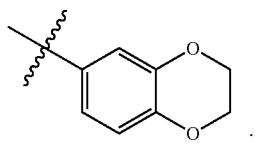 [SMILES: *c1ccc2c(c1)OCCO2]

However, in certain examples, context or express disclosure may indicate that the point of attachment is through a non-aromatic portion of the condensed ring system. For example,

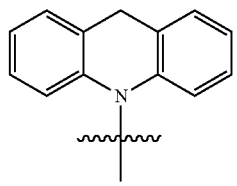

An aromatic group or moiety may comprise only carbon atoms in the ring, such as in an aryl group or moiety, or it may comprise one or more ring carbon atoms and one or more ring heteroatoms comprising a lone pair of electrons (e.g. S, O, N, P, or Si), such as in a heteroaryl group or moiety.

Aryl: An aromatic carbocyclic group comprising at least five carbon atoms to 15 carbon atoms ($C_5$-$C_{15}$), such as five to ten carbon atoms ($C_5$-$C_{10}$), having a single ring or multiple condensed rings, which condensed rings can or may not be aromatic provided that the point of attachment to a remaining position of the compounds disclosed herein is through an atom of the aromatic carbocyclic group. Aryl groups may be substituted with one or more groups other than hydrogen, such as aliphatic, heteroaliphatic, aromatic, other functional groups, or any combination thereof.

Aryl-aliphatic: $R^a$-aryl-aliphatic-, wherein $R^a$ is an atom of a phenyl ring making up the polymeric backbone of a polymer described herein to which the aryl group is bound. In some embodiments, the aliphatic group can further be bound to a cationic functional group (e.g., $R^a$-aryl-aliphatic-X, wherein X is the cationic functional group), or it simply can be a terminal aryl group (e.g., $R^a$-aryl-aliphatic-H). In some embodiments, the aliphatic group can be an alkyl group, and alkenyl group, or an alkynyl group.

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by protons in a proton membrane fuel cell.

Cationic Functional Group: An organic or inorganic molecule with a positive charge. Solely by way of example, cationic groups can include, but are not limited to, ammonium, sulfonium, phosphonium, guanidinium, oxonium, imidazolium, phosphazinium, quinolinium, piperidinium, pyridinium, and combinations thereof.

Carbonyl: —C(O)—.

Conjugating, joining, bonding, tethering or linking: Coupling a first unit to a second unit. This includes, but is not limited to, covalently bonding one molecule to another molecule, non-covalently bonding one molecule to another (e.g. electrostatically bonding), non-covalently bonding one molecule to another molecule by hydrogen bonding, non-covalently bonding one molecule to another molecule by van der Waals forces, and any and all combinations of such couplings.

Counterion(s): The ion, or ions, accompanying another ionic species to provide electric neutrality. For example, in NaOH, $Na^+$ is the counterion to $OH^-$.

Electrocatalyst: A metallic or non-metallic compound that has an electrochemical activity under alkaline and/or acidic conditions.

Electrolyte: A substance containing free ions that behaves as an electrically conductive medium. Electrolytes generally comprise ions in a solution, but molten electrolytes and solid electrolytes also are known. An electrolyte in contact with the anode, or negative half-cell, may be referred to as an anolyte, and an electrolyte in contact with the cathode, or positive half-cell, may be referred to as a catholyte. For fuel cells, the anolyte and catholyte typically comprise the same materials.

Functional group: A specific group of atoms within a molecule that is responsible for the characteristic chemical reactions of the molecule. Exemplary functional groups include, without limitation, alkyl, alkenyl, alkynyl, aryl, halo (fluoro, chloro, bromo, iodo), epoxide, hydroxyl, carbonyl (ketone), aldehyde, carbonate ester, carboxylate, carboxyl, ether, ester, peroxy, hydroperoxy, carboxamide, amino (primary, secondary, tertiary), ammonium, imide, azide, cyanate, isocyanate, thiocyanate, nitrate, nitrite, nitrile, nitroalkyl, nitroso, pyridyl, phosphate, sulfonyl, sulfide, thiol (sulfhydryl), disulfide.

Ion Exchange Capacity: The measure of the ability of an insoluble material to undergo displacement of ions previously attached to the insoluble material, or electrostatically incorporated into its structure by oppositely charged ions present in a surrounding solution. In some embodiments, this term refers to the number of exchangeable ions per dry weight of membrane and is generally stated herein as mmol/gram.

Membrane: A membrane is a thin, pliable material, sometimes formed as a sheet, of synthetic or natural material. An ion exchange membrane has anionic or cationic groups that permit ions to pass through the membrane. For fuel cells, the current density and operational lifetime of the fuel cell are factors in selecting the ion conductivity for the fuel cell. Some membranes are selective membranes, through which certain ions or molecules with particular characteristics pass more readily than other ions or molecules. In some embodiments, membranes disclosed herein can have thicknesses ranging between 20 µm to 300 µm.

Polymer Electrolyte: An electrolyte material comprising a polymer made of monomer units in which a portion of the constitutional monomer units of the polymer comprises ionic or ionizable groups, or both.

Sulfonyl: —$SO_2$—.

A person of ordinary skill in the art would recognize that the definitions provided above are not intended to include impermissible substitution patterns (e.g., methyl substituted with 5 different groups, and the like). Such impermissible substitution patterns are easily recognized by a person of ordinary skill in the art. Any functional group disclosed herein and/or defined above can be substituted with one or more substituents or unsubstituted, unless otherwise indicated herein. In some embodiments, the functional group can be substituted with one or more of the cationic groups disclosed herein.

II. Introduction

The operating temperature window of a fuel cell (e.g., a PEM fuel cell) is dictated by the interactions between the acid (e.g., tethered sulfonic acid or free phosphoric acid) and the base moieties (e.g., free water or a tethered quaternary ammonium group) in the PEM. For example, the hydrogen bonding interactions between the sulfonic acid group and water molecules in Nafion®, which is the typical polymer electrolyte used in conventional fuel cells, is only 15.4 kcal/mol. This level of interaction does not provide enough stability above the boiling temperature of water, which leads to membrane dehydration, particularly at elevated operating temperatures. Some HT-PEMFCs that use PA-doped polymers (e.g., PA-doped PBI) could address the balance of plant issues as the fuel cells can operate effectively up to 180° C. under anhydrous conditions; however, the such HT-PEMFCs are unusable for automotive applications because the performance of the fuel cells degrade when the cell is exposed to water at temperatures below 140° C. due to loss of the weakly bound phosphoric acid of the polymer. Fuel cell operation at the lower temperature is required for automotive applications in which frequent cold start-ups and water condensation occur during normal vehicle driving cycles.

For PA-doped PBI, a proton from the phosphoric acid is located between the phosphoric acid and benzimidazole, but due to the weak basicity of benzimidazole, the proton remains close to the biphosphate anion, producing a relatively weak benzimidazole . . . $H.H_2PO_4$ interaction. The intermolecular interaction energy, $E_{int}$, between benzimidazole and phosphoric acid is calculated as 17.4 kcal/mol, which is only 4.8 kcal/mol greater than that between phosphoric acid and one water molecule, ca. 12.6 kcal/mol. Additional phosphoric acid molecules have even weaker interactions within the matrix. Due to the relatively weak interaction, benzimidazole tends to lose phosphoric acid easily with water absorption. Consequently, PA-doped PBI requires a high concentration of base moieties, approximately >6 mmol/gram, and a high acid content, such as approximately 90 wt % to impart sufficient anhydrous conductivity.

The present disclosure concerns polymer electrolytes for fuel cells comprising thermo-oxidatively stable polyacid-doped cationic functionalized polymers that are operational at both high temperatures and low temperatures without humidification. These doped electrolytes address the problems discussed above. The ion-pair coordinated system of utilizing acid dopants with polymers functionalized with cationic groups imbues strong ionic interactions between the polymer and the dopant to prevent dopant leaching. This non-leaching behavior, as well the superior ionic conductivities that are attained, provides polymer electrolytes suitable for anhydrous fuel cell operation at requisite temperature ranges for fuel cell operation (e.g., 80-150° C. and even 200° C. or higher). As such, the disclosed electrolytes can be used in fuel cells that are free of external humidifiers and/or that are used with smaller radiators.

III. Polymers, Dopants, and Polymer Electrolytes

Disclosed herein are embodiments of a new doped polymer electrolyte. The doped polymer electrolyte comprises a cationic-functionalized polymer and at least one polyacid dopant. In some embodiments, the polyacid dopant can be a polyphosphonic acid, a polysulfonic acid, or a combination thereof. In some embodiments, the cationic-functionalized polymer comprises a cationic functional group as disclosed herein. The disclosed cationic-functionalized polymers have excellent stability under low and/or high pH conditions and therefore are suitable for use in electrochemical devices. The cationic-functionalized polymer may be any polymer now known or hereafter developed that can be used when considering other operating features of the present disclosure. For example, the polymers are selected from those that are stable at relatively high operating temperatures of up to 150° C. (or higher), and preferably up to 200° C. (or higher, such as 220° C.). The polymers also are selected from those that are stable under acidic conditions, such as produced by doping with polyacids, at typical operating temperatures. Furthermore, fuel cell operating conditions also may be highly acidic even without using doped polymers, and hence suitable polymers also may be stable under typical fuel cell operating conditions. In particular embodiments, the electrolyte materials of the present disclosure can be used in fuel cells that operate at temperatures ranging from room temperature to 260° C. or higher, such as 80° C. to 200° C. (or higher, such as 220° C.).

In particular disclosed embodiments, the cationic-functionalized polymer of the disclosed doped polymer electrolyte comprises two structural components: (a) a polymeric group; and (b) a cationic functional group. Suitable polymers also may include a linker or tether to couple the cationic functional group to the polymer. Accordingly, certain disclosed embodiments of the cationic-functionalized polymer having structure satisfying Formula I below.

[Polymer repeating unit]$_m$-[Optional Linker]$_s$-[Cationic Functional Group (CFG)]$_n$     Formula I With reference to Formula I, the variable "m" is two or more and up to the number of monomeric subunits coupled to form a particular polymeric species, such as 2 to 1000, 2 to 100, 2 to 50, or 10 to 50 monomeric units, etc.; the variable "s" is an integer ranging from 0 to at least a value as recited for variable m, and plural linkers may be attached to a single monomeric unit; and variable "n" is an integer ranging from 1 to at least a value as recited for variable s, where the polymer includes an optional linker, and may be greater than 0, such as 1 or higher, or 1 to 50, or 1 to 25, or 1 to 12, if the polymer includes one or more functional groups that are directly coupled to, but not incorporated in, a monomeric unit or units. In an independent embodiment, the polymer is not a poly(diallyldimethylammonium) polymer.

In yet some additional embodiments, the polymer can have a structure satisfying Formula II or Formula III, below.

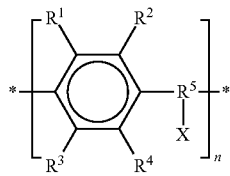

Formula II

With reference to Formula II, each of $R^1$, $R^2$, $R^3$, $R^4$, and $R^5$ independently can be hydrogen, halogen (e.g., bromo, fluoro, iodo, or chloro), an aliphatic group, an aryl group, or a combination thereof (e.g., aliphatic-aryl or aryl-aliphatic); each X independently can be selected from a cationic functional group as described herein; and n can range from 2 to 1000. In particular disclosed embodiments, $R^1$, $R^2$, $R^3$, $R^4$, and $R^5$ independently can be selected from hydrogen, fluoro, alkyl, alkenyl, alkynyl, phenyl, or a combination thereof (e.g., alkyl-phenyl or phenyl-alkyl and the like); each X independently can be selected from ammonium, sulfonium, phosphonium, guanidinium, oxonium, imidazolium, phosphazinium, quinolinium, piperidinium, or pyridinium; and n can range from 2 to 500, or from 2 to 100, or 10 to 50, or 20 to 40.

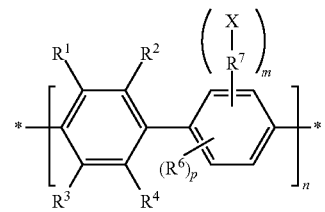

Formula III

With reference to Formula III, each of $R^1$, $R^2$, $R^3$, $R^4$, and $R^6$ independently can be hydrogen, an aliphatic group, an aryl group, or a combination thereof (e.g., aliphatic aryl or aryl aliphatic); each $R^7$ can be selected from carbonyl, sulfonyl, aliphatic, aryl, or a combination thereof (e.g., aliphatic-aryl or aryl-aliphatic); each X independently can be selected from a cationic functional group as described herein; n can range from 2 to 1000, m can range from 1 to 4; and p can range from 0 to 3. In particular disclosed embodiments, each of $R^1$, $R^2$, $R^3$, $R^4$, and $R^6$ independently can be selected from hydrogen, alkyl, alkenyl, alkynyl, phenyl, or a combination thereof (e.g., alkyl-phenyl or phenyl-alkyl, or the like); each $R^7$ independently can be selected from carbonyl, sulfonyl, alkyl, phenyl, or phenyl alkyl; each X independently can be selected from ammonium, sulfonium, phosphonium, guanidinium, oxonium, imidazolium, phosphazinium, quinolinium, piperidinium, or pyridinium; n can range from 2 to 500, or from 2 to 100, or 10 to 50, or 20 to 40; m can be 1 or 2; and p can be 1 or 2.

As discussed above, the cationic-functionalized polymer of the polymer electrolyte comprises a cationic functional group. In some embodiments, the cationic functional group is selected from an ammonium group, a sulfonium group, a phosphonium group, a guanidinium group, an imidazolium group, a piperidinium group, a quinolinium group, a pyridinium group, an oxonium group, or a phosphazinium group. The structures of such cationic functional groups are illustrated below. In some embodiments, a mixture of cationic functional group-functionalized polyphenylene polymers can be used, such as a mixture of two or more cationic functional group-functionalized polyphenylene polymers.

Ammonium groups can have a structure of —NH$_3^+$, or a structure satisfying a formula

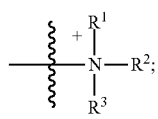

imidazolium groups can have a structure satisfying a formula

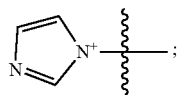 [SMILES: *[NH+]1C=CN=C1]

gaunidinium groups can have a structure satisfying a formula

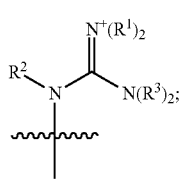

phosphazenium groups can have a structure satisfying a formula

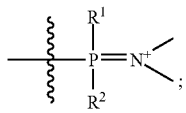

sulfonium groups can have a structure satisfying a formula

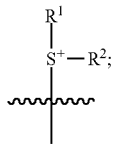

oxonium groups can have a structure satisfying a formula;

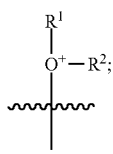

piperidinium groups can have a structure satisfying a formula

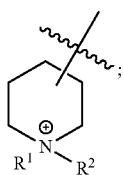

pyridinium groups can have a structure satisfying a formula

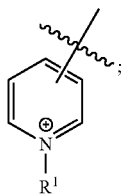

quinolinium groups can have a structure satisfying a formula

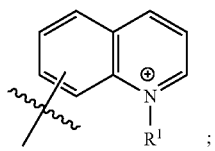

and
phosphonium groups can have a structure satisfying a formula

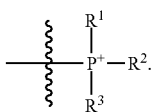

With reference to the above formulas, each of $R^1$, $R^2$, and $R^3$ independently can be selected from hydrogen, aliphatic, heteroaliphatic, aryl, or heteroaryl. In some embodiments, $R^1$, $R^2$, and $R^3$ independently can be hydrogen, alkyl, such as $C_{1-10}$alkyl (or more typically $C_{1-5}$ alkyl, such as methyl, ethyl, propyl, butyl, pentyl and hexyl), aryl, heteroaryl, cyclic, heterocyclic, or any combinations thereof. These cationic functional groups also can be used in any and all combinations. In particular disclosed embodiments, the cationic functional group of the polymer is an ammonium cationic group, a phosphonium cationic group, a sulfonium cationic group, or any combinations thereof.

As described above, the polymer can comprise a linker group in some embodiments. In embodiments comprising a linker (indicated as "optional linker" in Formula I and as "$R^5$" or "$R^7$" in Formulas II and III, respectively), the linker typically comprises an aliphatic, particularly alkyl, or aryl group. Certain disclosed embodiments concern polymers comprising an alkyl linker, such as a $C_{1-10}$ alkyl linker, more typically $C_{1-6}$ alkyl linkers, with particular alkyl linker examples including methyl, ethyl, propyl, butyl, pentyl, hexyl, heptyl, octyl, nonyl and decyl linkers. Substituted aliphatic linkers, particularly substituted alkyl linkers, aryl linkers, substituted aryl linkers, or aliphatic and aryl linkers comprising heteroatom-containing functional groups also can be used as suitable linkers. For example, the linkers may comprise amide functional groups, hydroxyl functional groups, ketone functional groups, sulfone functional groups, sulfone amide functional groups, or the like, or suitable linkers may comprise combinations of such functional groups. Particular examples of aryl linkers include phenylene $(C_6H_4)_n$ and halogenated phenylenes, such as fluorophenylene (e.g., $(C_6F_4)_n$).

In particular embodiments, the polymer component of the cationic-functionalized polymer can be selected from the following exemplary classes of polymers: polyaryl polymers, such as polyphenylenes; polystyrenes; polyolefins; polysulfones; polyethers; polyether sulfones; polyketones; polyetherketones; polyarylethers; polyionenes; polyfluorenes; nitrile containing polyarylethers; halogenated polymers, such as perfluorinated polymers; and the like. Substituted polymers also may be used, and substituted polymers may include any substituent in addition to the cationic functional group that imparts a desirable feature or features to the resulting polymer. For example, the polymer may be halogenated, particularly fluorinated, or may include halogenated aliphatic groups, such as trifluoromethyl. All polymers disclosed herein are to be considered as also including all substituted versions thereof unless expressly stated otherwise.

Polyaryl compounds are one particular class of suitable polymer according to the present disclosure. Polyphenylenes are one example of a suitable polyaryl polymer. Certain disclosed polyphenylenes that are modified to comprise the cationic functional group can have a structure satisfying Formula IV.

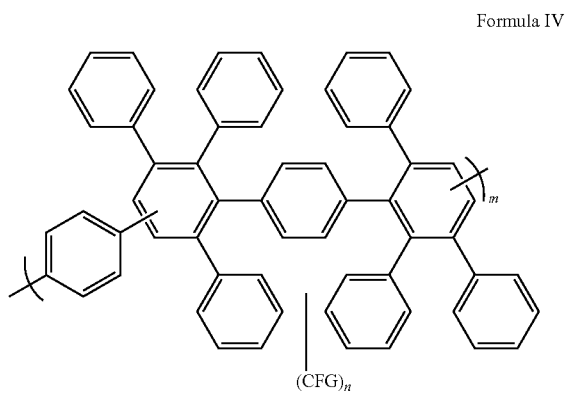

Formula IV

With reference to Formula IV, CFG is a cationic functional group as described herein; m is 2 to 1000, 2 to 100, 2 to 50, or 10 to 50 monomeric units; and n is at least 1 up to the number of total positions available on each monomeric unit. Certain disclosed embodiments having a single cationic functional group (CFG) coupled to the polyphenylene core without any intervening linker have a structure satisfying Formula IVA.

Formula IVA

Multiple cationic functional groups also can be coupled to the polymer, as exemplified by Formula IVB, having 4 cationic functional groups per repeating polyphenylene core unit.

Formula IVB

The cationic functional group also can be coupled to the polymeric group through a linker, as shown below in Formula IVC.

Formula IVC

With reference to this formula, a linker may have a single cationic functional group or multiple cationic functional groups, so that n is from 1 to the number of possible positions on the linker, typically 1 to 5, more typically 1 or 2; and p is the number of LINKER-CFG units coupled to a monomeric unit, and hence typically is from 1 to the number of possible positions on the monomeric unit, typically 1 to 5, more typically 1 to 2. For example, the polyphenylene core unit may have multiple LINKER-CFG units, as exemplified by Formula IVD.

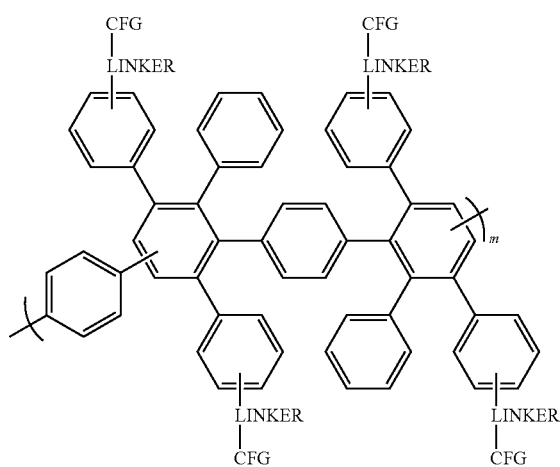

Formula IVD

Certain disclosed embodiments concern methyl and butyl linkers. Accordingly, certain disclosed embodiments concern materials potentially having alkyl linkers as shown below in Formulas IVE and IVF.

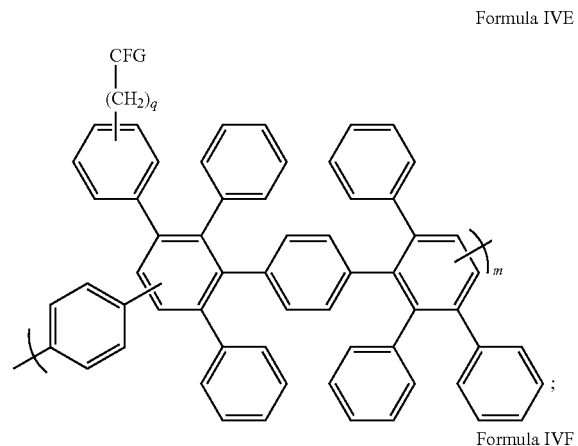

Formula IVE

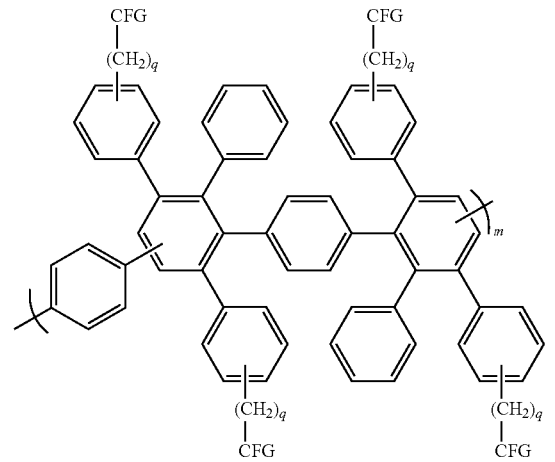

Formula IVF

With reference to Formulas IVE and IVF, m is as stated above for Formula IV, and q is 0 to 10, more typically 1-10, such as 1-6.

Ammonium cationic functional groups have been used in certain working embodiments. Accordingly, certain disclosed embodiments concern materials having a structure satisfying Formula IVG.

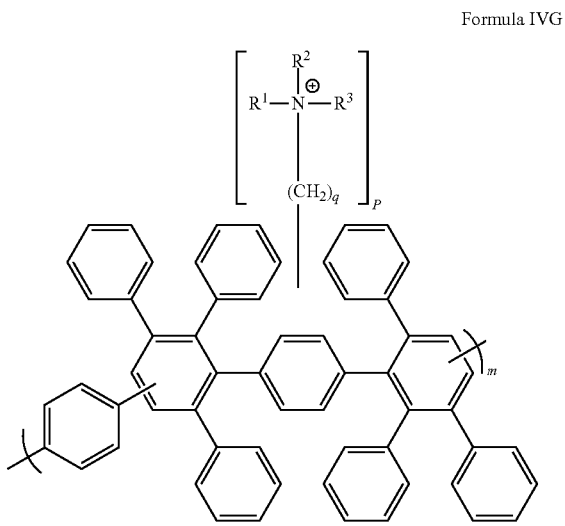

Formula IVG

With reference to Formula IVG, p is the number of —$(CH_2)_q$—$N^+R^1R^2R^3$ units coupled to a monomeric unit, and typically is an integer ranging from 1 to 5, more typically 1 to 2. In some embodiments, a particular polymer has a structure satisfying a Formula IVH.

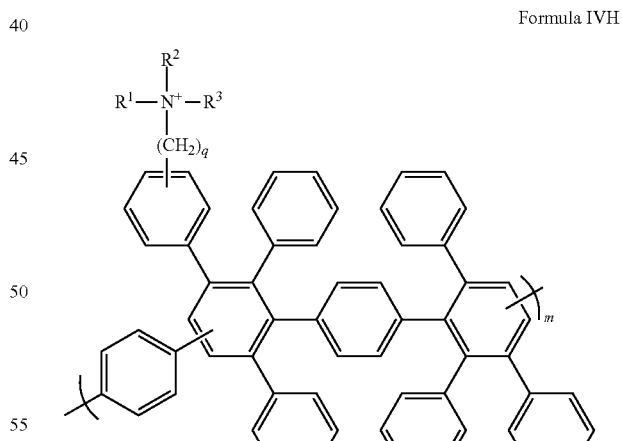

Formula IVH

Multiple ammonium functional groups also can be linked to the polyaryl core, such as is illustrated for Formula IVI.

Formula IVI

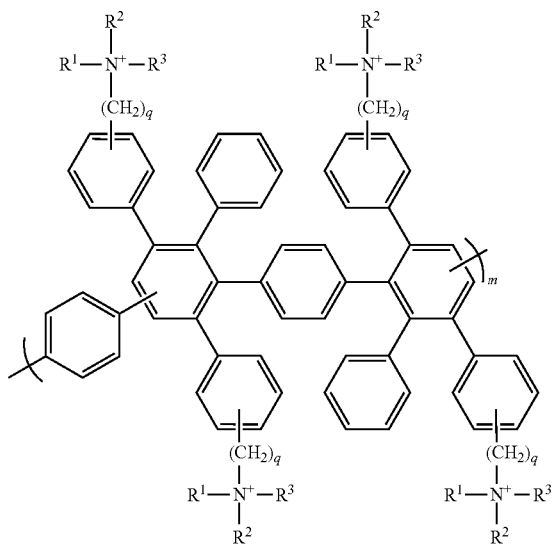

Formula IVK

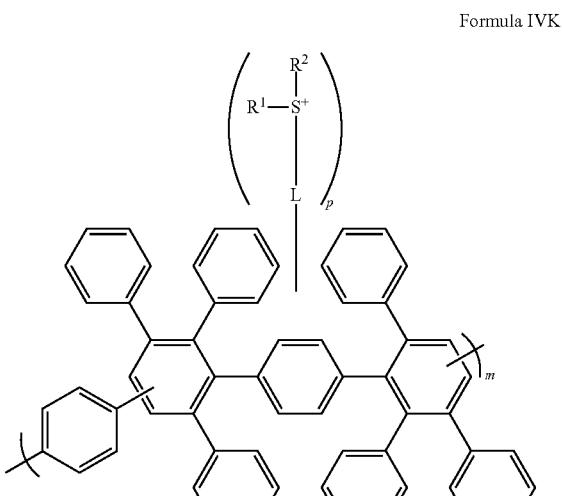

Similarly, different cationic functional groups can be linked to the polymeric core, as illustrated in Formulas IVJ-IVL.

Formula IVJ

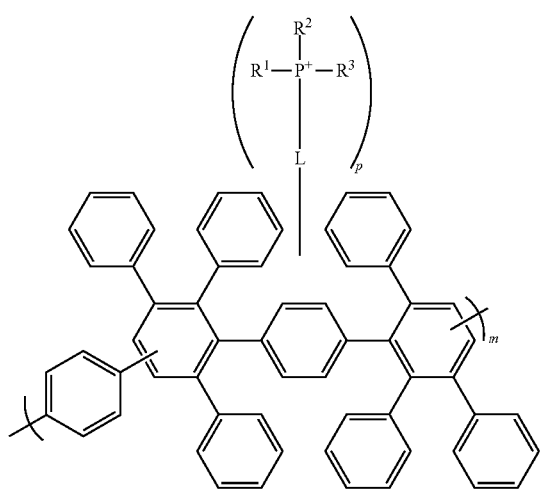

Formula IVL

Polymers comprising combinations of cationic functional groups also can be used with disclosed embodiments of the present disclosure, such as with compounds having a structure satisfying Formula IVM.

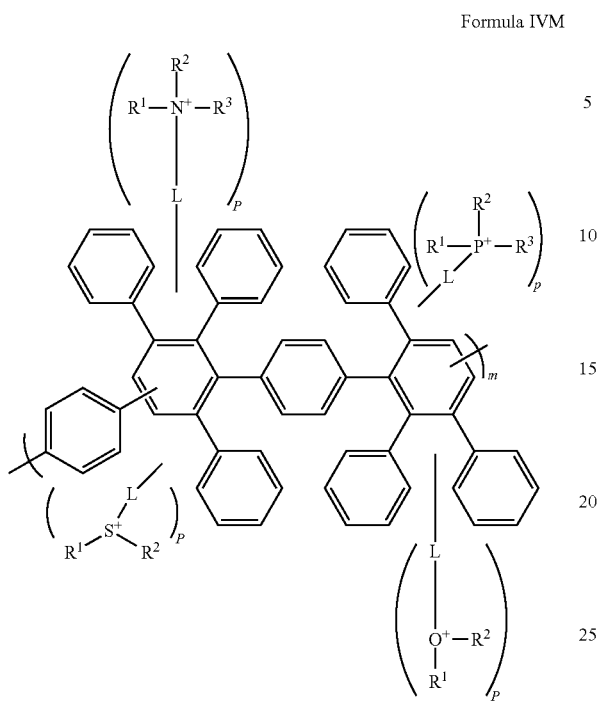

Formula IVM

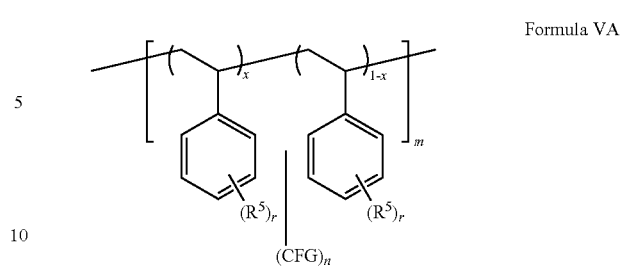

Formula VA

With reference to Formula VA, the variables are as discussed above for Formula V. For example, the polymer may have a structure satisfying Formula VB.

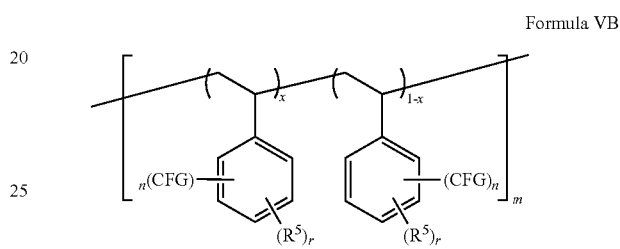

Formula VB

With reference to Formula IVM, p is 0 or 1. A person of ordinary skill in the art will also appreciate that the phenyl rings can be substituted phenyl rings having one or more substituents bound thereto, such as a substituent selected from alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, oxo, sulfonamide, sulfhydryl, thioalkoxy, or other functionality.

Polymers based on polystyrene and derivatives thereof also are useful polymers for the presently disclosed embodiments. Certain embodiments include styrene polymers having a structure satisfying Formula V.

Compounds having this structure as well as a cationic group and an optional linker may have a structure satisfying Formula VC.

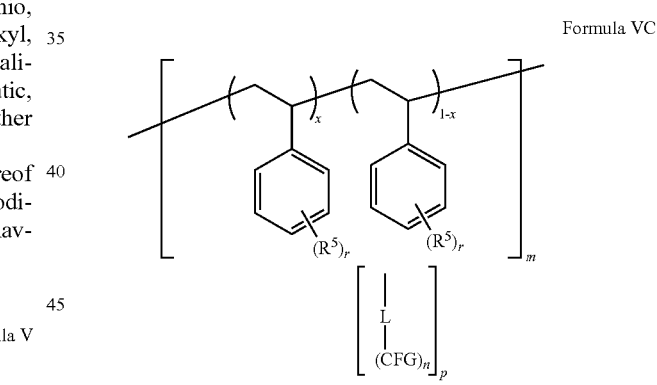

Formula VC

Formula V

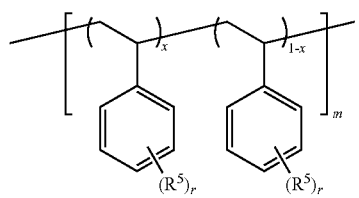

This formula indicates that the linker-CFG unit can be coupled to any available monomeric unit position, such as is illustrated in Formula VD.

With reference to this formula, $R^5$ is a substituent selected from alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, nitrile, oxo, sulfonamide, sulfhydryl, thioalkoxy, or other functionality; m is as stated above; r is from 0 (an unsubstituted polymer having hydrogen atoms bound to the aromatic ring) to 4; and x is from 0 to 0.99.

Certain disclosed embodiments of polystyrene compounds having a cationic group coupled to the polymeric compound may have a structure satisfying Formula VA.

Formula VD

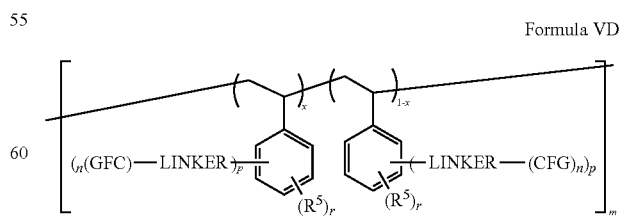

With reference to Formula VD, the variables can be as discussed for Formula V. Compounds having alkyl linkers can have a structure satisfying Formula VE.

Formula VE

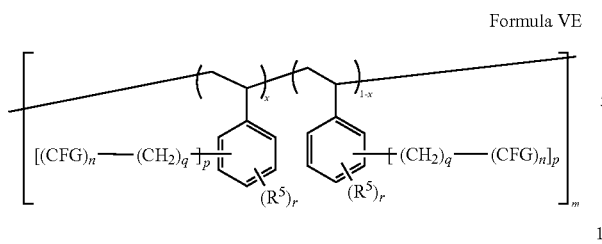

With reference to this formula, the variables can be as discussed for Formula V.

Other disclosed embodiments concern biphenyl polymers having a structure satisfying Formula VI.

Formula VI $$\left[\begin{array}{c} \phantom{x} \\ (R^5)_r \end{array} \begin{array}{c} \phantom{x} \\ (R^5)_r \end{array} \begin{array}{c} R^6 \\ | \\ C \\ | \\ R^7 \end{array} \right]_m$$

With reference to this formula, $R^6$ and $R^7$ independently are selected from hydrogen, aliphatic, heteroaliphatic, aryl, heteroaryl; and LINKER, m, $R^5$, are as stated for Formula V, and q is as stated for Formula IVF. Particular disclosed compounds have $R^6$ selected from hydrogen, alkyl and haloalkyl, typically $C_{1-10}$ alkyl and $C_{1-10}$ haloalkyl, more typically $C_{1-5}$ alkyl or $C_{1-10}$ haloalkyl, such as trifluoromethyl. Compounds having a cationic functional group (or groups) can have a structure satisfying Formula VIA.

Formula VIA $$\left[\begin{array}{c} \phantom{x} \\ (R^5)_r \end{array} \begin{array}{c} \phantom{x} \\ (R^5)_r \end{array} \begin{array}{c} R^6 \\ | \\ C \\ | \\ R^7 \end{array} \right]_m$$
$$|$$
$$(CFG)_n$$

With reference to Formula VIA, the cationic functional group may be attached to any position of the ring and/or at the benzylic carbon. Compounds having linkers between the cationic functional group and the monomeric units typically have structure satisfying Formula VIB.

Formula VIB $$\left[\begin{array}{c} \phantom{x} \\ (R^5)_r \end{array} \begin{array}{c} \phantom{x} \\ (R^5)_r \end{array} \begin{array}{c} R^6 \\ | \\ C \\ | \\ R^7 \end{array} \right]_m$$
$$\left(\begin{array}{c} LINKER \\ | \\ (CFG)_n \end{array}\right)_p$$

And compounds having alkyl linkers have a structure satisfying Formula VIC.

Formula VIC $$\left[\begin{array}{c} (R^5)_r \\ \phantom{x} \\ (R^5)_r \end{array} \begin{array}{c} \phantom{x} \\ \phantom{x} \end{array} \begin{array}{c} R^6 \\ | \\ C \\ | \\ (CH_2)_q \\ | \\ CFG \end{array} \right]_m$$

Polyether sulfones provide another example of a suitable class of polymers. Certain exemplary polyether sulfones are described below.

Certain disclosed polyether sulfones have structure satisfying Formula VII.

Formula VII $$\left(\begin{array}{c} (R^5)_r \\ \phantom{x} \end{array} \begin{array}{c} O \\ \| \\ S \\ \| \\ O \end{array} \begin{array}{c} (R^5)_r \\ \phantom{x} \end{array} O \begin{array}{c} (R^5)_r \\ \phantom{x} \\ | \\ (CFG)_n \end{array} X \begin{array}{c} (R^5)_r \\ \phantom{x} \end{array} O\right)_m$$

With reference to Formula VII, the cationic functional group may be directly bound to any available position or positions provided by the monomeric unit. The cationic functional group may be coupled via a linker to any available position or positions provided by the monomeric unit as well, as indicated below in Formula VIIA.

Formula VIIA $$\left(\begin{array}{c} (R^5)_r \\ \phantom{x} \end{array} \begin{array}{c} O \\ \| \\ S \\ \| \\ O \end{array} \begin{array}{c} (R^5)_r \\ \phantom{x} \end{array} O \begin{array}{c} (R^5)_r \\ \phantom{x} \end{array} X \begin{array}{c} (R^5)_r \\ \phantom{x} \end{array} O\right)_m$$
$$\left[\begin{array}{c} | \\ LINKER \\ | \\ (CFG)_n \end{array}\right]_p$$

Particular embodiments have the cationic functional group bound to the monomeric unit of the polyether sulfone as illustrated in Formula VIIB.

Formula VIIB $$\left(\begin{array}{c} \phantom{x} \\ \phantom{x} \end{array} \begin{array}{c} O \\ \| \\ S \\ \| \\ O \end{array} \begin{array}{c} CFG \\ | \\ \phantom{x} \\ (R^5)_r \end{array} O \begin{array}{c} \phantom{x} \\ (R^5)_r \end{array} X \begin{array}{c} \phantom{x} \\ (R^5)_r \end{array} O\right)_m$$

With reference to Formulas VII, VIIA, and VIIB, X can be selected from SO, $S_2$, CO, O, S,

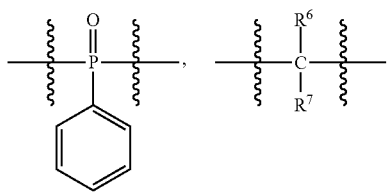

where $R^6$ and $R^7$ are aliphatic, aryl, heteroaryl, more typically alkyl, such as $C_{1-10}$ alkyl, or haloalkyl; or any combinations thereof; or X is not present. In some embodiments, X is

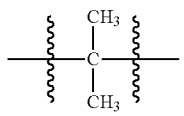

and

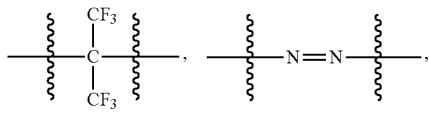

or

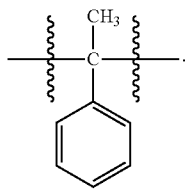 [SMILES: *C(*)(C)c1ccccc1]

Also, $R^5$, m, and r can be as recited for Formula V.

As indicated above for Formulas VII, VIIA, and VIIB, X can be present or not present, as exemplified by Formulas VIIC and VIID:

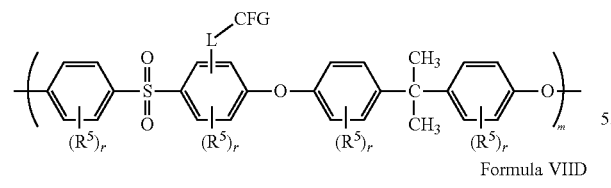

Formula VIIC

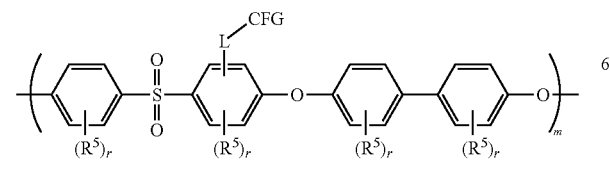

Formula VIID

Polyketones, having a structure satisfying Formula VIII, provide another example of a suitable class of polymers.

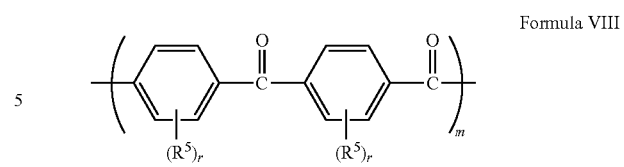

Formula VIII

With reference to Formula VIII, $R^5$, m, and r can be as recited for Formula V.

Certain disclosed embodiments having a cationic functional group bound to any available position of the monomeric unit directly have a structure satisfying Formula VIIIA.

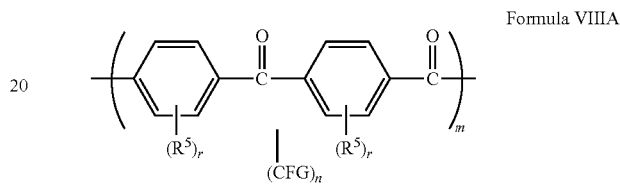

Formula VIIIA

As with previously disclosed examples, the cationic functional group may be bound to the monomeric unit by a linker L as shown below in Formula VIIIB.

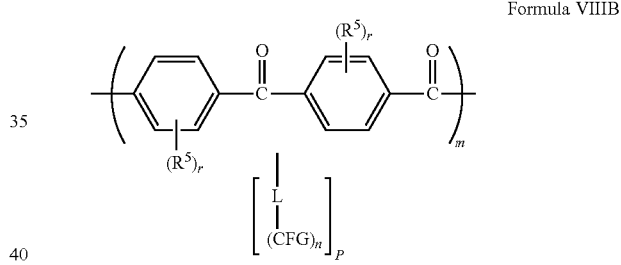

Formula VIIIB

The polyketone can also be a polyether ketone, such as that illustrated by Formula VIIIC or VIIID.

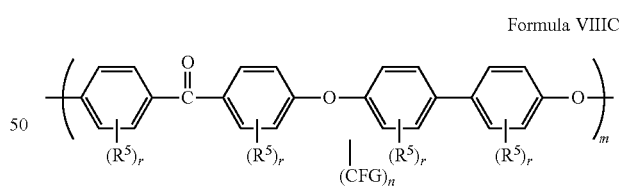

Formula VIIIC

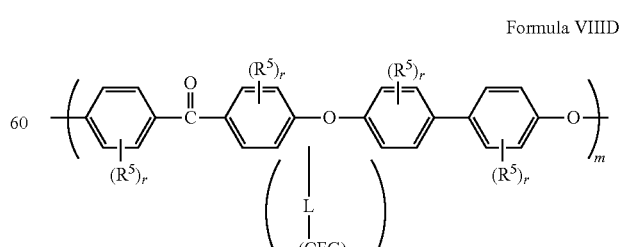

Formula VIIID

Halogenated polyarylethers are another example of a suitable polymer. Certain disclosed embodiments can have a structure satisfying Formula IX.

Formula IX

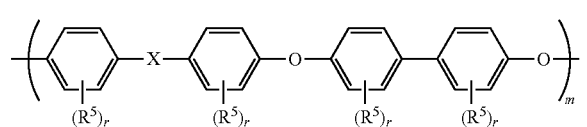

With reference to Formula IX, X can be as recited above for Formulas VII, VIIA, or VIIB; $R^5$ is a halogen, particularly fluorine; and r and m can be as recited for Formula V. Such compounds can have a cationic functional group linked to any available position of the monomeric unit, as shown below in Formula IXA.

Formula IXA

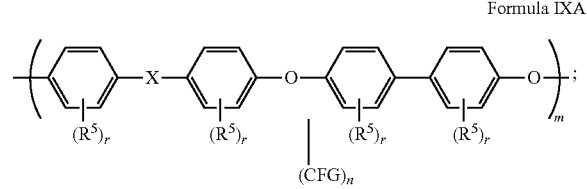

or through a linker as illustrated in Formula IXB.

Formula IXB

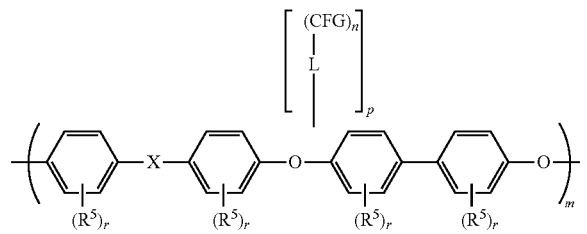

Certain disclosed exemplary fluorinated polyarylethers have a structure satisfying Formula IXC.

Formula IXC

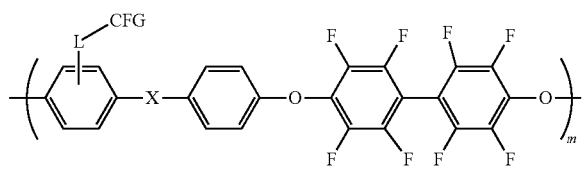

Polynitriles also are suitable polymers useful for practicing the present disclosure. Certain disclosed polynitriles have a structure satisfying Formula X.

Formula X

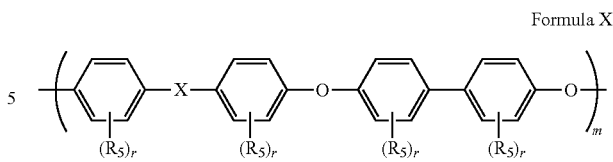

With reference to Formula X, X can be as recited above for Formula VII; $R^5$ is nitrile (—CN); and r and m can be as recited for Formula V. These materials may have a cationic functional group bound to any available position, such as indicated below in Formula XA.

Formula XA

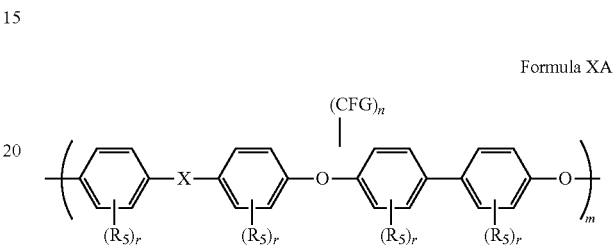

And as with the above examples, the cationic functional group may be coupled to any available position of the monomeric unit by a linker, such as with compounds having a structure satisfying Formula XB.

Formula XB

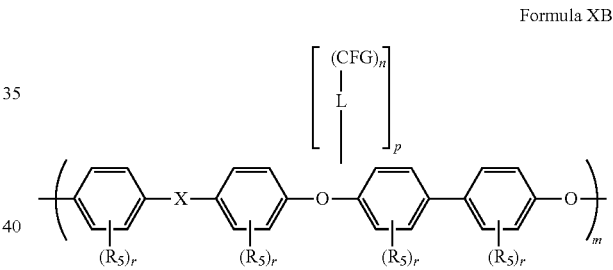

Certain exemplary nitrile-containing compounds have a structure satisfying any one or more of Formulas XC or XD.

Formula XC

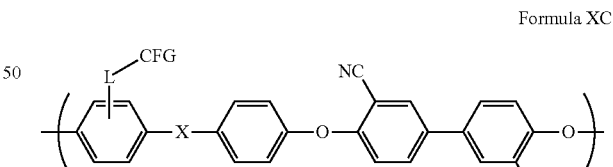

Formula XD

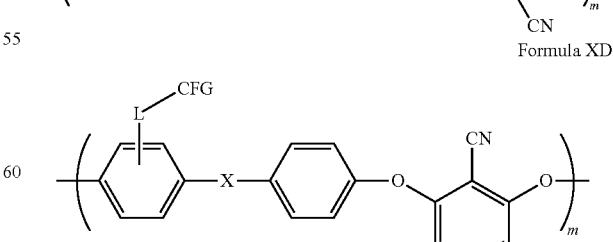

Polyfluorenes can have structures satisfying Formula XIA and/or XIB below, wherein X is aryl or $C(CF_3)$(aliphatic);

each $R^5$ independently is hydrogen, aliphatic, heteroaliphatic, or aromatic; x is 0 to 0.99; and the other variables are as recited herein.

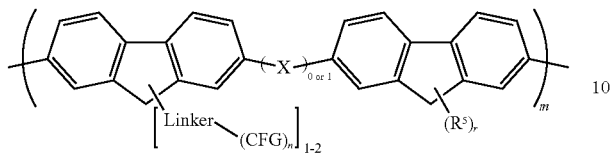

Formula XIA

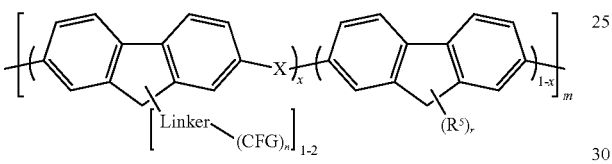

Formula XIB

Additional exemplary cationic group-functionalized polyphenylene polymers are illustrated below in Table 1.

TABLE 1

Exemplary Cationic Group-Functionalized Polymers

| Name | Structure |
|---|---|
| Benzyl trimethyl ammonium (or benzyl trimethyl ammonium functionalized polyphenylene polymer) | 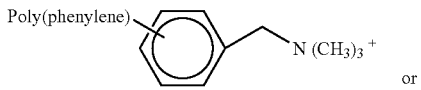 or 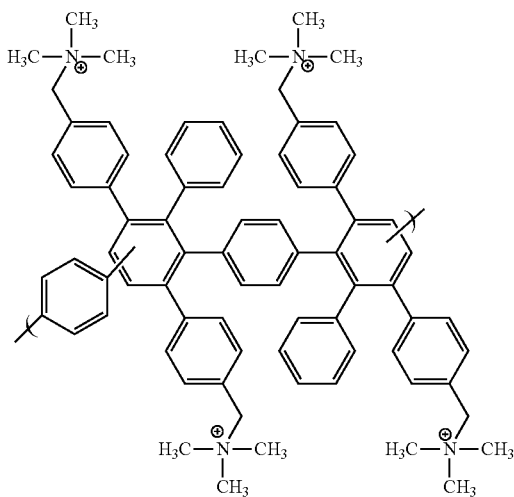 |

TABLE 1-continued
Exemplary Cationic Group-Functionalized Polymers
| Name | Structure |
|---|---|
| Hexamethyl trimethyl ammonium (or alkyl trimethyl ammonium functionalized polyphenylene polymer) | 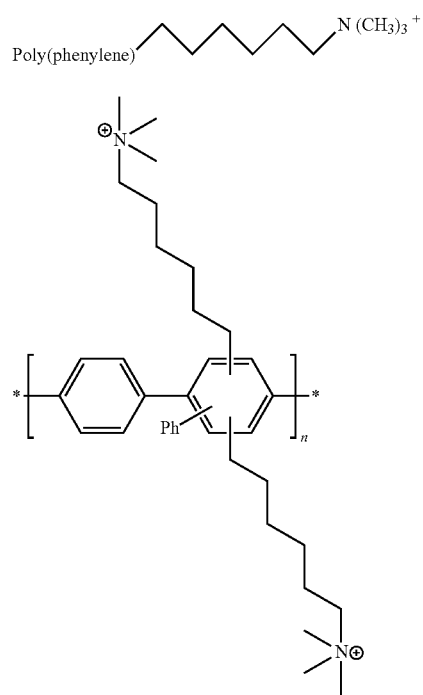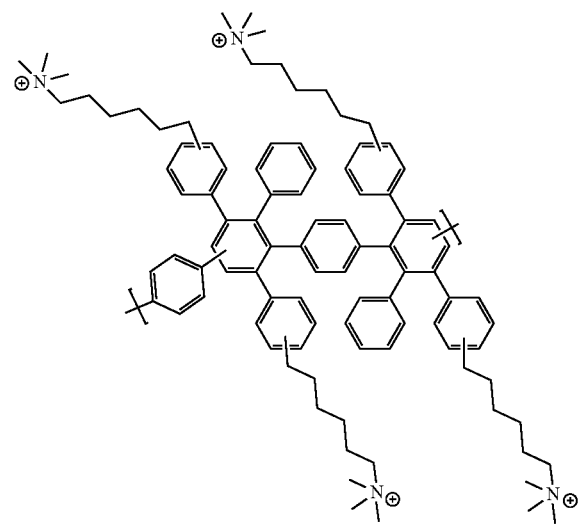 |

TABLE 1-continued
Exemplary Cationic Group-Functionalized Polymers
| Name | Structure |
|------|-----------|
|  | 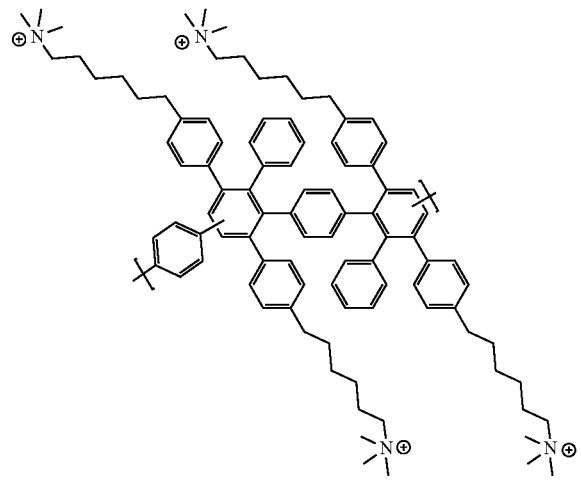 |
| Benzyl triethyl ammonium (or benzyl triethyl ammonium functionalized polyphenylene polymer) | 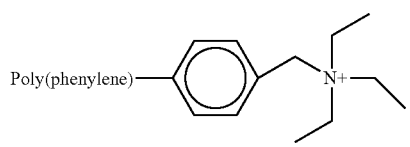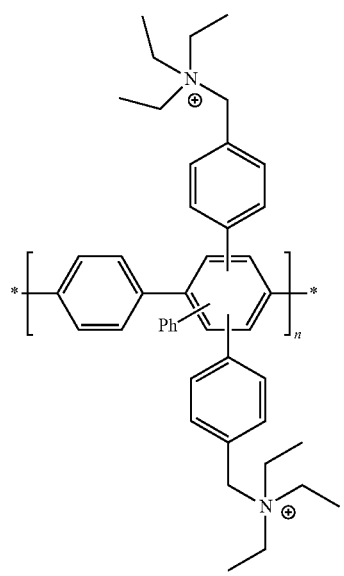 |

TABLE 1-continued
Exemplary Cationic Group-Functionalized Polymers
| Name | Structure |
|---|---|
| | 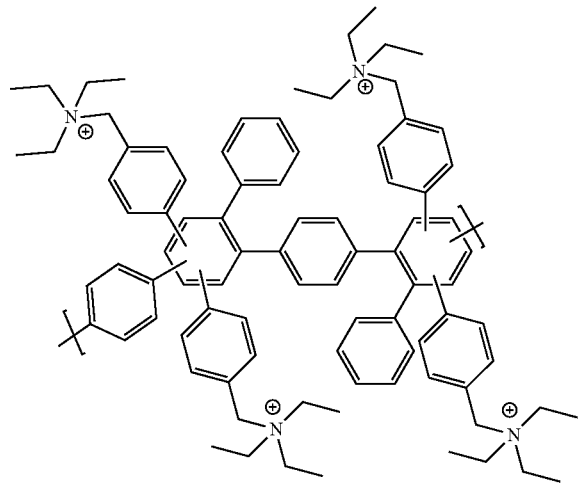 |
| | 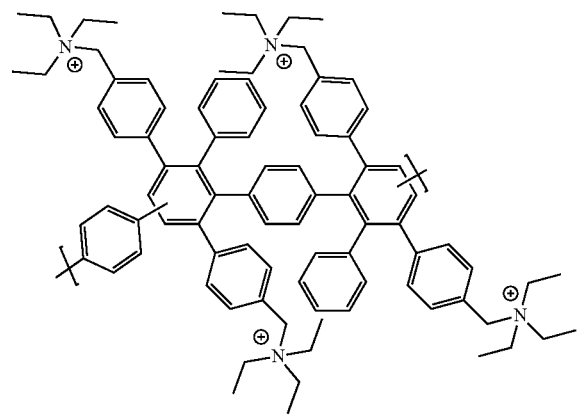 |
| Phenyl pentamethyl guanidinium (or phenyl pentamethyl guanidinium functionalized polyphenylene polymer) | 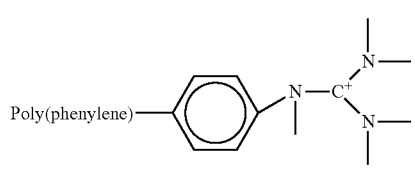 |

TABLE 1-continued
Exemplary Cationic Group-Functionalized Polymers
Name        Structure
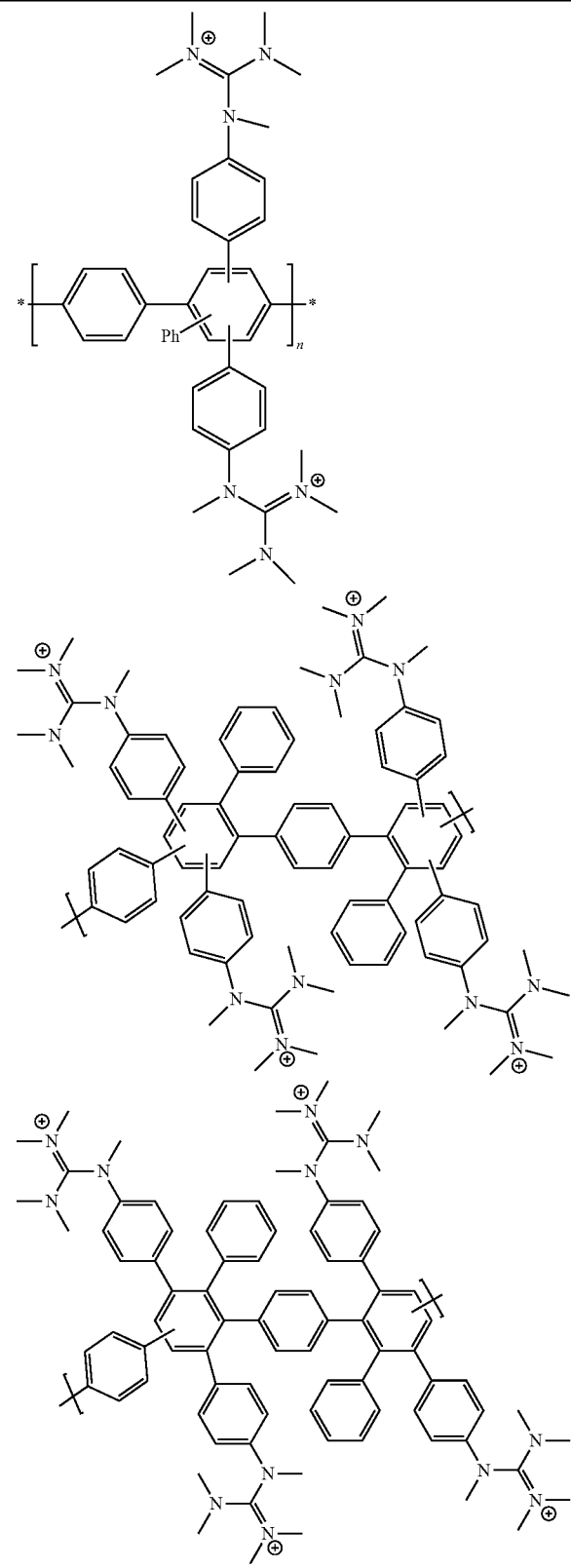

The polymers described above are doped with a polyacid to form the disclosed electrolytes. Doping with the polyacid can provide a cation-anion bonding pair (also referred to herein as an "ion pair") in the polymeric portion, wherein the cationic functional group of the polymer provides the cation and the ionized form of the polyacid provides the anion. Any suitable polyacid useful for this purpose can be used. In some embodiments, the polyacid can have a structure satisfying a formula R—[PO(OH)$_2$]$_n$ or R—[S(O)$_2$OH]$_n$, wherein R is aliphatic (e.g., methyl, ethyl, propyl, butyl, etc.), aromatic, or heteroaliphatic and n is an integer selected from 2 to 4, such as 2, 3, or 4. In some embodiments, the polyacid is a diacid, such as a diphosphonic acid or a disulfonic acid. In some embodiments, the polyacid can be a triacid, such as a triphosphonic acid or a trisulfonic acid. Any combination of polyacids can be used. For example, a polymer can be doped with one or more diacids and one or more triacids, wherein each diacid and each triacid can be the same or different as the other diacid(s) and triacid(s). In particular embodiments, the polymers are doped with diphosphonic acid and/or disulfonic acid species, such as compounds having a structure satisfying Formulas XII or XIII.

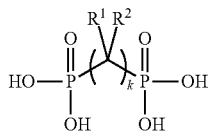

Formula XII

With reference to Formulas XII and XIII, $R^1$ and $R^2$ independently can be H, F, OH, aliphatic (such as alkyl, alkenyl, or alkynyl), heteroaliphatic (such as alkoxy), or aromatic (such as aryl or heteroaryl); and k can be an integer selected from 1 to 20, such as 1-10, or 1-5, or 1-3. In particular disclosed embodiments, one or both of $R^1$ and $R^2$ is F. In yet other particular disclosed embodiments, $R^1$ is H and $R^2$ is F; or $R^1$ is F and $R^2$ is F, or $R^1$ is H and $R^2$ is H. In yet additional embodiments, $R^1$ is Me and $R^2$ is OH. In representative embodiments, the dopant is CH$_2$—[PO(OH)$_2$]$_2$ (or, drawn another way, (HO)$_2$OP—CH$_2$—PO(OH)$_2$; also referred to herein as methylenebis(phosphonic acid)); CH$_2$—[SO$_2$OH]$_n$ (or, drawn another way, HO(O)$_2$S—CH$_2$—S(O)$_2$OH; also referred to herein as methanedisulfonic acid); (CH$_2$)$_3$—[PO(OH)$_2$]$_2$ (or, drawn another way, (HO)$_2$OP—CH$_2$CH$_2$CH$_2$—PO(OH)$_2$; also referred to herein as propane-1,3-diylbis(phosphonic acid)); (CH$_2$)$_3$—[SO$_2$OH]$_n$ (or, drawn another way, HO(O)$_2$S—CH$_2$CH$_2$CH$_2$—S(O)$_2$OH; also referred to herein as propane-1,3-disulfonic acid); CF$_2$—[PO(OH)$_2$]$_2$ (or, drawn another way, (HO)$_2$OP—CF$_2$—PO(OH)$_2$; also referred to herein as (difluoromethylene)bis(phosphonic acid)); CF$_2$—[SO$_2$OH]$_n$ (or, drawn another way, HO(O)$_2$S—CF$_2$—S(O)$_2$OH; also referred to herein as difluoromethanedisulfonic acid); C(Me)(OH)—[PO(OH)$_2$]$_2$ (or, drawn another way, (HO)$_2$OP—C(Me)(OH)—PO(OH)$_2$; also referred to herein as (1-hydroxyethane-1,1-diyl)bis(phosphonic acid) or etridonic acid); C(Me)(OH)—[SO$_2$OH]$_n$ (or, drawn another way, HO(O)$_2$S—C(Me)(OH)—S(O)$_2$OH; also referred to herein as 1-hydroxyethane-1,1-disulfonic acid); or any combination thereof.

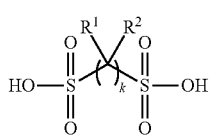

Formula XIII

The structures of certain exemplary polyacid-doped polymers that are useful for the present disclosure are provided below. Any of the above-disclosed polymers can be combined with the polyacids as disclosed herein such that one or more of the cationic functional groups are counter-balanced with a polyacid (that is the cationic functional group is balanced with a counterion provided by the polyacid, such as when the polyacid is ionized). Not all cationic functional groups need be counter-balanced with a polyacid, but typically if plural cationic functional groups are present then they are counter-balanced with a corresponding polyacid. Also, one or more hydroxyl groups of the illustrated polyacids may be deprotonated.

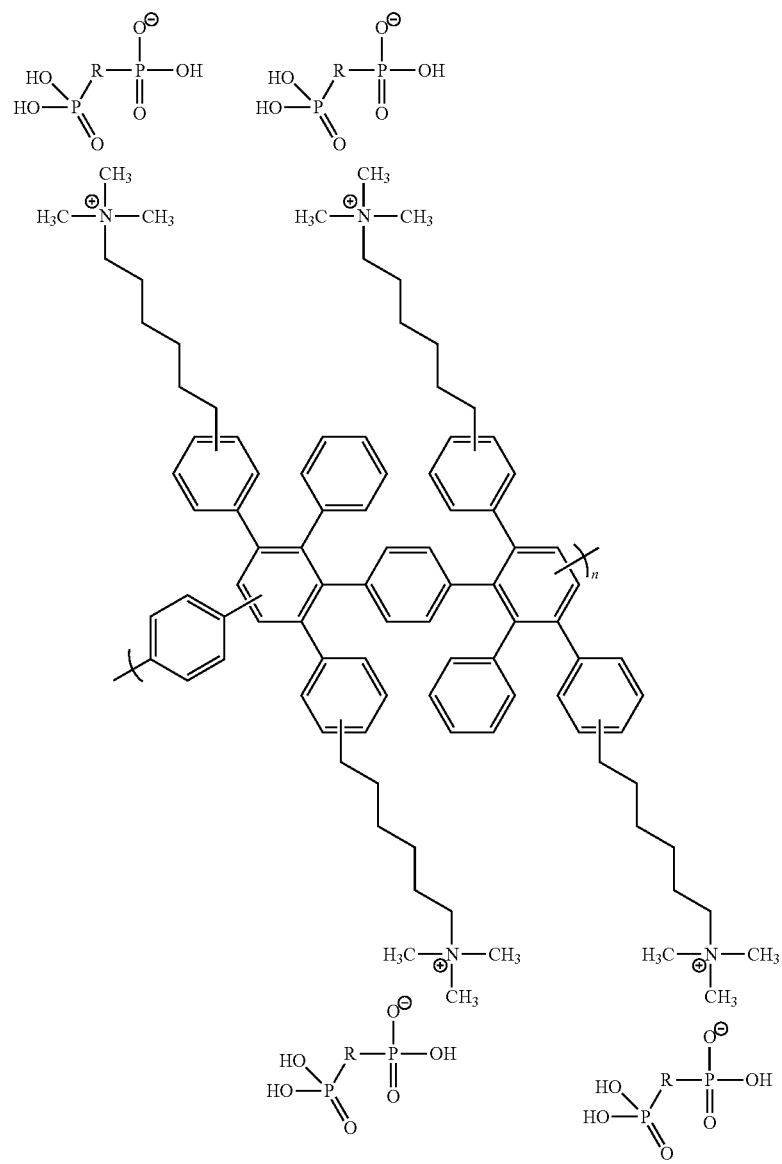

-continued
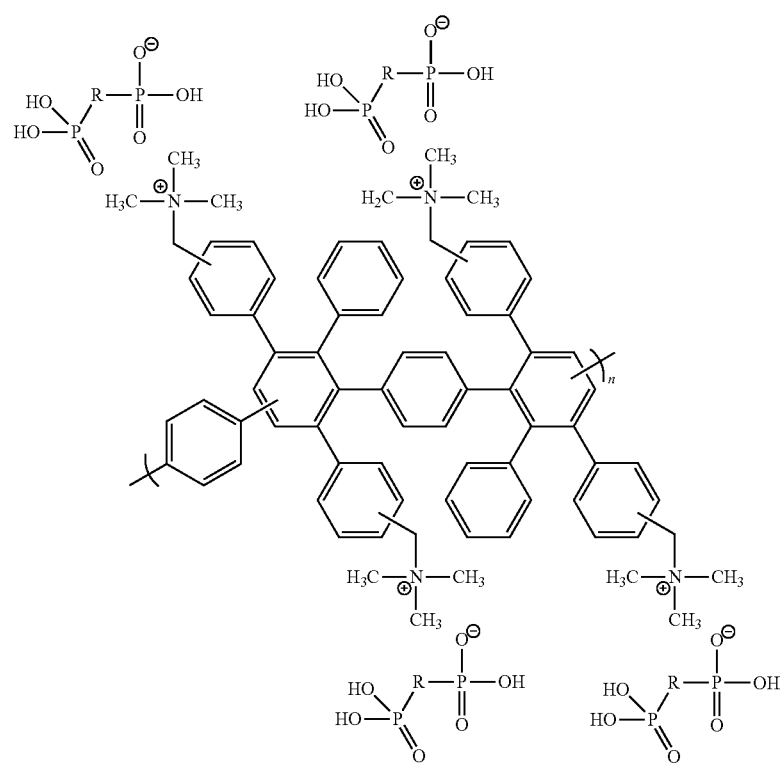

-continued
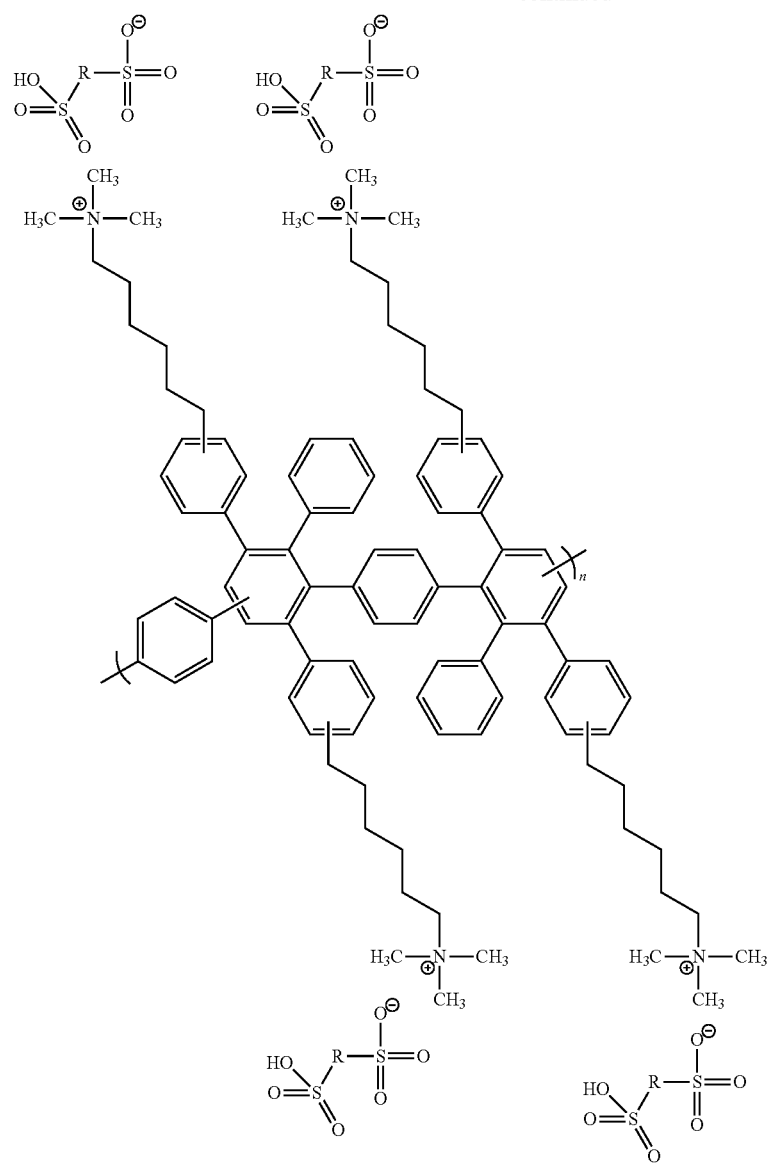

-continued
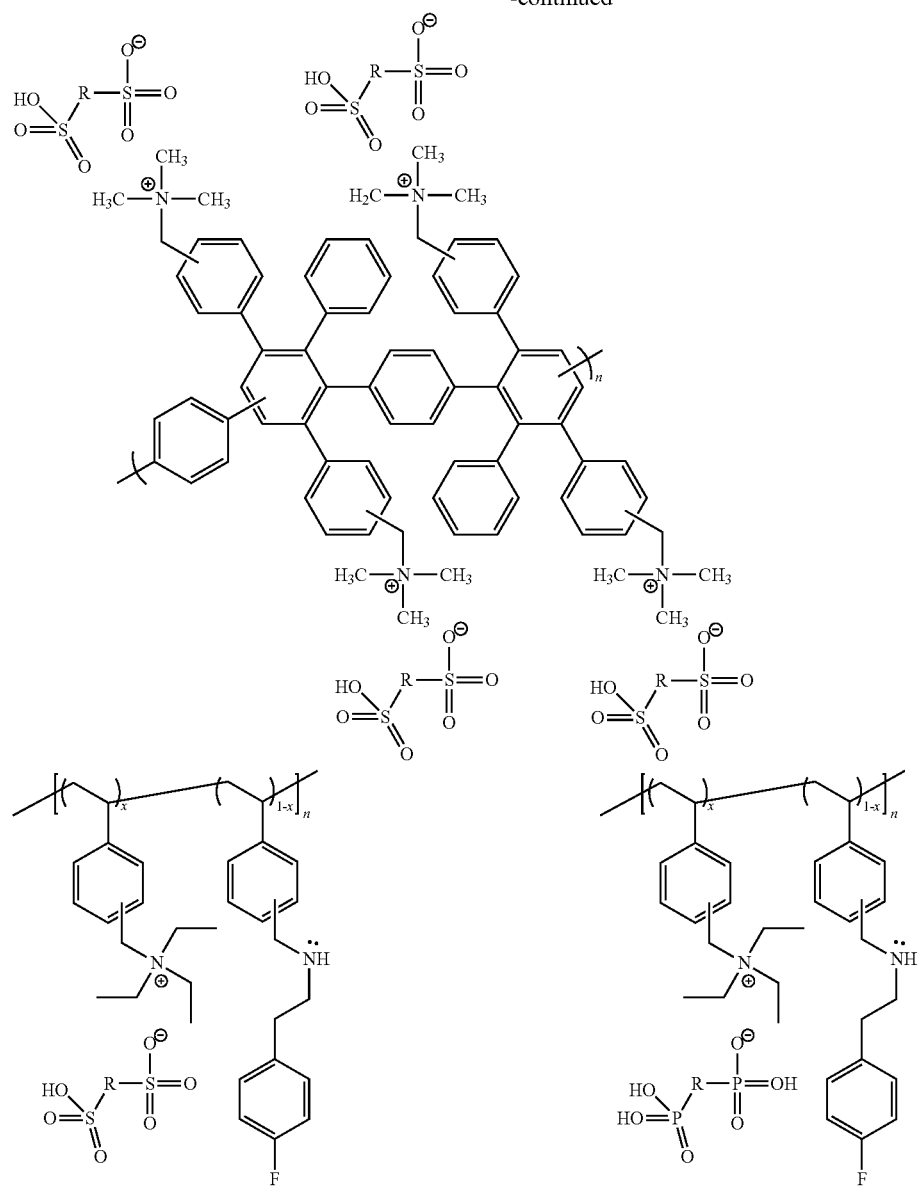
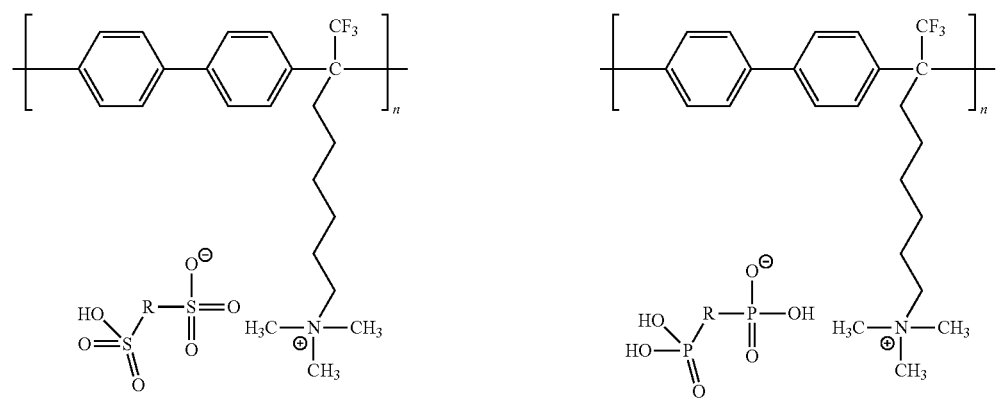

-continued
49
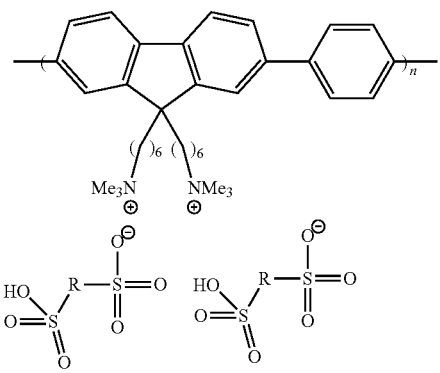
50
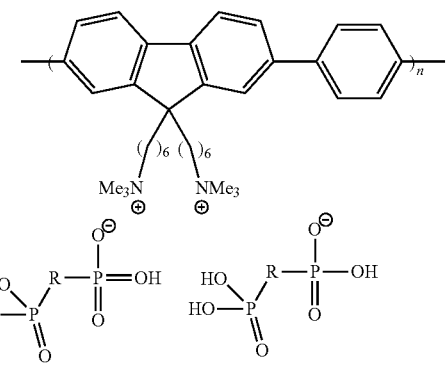
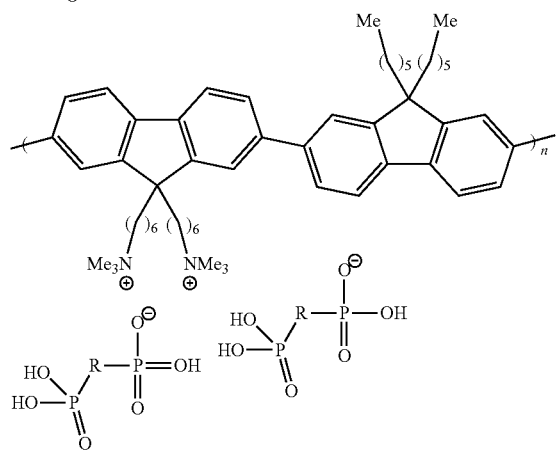
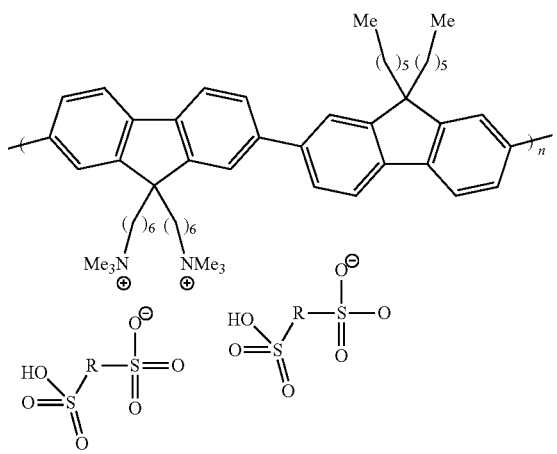
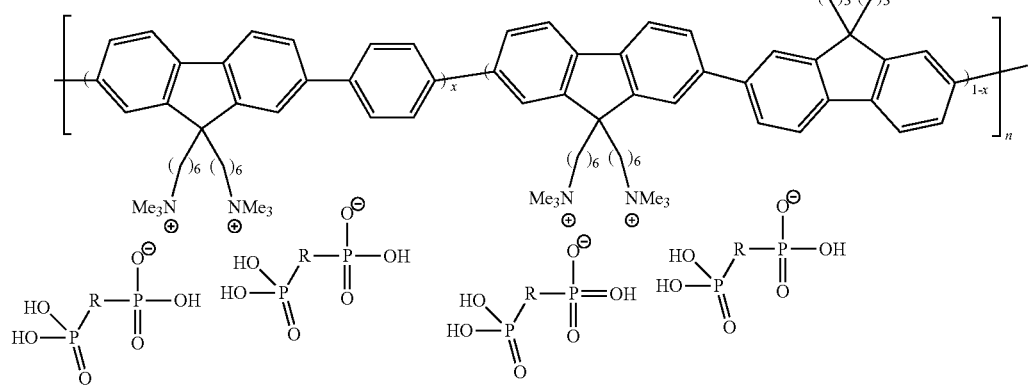
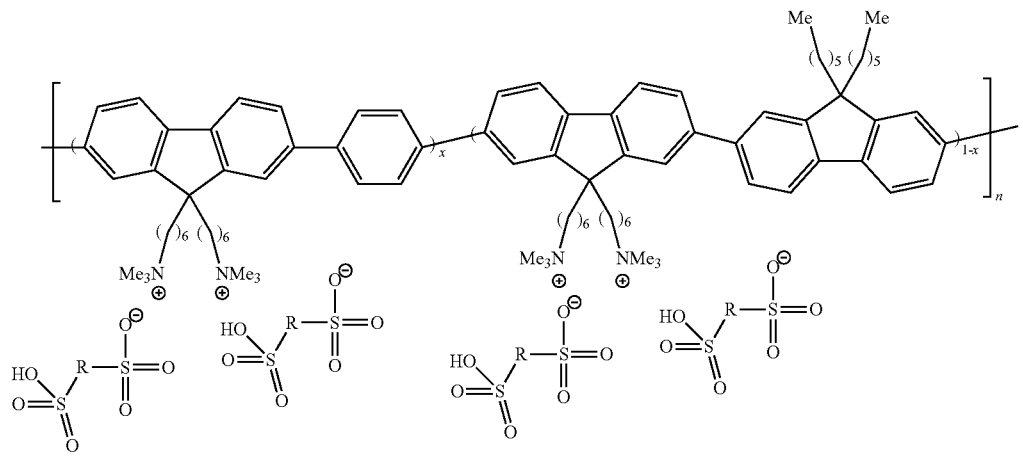

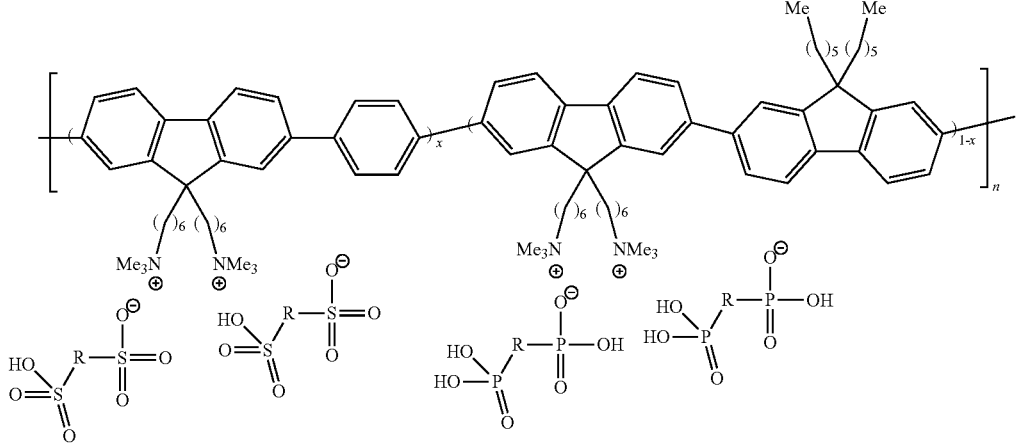

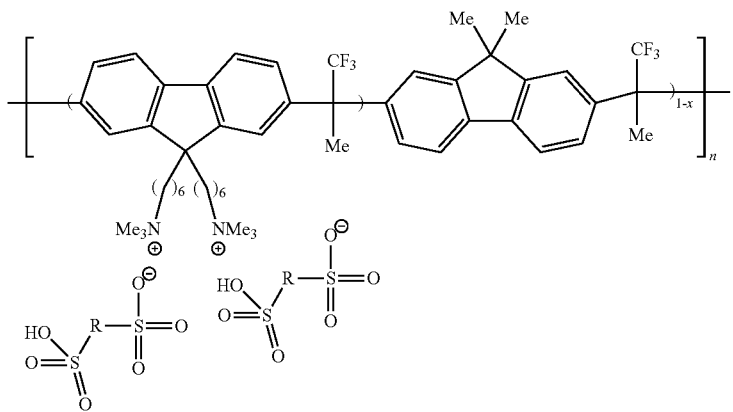

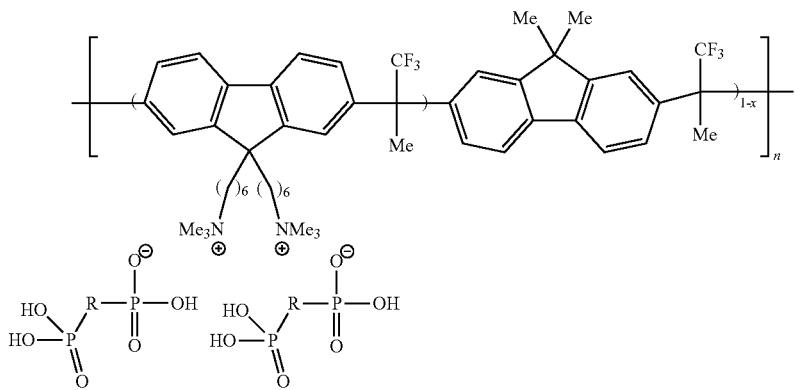

wherein each R independently is $CH_2$, $(CH_2)_3$, $CF_2$, $C(Me)(OH)$, or any combination thereof; n is one or more (such as 1 or higher, or 1 to 50, or 1 to 25, or 1 to 12); and x ranges from 0 to 0.99.

The polymer electrolytes discussed above can be used to form polymer electrolyte membranes in fuel cell embodiments. In some embodiments the polymer electrolytes can be prepared as a thin film that can be used as the membrane in a fuel cell. Devices comprising the disclosed polymer electrolytes can include fuel cells that comprise electrodes (e.g., an anode and a cathode), the polymer electrolyte membrane, and an optional ionomer component. The optional ionomer component can be used in fuel cell embodiments that are intended to operate at higher temperatures, such as at temperatures above 200° C. Even at such high temperatures, fuel cells comprising the disclosed polymer electrolyte membranes and the ionomer can still exhibit peak power density values. Suitable ionomers can include certain polystyrene polymers comprising a phosphonate group and further comprising one or more halogen atoms, such as fluorine. In particular disclosed embodiments, the ionomer is a phosphonated and fluorinated polystyrene, such as is illustrated below.

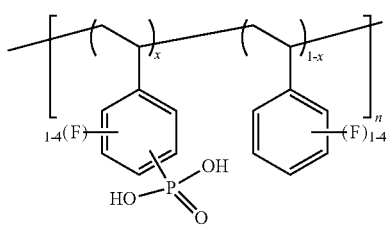

In particular disclosed embodiments, the ionomer is as illustrated below:

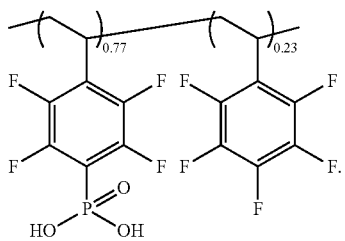

In some embodiments, highly fluorinated phosphonated polymers can be synthesized via acid-catalyzed Friedel-Craft reaction, flowed by classical nucleophilic aromatic substitute Michaelis-Arbuzov reaction of pentafluorostyrene with tris(trimethylsilyl)phosphite. A representative method is illustrated below in Scheme 1. A high degree of fluorination of the polymers may be beneficial to remove electrode flooding issues for potential non-PGM catalysts.

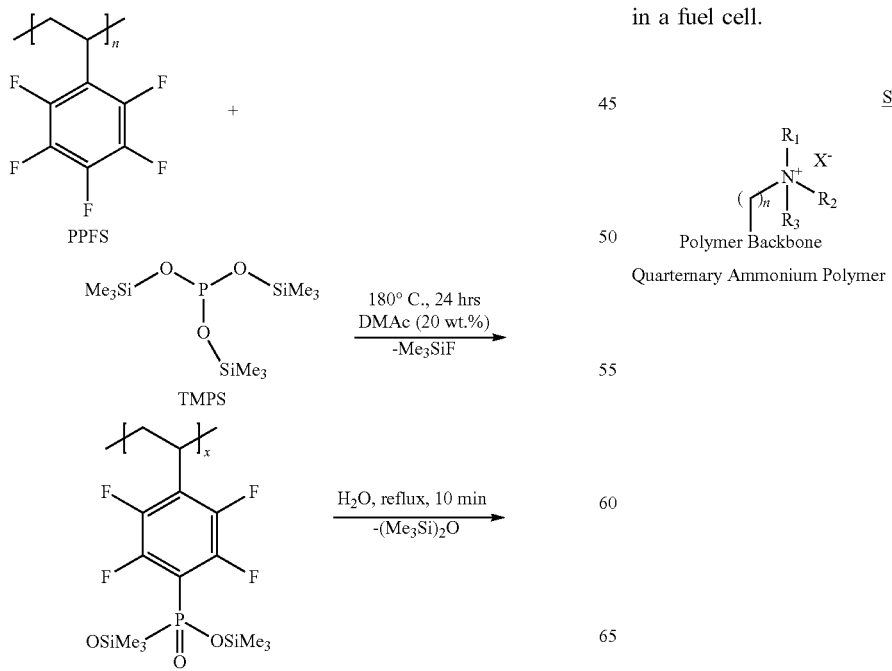

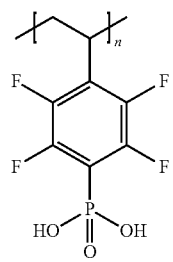

IV. Methods of Making Polymers and Polymer Electrolytes

The polymers embodiments described herein, such as the cationic group-functionalized polymers, can be made using chemical reactions that would be recognized by a person of ordinary skill in the art with the benefit of the present disclosure. In some embodiments, Diels-Alder chemistry can be used, such as that described by Hibbs, M. R. Fujomoto, C. H. Cornelius, C. J., *Macromolecules* 42, 8316-8321 (2009), the relevant portion of which is incorporated herein by reference.

A representative schematic for doping the polymer materials disclosed herein is provided below in Scheme 2. In particular embodiments, doping can be achieved by, for example, immersing the selected cationic-functionalized polymer in a solution (e.g., an aqueous solution, an alcohol solution, or a mixture thereof) of a polyacid at room temperature for a period of time, such as from 1 hour to 48 hours, or 2 hours to 48 hours, or 4 hours to 24 hours. Excess polyacid can be removed by blot drying. In some disclosed embodiments, the cationic-functionalized polymer, in membrane form, is immersed in a pre-made aqueous bath solution containing the polyacid for 10 or more hours. The membrane is then taken out of the bath and excess liquid is blotted away. The membrane is then transferred to a convention oven set at 80° C. for 4 hours or more prior to use in a fuel cell.

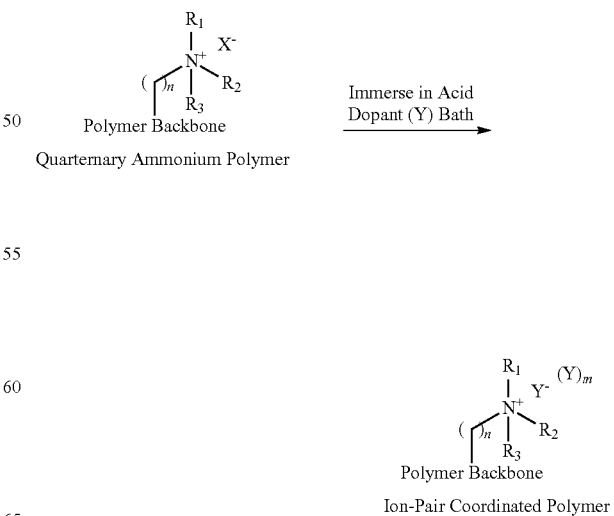

In some embodiments, the doping level (in units of polyacid groups per ammonium), denoted as m in $(Y)_m$ in Scheme 2 can range from 1-30, such as from 1 to 20, or 2 to 15, or 2 to 10, or 5 to 10, or 10 to 20. With reference to Scheme 2, the "X" variable can be a hydroxide group in particular disclosed embodiments, as described below. The dopant composition can comprise a single dopant species or combination of various dopant species in various doping levels (e.g., 5:5 volume of phosphoric acid and diacid, or 5:5 volume of different diacids and/or triacids). The dopant concentration can vary between 10-99 wt %, depending on the solubility of the dopant, such as from 60-90 wt %, wherein the concentration is calculated according to the formula dopant concentration: (mass of diacid)/(mass of diacid+mass of solvent).

One example of an embodiment of a method for making the disclosed polymers concerns using an irreversible Diels-Alder reaction between tetramethylbis(cyclopentadienone) and 1,4-diethynylbenzene as illustrated below in Scheme 3. The resulting polymer formed between these components is then brominated using N-bromosuccinimide (NBS) and benzoyl peroxide (BPO) at 85° C., converting a fraction of the benzyl positions into bromomethyl groups.

Scheme 3

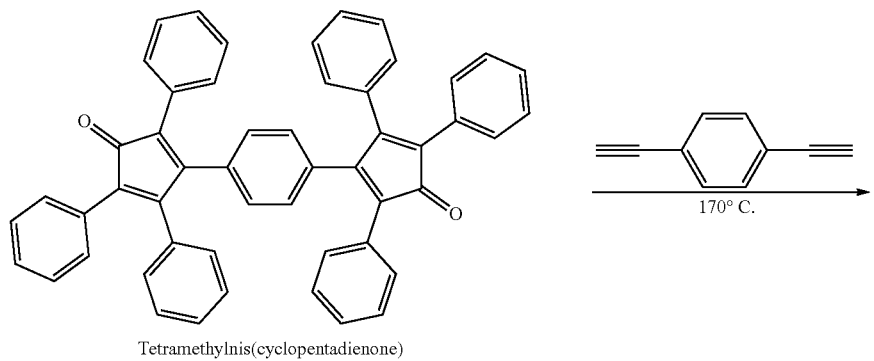

Tetramethylnis(cyclopentadienone)

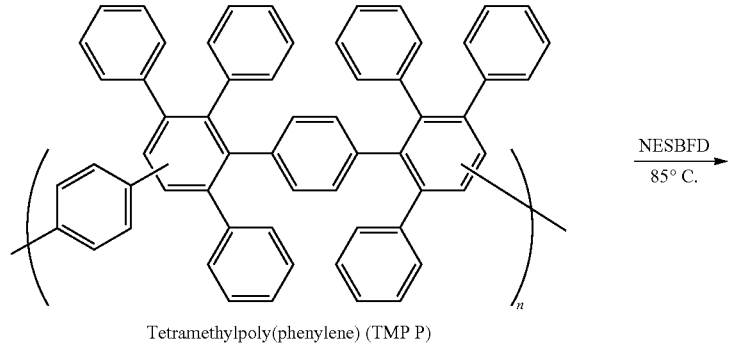

Tetramethylpoly(phenylene) (TMP P)

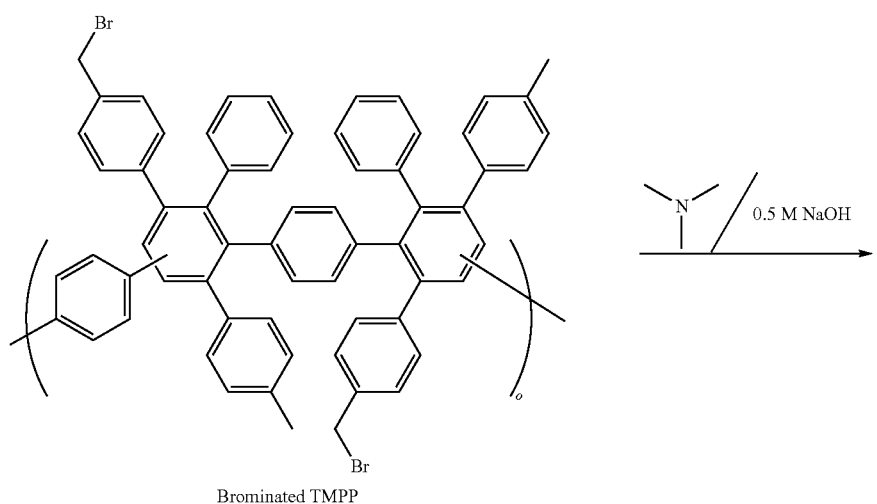

Brominated TMPP

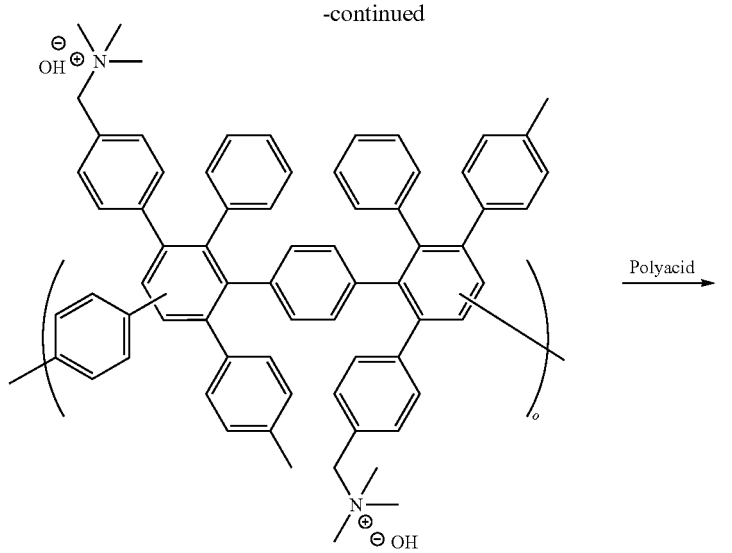

Quarternary ammonium tethered poly(phenylene) (QAPOH)

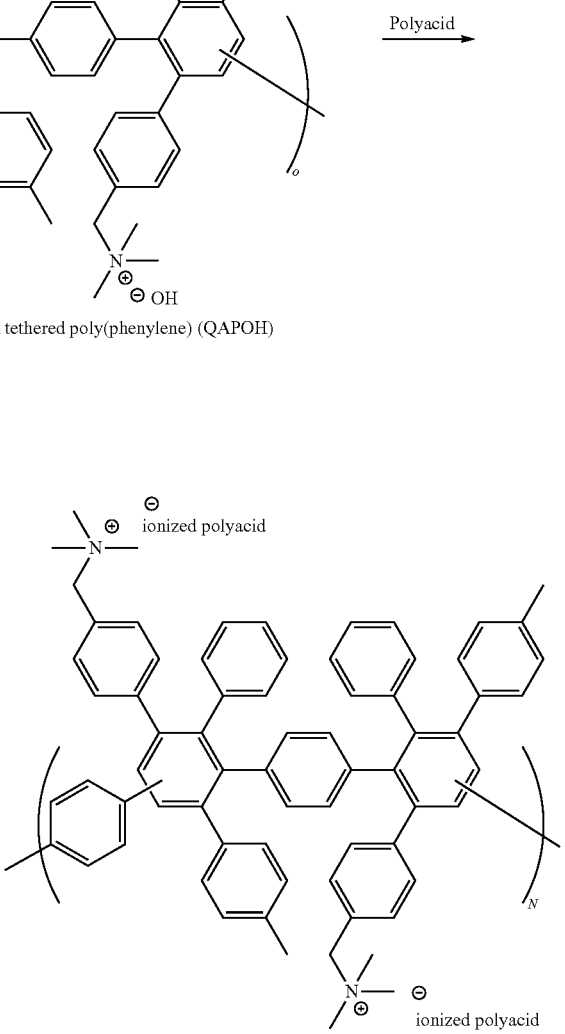

The resultant functionalized polymer is then cast into films from chloroform. The films are then soaked in a 5 M solution of aqueous trimethyl amine to generate quaternary amine/OH membranes ("QAPOH" membranes wherein the OH component is an example of the "X" variable in Scheme 2 above). Different length amine tethers can be synthesized too by selecting appropriate reagents. For example, the amine tether can be an aliphatic chain, particularly a $C_{1-10}$ alkyl chain, more typically a $C_{1-5}$ alkyl chain. The QAPOH membranes are then immersed in an 85 wt % aqueous solution of diphosphoric acid or disulfonic acid at room temperature for 2 hours. The diacid-doped QAPOH membranes can be used after removing the excess acid on the membrane surface by blot drying.

A representative synthesis of a quaternary ammonium tethered poly(styrene) hydroxide (QASOH) polymer comprises using nucleophilic substitution of triethylamine (TEA) and 4-fluorophenethylamine onto poly(vinylbenzyl chloride) (PS-bzCl), as illustrated below in Scheme 4.

Scheme 4

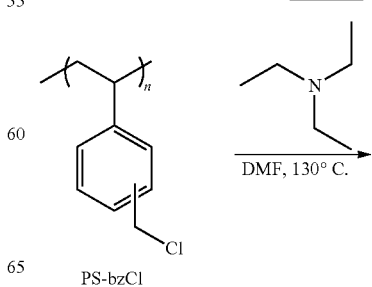

PS-bzCl

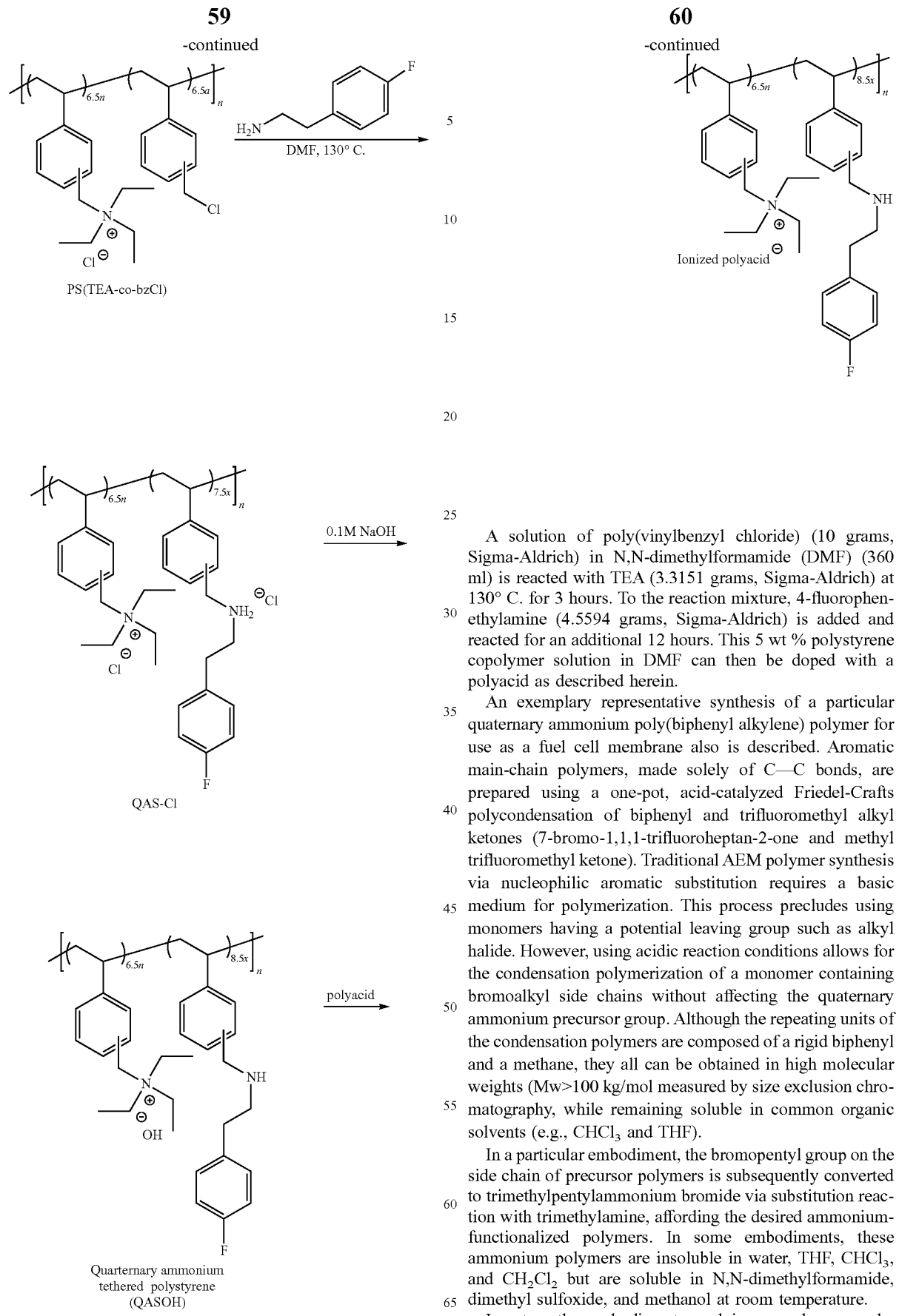

A solution of poly(vinylbenzyl chloride) (10 grams, Sigma-Aldrich) in N,N-dimethylformamide (DMF) (360 ml) is reacted with TEA (3.3151 grams, Sigma-Aldrich) at 130° C. for 3 hours. To the reaction mixture, 4-fluorophenethylamine (4.5594 grams, Sigma-Aldrich) is added and reacted for an additional 12 hours. This 5 wt % polystyrene copolymer solution in DMF can then be doped with a polyacid as described herein.

An exemplary representative synthesis of a particular quaternary ammonium poly(biphenyl alkylene) polymer for use as a fuel cell membrane also is described. Aromatic main-chain polymers, made solely of C—C bonds, are prepared using a one-pot, acid-catalyzed Friedel-Crafts polycondensation of biphenyl and trifluoromethyl alkyl ketones (7-bromo-1,1,1-trifluoroheptan-2-one and methyl trifluoromethyl ketone). Traditional AEM polymer synthesis via nucleophilic aromatic substitution requires a basic medium for polymerization. This process precludes using monomers having a potential leaving group such as alkyl halide. However, using acidic reaction conditions allows for the condensation polymerization of a monomer containing bromoalkyl side chains without affecting the quaternary ammonium precursor group. Although the repeating units of the condensation polymers are composed of a rigid biphenyl and a methane, they all can be obtained in high molecular weights (Mw>100 kg/mol measured by size exclusion chromatography, while remaining soluble in common organic solvents (e.g., $CHCl_3$ and THF).

In a particular embodiment, the bromopentyl group on the side chain of precursor polymers is subsequently converted to trimethylpentylammonium bromide via substitution reaction with trimethylamine, affording the desired ammonium-functionalized polymers. In some embodiments, these ammonium polymers are insoluble in water, THF, $CHCl_3$, and $CH_2Cl_2$ but are soluble in N,N-dimethylformamide, dimethyl sulfoxide, and methanol at room temperature.

In yet another embodiment, a polyionene polymer can be made using the method illustrated below in Scheme 5.

Scheme 5

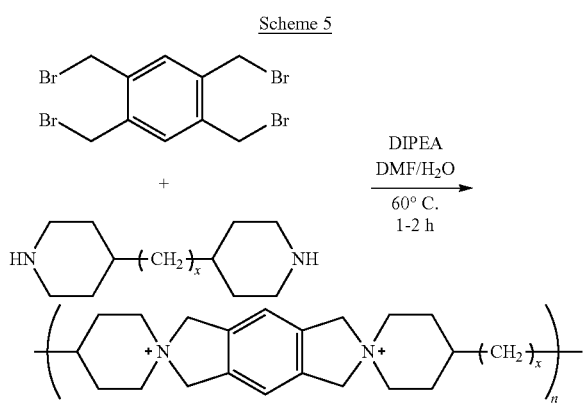

In other embodiments, a poly(fluorene) polymer can be made using a method as illustrated in Scheme 6.

Scheme 6

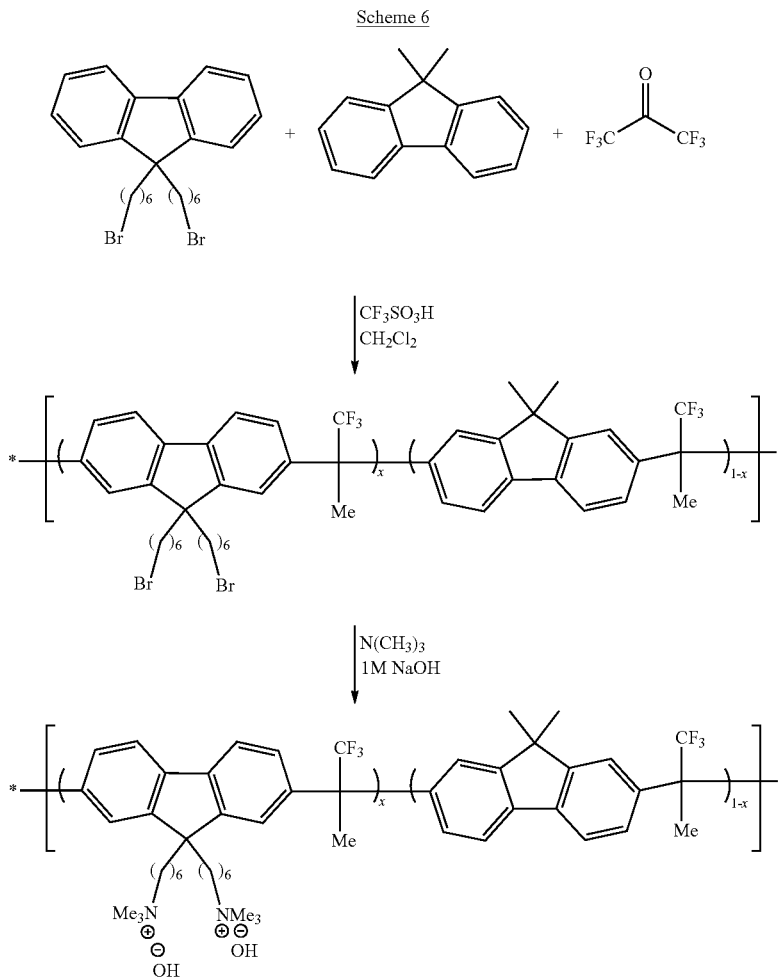

The chemical structures of the polymers described herein can be analyzed by $^1$H and $^{19}$F NMR spectroscopies to determine and/or confirm structural features. For example, in some embodiments, comparing the integral ratio of trimethylammonium protons at the corresponding chemical shift and aromatic proton peaks at the corresponding chemical shift can indicate that the quaternization reaction results in quantitative conversion. In some embodiments, two CF$_3$ groups in the polymer chain also can display slightly different $^{19}$F NMR chemical shifts, which allows convenient estimation of the ratio of repeating units in the polymers. NMR spectroscopic analysis also can be used to confirm the ratio of two different repeating units of the polymers, such as "x" and "x-1" in certain formulas illustrated above, and in some embodiments this matches well with the monomer feed ratio added during polymerization. Thus, the ion exchange capacities of the membranes can be controlled by adjusting the feed ratio of the two ketone monomers in the polymerization.

Crosslinked polymers also can be used. Such polymers can provide certain benefits for use as a membrane for fuel cells. For example, at elevated fuel cell operating temperatures certain polymers can begin to dissolve in acids, such as phosphoric acid. Crosslinking can help prevent this result. Moreover, mechanical properties and dimensional stability can be enhanced by using crosslinkable polymer electrolytes. Accordingly, crosslinked polymers comprising dopants disclosed herein also are within the scope of the present disclosure. The degree of crosslinking can be controlled by reaction time. The present disclosure concerns embodiments wherein the number of cationic functional groups present in the polymer and the degree of crosslinking used with the polymer is modified. In general, crosslinking has been shown to improve proton conductivity while reducing water uptake, an uncommon trend in polymer electrolytes where water promotes proton conduction. Certain disclosed embodiments concern membrane testing in fuel cells where performance and durability of polymers with accelerated relative humidity cycling were compared to Nafion®.

In general, proton conductivity and water uptake of PEMs increase with increasing ion exchange capacity (IEC). This is somewhat intuitive as cationic groups responsible for proton conduction are hydrophilic and their increased abundance usually leads to both higher conductivity and water uptake. However, many properties are coupled in PEMs, and hydration typically has a significant impact on other PEM properties. This limits the ability to create higher performing membranes simply by increasing the number of hydrophilic functional groups alone. Specific PEM properties can exhibit changes greater than an order of magnitude in the presence of water. In particular, mechanical properties of PEMs may be dependent on hydration. In some embodiments, crosslinking is used to enhance the mechanical properties of polyacid-doped cationic polymers by lowering the phosphoric acid content and increasing phosphoric acid resistance.

There are several methods that can be used to produce suitable crosslinked polymers according to the present disclosure. For example, polymers may be crosslinked using thermal crosslinking, photo crosslinking, radiation crosslinking, crosslinkable intermediates, and/or using composite systems that comprise a polymer electrolyte in combination with a crosslinking polymer or monomer. In particular embodiments, crosslinking is achieved by adding base functionality to the polymers (ionically crosslinking) or using a crosslinking agent (covalent crosslinking, often through the acid group functionality). Ionically crosslinked systems can, in some embodiments, be more flexible and less processing limited than covalently crosslinked systems. In covalently crosslinked systems, sulfonic acid groups or other functional groups have been used to create crosslinks.

One embodiment of a method for thermally crosslinking a sulfonated poly(sulfide sulfone) is illustrated below in Scheme 7 and is provided solely as an example that can be applied in making polymers described herein.

Scheme 7

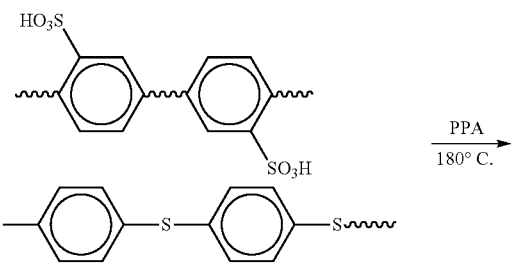

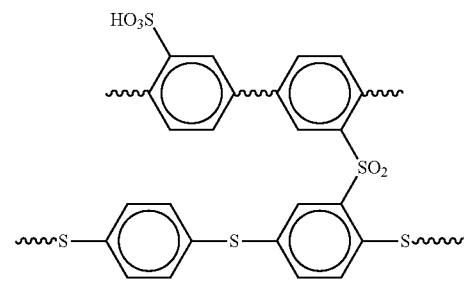

Heating the sulfonated poly(sulfide sulfone) at 180° C. is sufficient to crosslink this polymer.

Certain disclosed embodiments concern using ethynyl group-containing, crosslinkable PEMs. These compounds can be thermally crosslinked as well. For example, fluorinated aromatic polyethers comprising pendant ethynyl groups can be thermally crosslinked, as can be accomplished for the following polymeric system

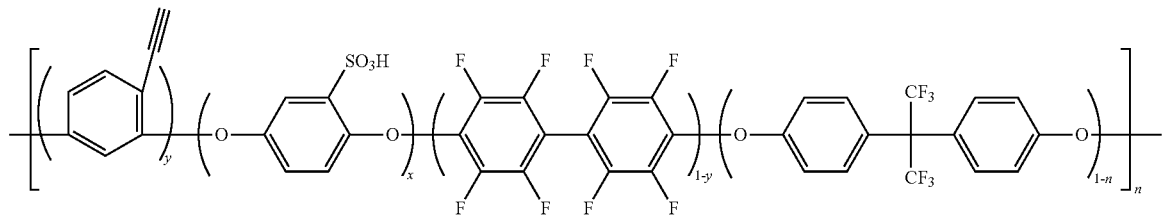

This thermal crosslinking approach does not result in lost cationic functional group sites and allows crosslinking effects to be probed independently without sacrificing functional group content or impacting chemical structure of the polymer chains, except for the ethynyl groups.

Polymers comprising photoactive moieties can be crosslinked by irradiation at the appropriate wavelength or wavelengths. For example, compounds comprising azide functional groups can be crosslinked by UV irradiation, such as is illustrated in example Scheme 8 below.

Scheme 8

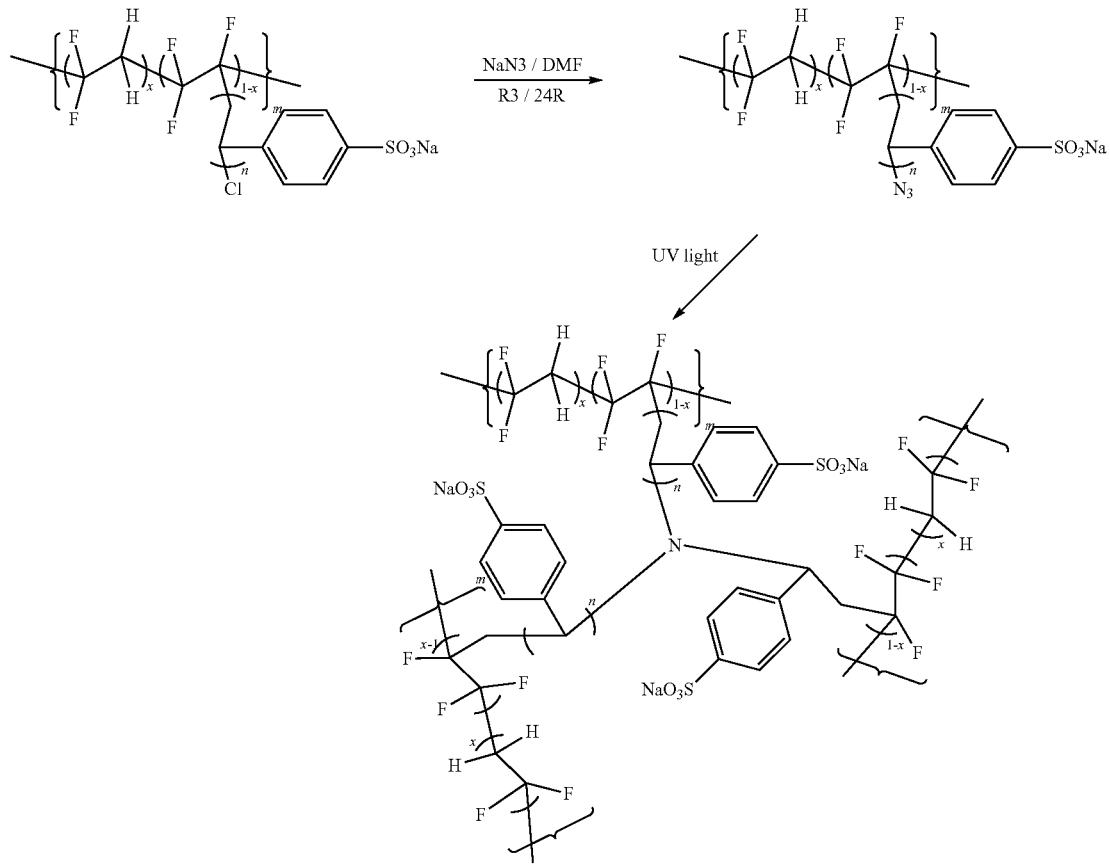

Polyether sulfones have been crosslinked using benzophenone as a photoinitiator. This approach is exemplified by Scheme 9.

Scheme 9

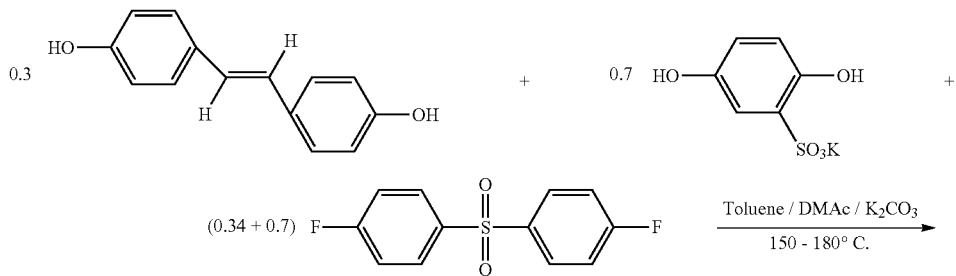

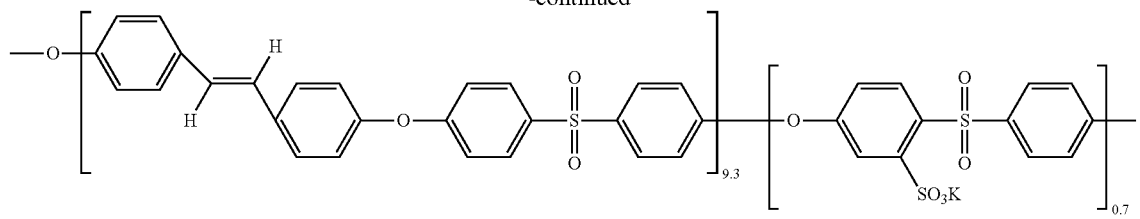

-continued

In this example, the crosslinkable polyether sulfone is fabricated from a 15% (w/v) DMSO solution with benzophenone (1 wt % PES 70 solid content) as a photo-initiator. The polymer solution is poured on a glass plate and the thickness of the film is controlled using a doctor blade. To obtain the crosslinked membrane, the polymer solution is UV irradiated (350 nm, 400 W) for 30 minutes under a nitrogen atmosphere. The UV-irradiated membrane is dried at 60° C. under reduced pressure for 30 hours. The membrane is placed in 10% HCl solution at 50° C. for 12 hours and washed thoroughly with de-ionized water several times to obtain crosslinked PES 70 membranes. This process can be adapted to make polymer embodiments described herein.

Radiation crosslinking also can be accomplished as demonstrated for ETFE films. An ETFE base film can be irradiated using f-ray irradiation at a dose rate of 25 kGy/hour under argon gas at room temperature. After crosslinking, the samples can be heat-treated in a vacuum oven at 80° C. for 48 hours to eliminate the residue radicals.

Crosslinked polymers suitable for use as fuel cell membrane materials also can be produced using intermediates comprising appropriate functional groups. Crosslinkable functional groups include, by way of example, and without limitation, polyols, such as glycols, and silanes. Polyol crosslinking is exemplified by Scheme 10.

Scheme 10

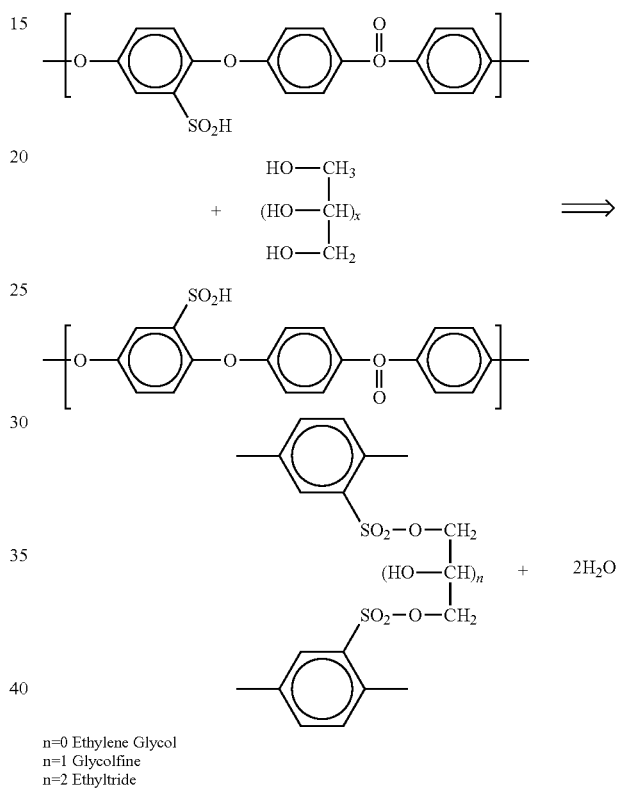

n=0 Ethylene Glycol
n=1 Glycolfine
n=2 Ethyltride

Crosslinking using silane groups is exemplified by the process illustrated in Scheme 11.

Scheme 11

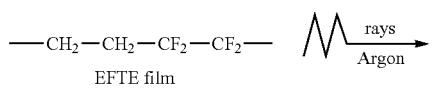

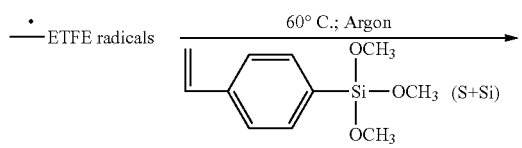

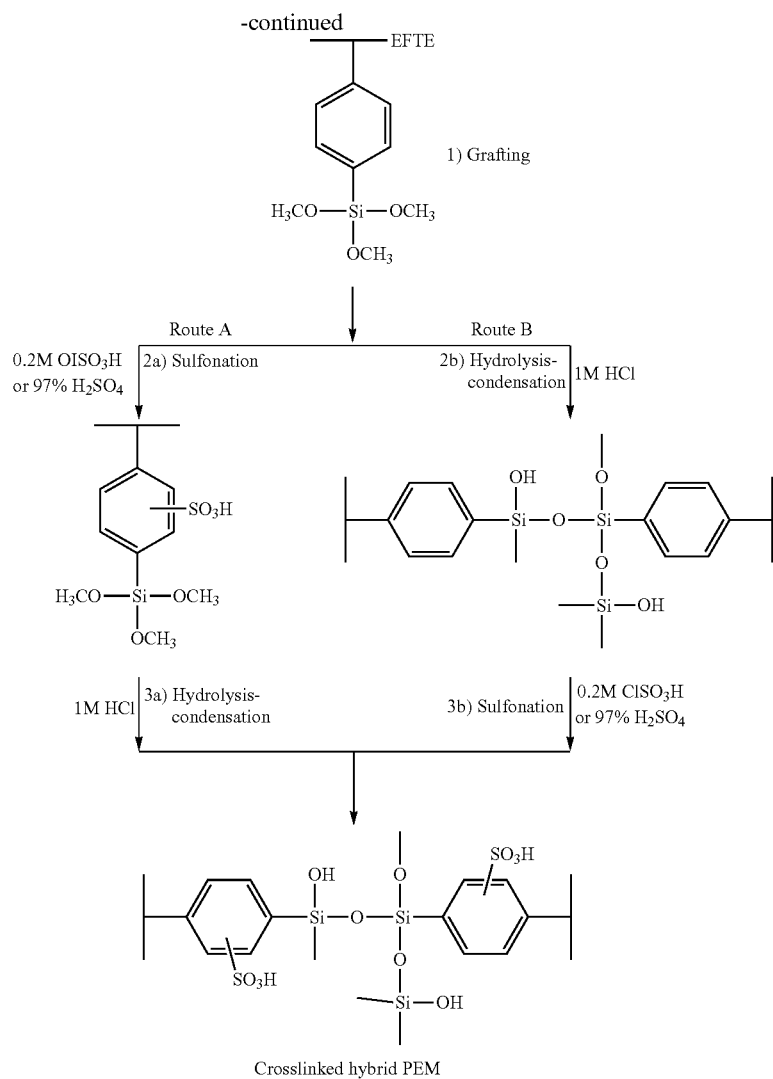
Crosslinkable monomers also can be added to a polymeric electrolyte solution, followed by crosslinking, to produce crosslinked polymers suitable for the present disclosure. An exemplary process is illustrated by Scheme 12.
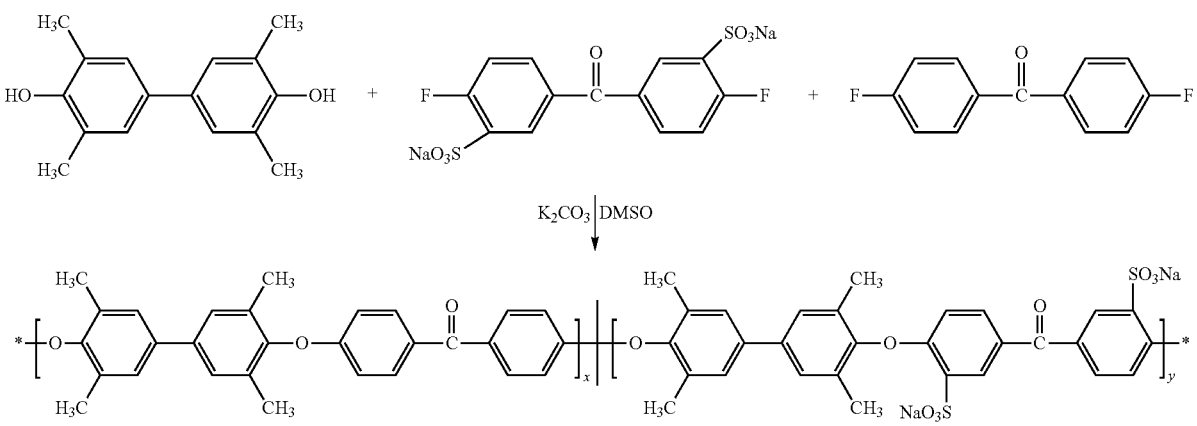
The preparation and the chemical structure of SPEEK -continued

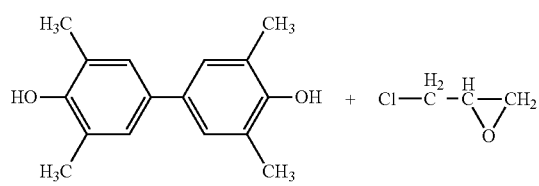 + 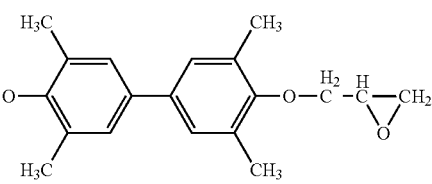

The preparation and the chemical structure of TMBP

Wholly aromatic, partially fluorinated polymer electrolytes with crosslinkable end groups (ESF-BPs) can be made. Covalently crosslinkable end-groups are included in this polymerization.

V. Methods of Use

The present disclosure also describes methods of using the disclosed doped polymer electrolytes. In some embodiments, the doped polymer electrolytes are used to form polymer membranes for use in fuel cells, such as fuel cells used in automobiles or other applications. In particular disclosed embodiments, the doped polymer electrolytes are used to form membranes for fuel cells that operate at high temperatures, such as at temperatures ranging from 80° C. to 200° C. or higher. The doped polymer electrolytes exhibit superior non-leaching behavior and further maintain good conductivity and peak power performance even when utilized at temperatures of 200° C. or higher.

Figure 1:
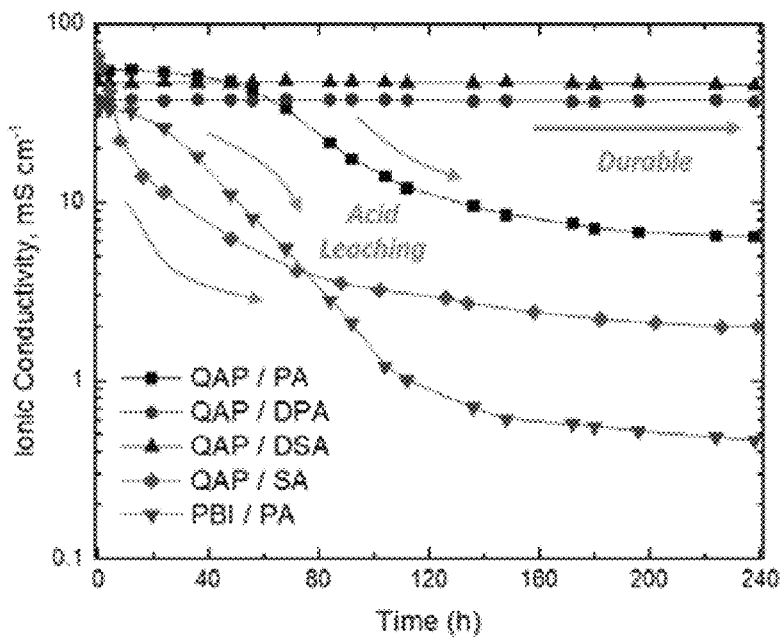
FIG. 1 is a graph of ionic conductivity (mS/cm) as a function of time (hours), which illustrates that representative polyacid-doped polymer electrolyte embodiments exhibit ionic conductivity stability at 80° C., at 60% relative humidity (RH), whereas electrolytes doped with phosphoric acid and sulfuric acid did not exhibit ionic conductivity stability under the same conditions.
Figure 2:
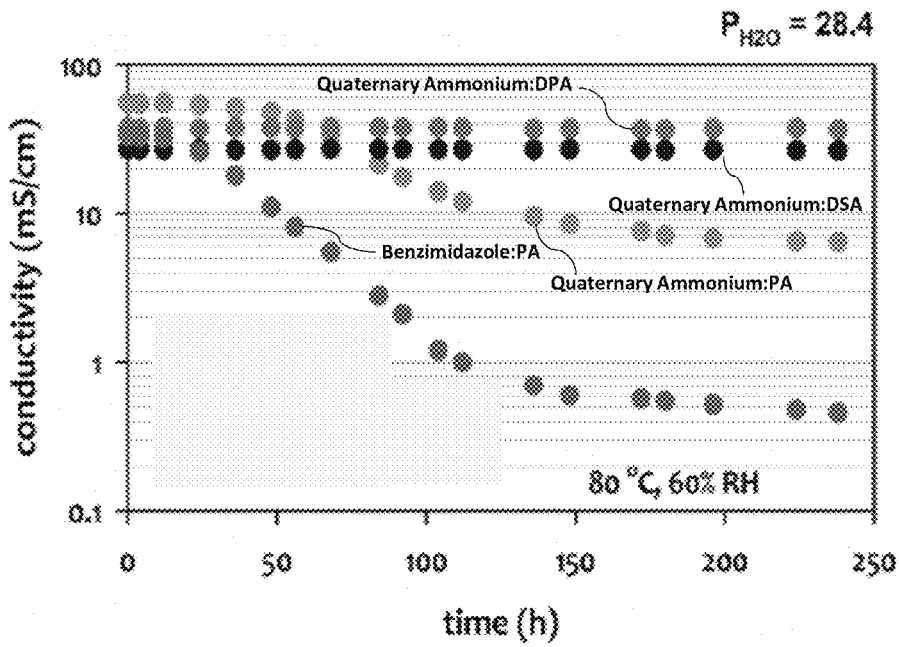
FIG. 2 is a graph of ionic conductivity (mS/cm) as a function of time (hours), which illustrates that representative polyacid-doped polymer electrolyte embodiments exhibit ionic conductivity stability at 80° C., at 60% RH, whereas electrolytes doped with phosphoric acid did not exhibit ionic conductivity stability under the same conditions.
Figure 3:
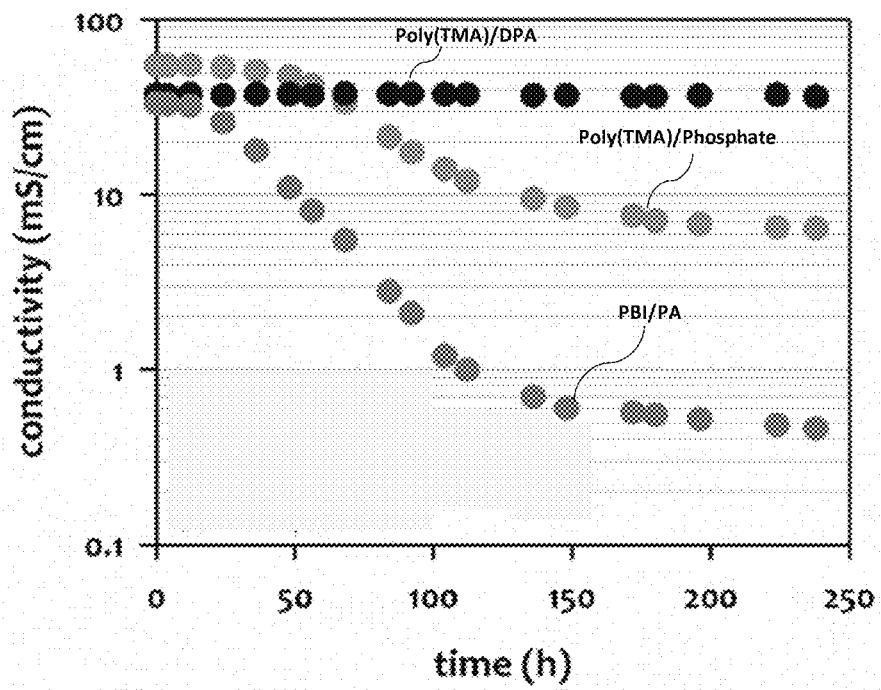
FIG. 3 is a graph of ionic conductivity (mS/cm) as a function of time (hours), which illustrates that a representative polyacid-doped polymer electrolyte embodiment exhibits ionic conductivity stability at 80° C., at 60% RH, whereas electrolytes doped with phosphoric acid did not exhibit ionic conductivity stability under the same conditions.
Figure 4:
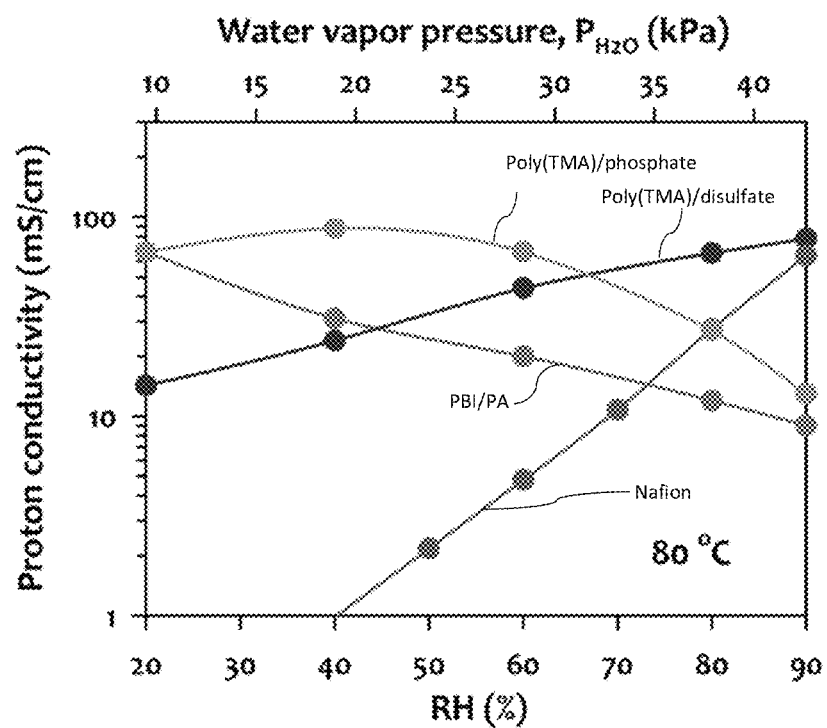
FIG. 4 is a graph of proton conductivity as a function of RH (%) and water vapor pressure (kPa), which illustrates that a polymer electrolyte membrane doped with 1,3-propanedisulfate ("poly(TMA)/disulfate") exhibits superior water tolerance and proton conductivity as compared with a polybenzimidazole-phosphoric acid ("PBI/PA") membrane, a Nafion® membrane, and a polymer membrane doped with phosphate ("poly(TMA)/phosphate").
Figure 5:
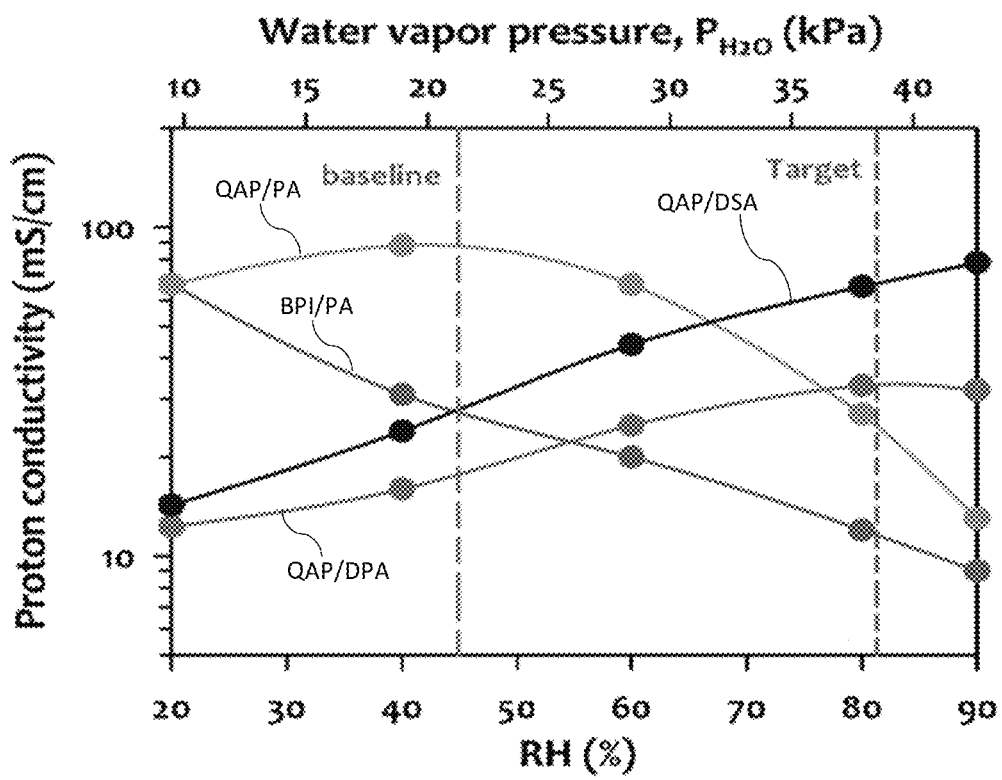
FIG. 5 is a graph of proton conductivity as a function of RH (%) and water vapor pressure (kPa), which illustrates that polymer electrolyte membranes doped with polyacid embodiments described herein ("QAP/DPA" and "QAP/

In some embodiments, polyacid-doped polymer electrolytes, such as polymers doped with polyphosphonic or polysulfonic acid species, exhibit superior non-leaching behavior as compared to polymer electrolytes comprising sulfuric acid (SA) or phosphoric acid (PA). For example, as illustrated in FIG. 1, ammonium-containing polymer electrolyte embodiments that were doped with a diphosphonic acid ("QAP/DPA") and a disulfonic acid ("QAP/DSA") exhibited steady ionic conductivity for long periods of time under aggressive conditions (80° C., 60% RH), while QAPs doped with sulfuric acid ("QAP/SA") or phosphoric acid ("QAP/PA)" showed substantial leaching behavior through critical losses in ionic conductivities. Additional results shown in FIG. 2 also illustrate that both diphosphonic acid-doped and disulfonic acid-doped polymer electrolytes exhibit consistent conductivity values after long periods of time. In this example, etidronic acid and 1,3-propanedisulfonic acid were used as the dopants. Additionally, an embodiment using polybenzimidizole doped with phosphoric acid ("PBI/PA") exhibited similar losses in ionic conductivity to the PA-doped cationic-functionalized polymer (see FIG. 3). With reference to FIG. 3, 1-hydroxyethane-1,1-diyl)bis(phosphonic acid) was used as the dopant for the poly(TMA)/DPA embodiment. Similar results are illustrated in FIGS. 4 and 5, which further show that the polyacid doped polymer electrolytes of the present disclosure exhibit good proton conductivity even at high water vapor pressure values. With reference to FIG. 4, 1,3-propanedisulfonic acid was used as the dopant for the poly (TMA)/disulfate embodiment and with reference to FIG. 5, etidronic acid and 1,3-propanedisulfonic acid were used as the dopants. Additional results illustrating the disclosed doped polymer electrolytes' ability to maintain performance at high temperatures are provided by FIG. 6. As illustrated in FIG. 6, disulfonic acid-doped and diphosphonic acid-doped polymer embodiments out-perform the corresponding phosphoric acid-doped polymer embodiment at temperatures ranging from 80° C. to 200° C.

While the doped polymer electrolytes disclosed herein are well suited for fuel cells in automobiles, they also can be used in any fuel cell requiring a polymer electrolyte. A representative fuel cell comprising a membrane comprising a doped polymer electrolyte according to the present disclosure is illustrated in FIG. 7. In this representative embodiment, fuel cell 700 comprises anode 702 and cathode 704. Between anode 702 and cathode 704 is the doped polymer electrolyte in the form of membrane 706. Current collectors 708 and 710 are fluidly connected to anode 702 and cathode 704, respectively. As disclosed herein the doped polymer electrolyte membrane can be used in combination with a phosphonated ionomer component. A representative example of a fuel cell comprising a disclosed doped polymer electrolyte and such an ionomer is illustrated in FIG. 8. In this representative example, fuel cell 800 comprises anode 802, cathode 804, doped polymer membrane 806, ionomer 808, and current collectors 810 and 812. While in FIG. 8, Ionomer 808 is illustrated as two separate layers that is associated with anode 802 and cathode 804, respectively, the ionomer need not be provided as an ionomer layer and can instead be embedded or otherwise incorporated in the anode and/or the cathode.

VI. Examples

The following examples are provided to illustrate certain specific features of disclosed embodiments. A person of ordinary skill in the art will appreciate that the scope of the present disclosure is not limited to these particular exemplary features.

Example 1

In this example, characterization of ion-pair doped polymer embodiments was carried out and it was determined that acid retention can be further increased by increasing the molecular weight of anions. FIG. 9 shows the $^{31}P$ NMR results for the interaction between tetramethyl ammonium (TMA) and diphosphate (DPA) at two mole ratios, namely 1:1 and 1:5, which is equivalent mole ratio of 1:2 and 1:10 for the TMA and phosphate. The $^{31}P$ chemical peak for the pure diphosphate (DPA) at 18 ppm shifted to 24.5 and 22 ppm for the 1:1 and 1:5 TMA$^+$-DPA, respectively. Although the NMR peak shift for DPA-TMA system cannot directly be compared with that of phosphate-TMA due to the additional electronic structure change by the P—C bond, relative peak shift towards the pure anion species suggests that the interaction of the DPA-TMA is comparable to that of phosphate-TMA.

To determine the molecular weight (entropic) effect on water tolerance, the proton conductivity of DPA or phosphate coordinated TMA functionalized polymers and PA-PBI were measured at 80° C. and 60% RH ($P_{H2O}$=28.4 kPa)

as a function of time (see FIG. 3). The proton conductivity of PA-doped PBI (acid-base) rapidly decreases with time due to significant acid leaching, while the proton conductivity of the TMA$^+$-phosphate ion-pair coordinated membrane exhibits better water tolerance, albeit with a gradual decrease over time. In contrast, the proton conductivity of two TMA$^+$-DPA ion-pair coordinated systems is stable over 250 hours. These results indicate that utilizing higher molecular weight of the DPA can further improve water tolerance without sacrificing proton conductivity.

Example 2

In this example, exemplary levels of doping with certain polyacids were evaluated. In some embodiments, DSAs exhibited a minimum RH ca. 20% for proton conduction. In some embodiments, DSA-doped polymers (wherein the DSA is 1,3-propanedisulfonic acid) may give less poisoning for oxygen reduction reaction (ORR) catalysts as illustrated in FIG. 10.

Example 3

In this example, proton conductivity of representative doped polymer electrolytes was evaluated. The strong interaction energy between a diacid and the cationic functional group(s) in the polymer not only provides better water tolerance, but also provide high proton conductivity at a wide range of temperatures. FIG. 11 provides a schematic illustration of proton conductivity behaviors of particular fuel cell systems as a function of temperature. The Nafion® electrolyte used in low-temperature polymer electrolyte membrane fuel cells (LT-PEMFCs) has some advantages over the PA-PBI electrolytes used in high-temperature polymer electrolyte membrane fuel cells (HT-PEMFCs) in that it is more efficient in proton conduction via water, it does not exhibit corrosive acid leaching, and it is electrochemically inert. However, water-mediated proton conduction of Nafion® also causes issues, such as low catalyst activity at low operating temperatures, accelerated component degradations during dry-wet cycling, and electrode flooding, particularly, when used more hydrophilic non-PGM catalysts. In contrast, the doped polymer electrolytes disclosed herein have balanced low and high temperature conductivity as proton conduction can occur through the mixed phase of water and phosphate. At low temperature (<100° C.), water generated from the cathode reaction primarily contribute the proton conduction, while at high temperatures (>100° C.), phosphate anions predominantly contribute the proton conduction. Furthermore, the strong interaction between the ion-pairs prevents phosphate evaporation/leaching at high temperature and allows the fuel cell to operate a high temperatures, such as 200° C. or higher and even up to 250° C.

Example 4

In this example, the amount of phosphate incorporated in a fuel cell is examined. Since proton conductivity at temperatures ranging from 80 to 150° C. can be enhanced by water-mediated phase, the amount of phosphate needed is less. For a PA-PBI system, an average of 12 PA molecules are incorporated per imidazole, which is used at high concentrations (i.e., 6.5 mmol/g). For a phosphate-TMA system, an average of 14 PA molecules are incorporated with the ammonium, which is used at a concentration of only 1.7 mmol/g for equivalent resistance at 150° C. As a result, the phosphate content in the proposed system is 3 times lower than PA in the PA-PBI, which can have at least two positive impacts on the fuel cell performance, such as membrane mechanical properties and PA/phosphate poisoning and mass transport. With respect to membrane mechanical properties, the high PA content of the PA-PBI can cause the PA-doped membranes to become a gel, which is susceptible to mechanical failure. In contrast, doped polymer membrane embodiments disclosed herein are tough and retain the mechanical integrity. With respect to PA/phosphate poisoning and mass transport, low amounts of phosphate incorporation in the disclosed doped polymers are advantageous over the high PA-PBI system in terms of ORR activity and O$_2$ diffusion (see FIG. 12). This is particularly desirable for low PGM and non-PGM oxygen reduction reaction catalysts, which can suffer from PA poisoning and electrode flooding by the high level of PA-doping of PA-PBI system.

Example 5

FIG. 13 shows the water tolerance of a HT-PEMFC employing poly(TMA)-phosphate ion-pair coordinated polymers during temperature cycling from 80 to 160° C. under a constant water partial vapor pressure (P$_{H2O}$) of 9.7 kPa. The voltage of the commercial PA-doped PBI (Celtec®) MEA at a constant current density of 0.15 A cm-2 and 90 kPa backpressure decreased from 0.78 V to 0 V within only 70 cycles. In contrast, the performance of a representative doped polymer electrolyte according to the present disclosure was relatively stable, with a voltage decay at 160° C. of only −0.39 mV/cycle. The disclosed doped polymer electrolytes also can exhibit similar water tolerance (e.g., <−0.4 μV/cycle under the constant P$_{H2O}$ of 42.6 kPa, which is equivalent to 90% RH at 80° C.). The >3× greater water tolerance enables cold start-up of fuel cells comprising the doped polymer electrolyte, as well as running high current density conditions at <100° C. (without external humidification). In some embodiments, durability can be <−0.4 μV/cycle after >1000 thermal cycles of 80-150° C. at P$_{H2O}$ of 42.6 kPa.

Example 6

In this example, membrane areal specific resistance (ASR) is evaluated. It has been demonstrated that the ASR of a poly(TMA)-phosphate ion-pair membrane (120 μm thick) in MEA was 0.18 Ωcm$^2$ at 160° C. Doped polymer electrolyte embodiments of the present disclosure can provide an ASR of 0.05 E cm$^2$ at 150° C. and 0.1 Ωcm$^2$ at 80° C. as the robust thin diacid-cationic group coordinated composite membranes are prepared with thickness of <40 μm and similar proton conductivity.

Fuel cell peak power density also is evaluated. The previous H$_2$/O$_2$ peak power density of the HT-PEMFC employing poly(TMA)-phosphate ion-pair membrane was 120 mW/cm$^2$ at 120° C. and 800 mW/cm$^2$ at 180° C. While the fuel cell performance at 180° C. is comparable to the performance of PA-doped PBI HT-PEMFC and can be used in practical systems, the fuel cell performance at 120° C. must be improved for practical use in fuel cells. For example, a fuel cell performance study of quaternized polymers under alkaline high pH conditions indicated that undesirable phenyl group adsorption on hydrogen oxidation catalysts adversely impact the fuel cell performance. Extensive efforts on improving the alkaline membrane fuel cell performance elucidated less phenyl group adsorbed Pt—Ru catalyst and less phenyl group adsorbing ionomers can improve the peak power density of the alkaline membrane fuel cell ~5-times (FIG. 14). An example using poly(TMA)-phosphate ion pair membrane based fuel cells exhibited a similar performance improvement when the Pt catalyst was replaced with the Pt—Ru catalyst (FIG. 15). In contrast, the level of the $H_2/O_2$ peak power density achieved with the disclosed doped polymer electrolytes may reach 650 $mW/cm^2$ at 120° C. and 1,200 $mW/cm^2$ at 150° C. In some embodiments, a target peak power density of 300-600 $mW/cm^2$ under $H_2$/air conditions at 105 kPa backpressure without external humidification may be achieved using the disclosed doped polymer electrolytes.

Example 7

In this example, water-phosphate mixed phase proton conduction of diacid-doped polymer electrolytes were evaluated. The proton conductivity of a disulfate anion (DSA)-TMA cation-paired membrane was compared with a PA-PBI system and a Nafion® system at 80° C. as a function of RH (see FIG. 4). At 20% RH, the conductivity of PA-PBI is the higher ~70 mS/cm than that of the ion-pair system (15 mS/cm). Without being limited to a single theory of operation, it currently is believed that this results because the number of incorporated phosphoric acids in the PA-PBI membrane is ~2 times more than the number of incorporated phosphate acids. The Nafion® conductivity at 20% RH is <1 mS/cm. As the RH increases, the proton conductivity of the PA-PBI keeps decreasing because of PA leaching, while the conductivity of the DSA-TMA paired membrane keeps increasing as more water-mediated proton conduction occurs without losing disulfate phase. As a result, at 90% RH, the proton conductivity of the DSA-TMA paired membrane reached 80 mS/cm. FIG. 4 also shows the significant further water tolerance that can be achieved using embodiments of the disclosed polymer electrolyte.

Example 8

In embodiments using a fuel cell cathode, a phosphonated polymer can be used. FIG. 16 shows results obtained from analyzing fuel cell performance of MEAs using a phosphate-doped polymer electrolyte and a phosphonated ionomer, exhibiting the peak power density of over 1100 $mW/cm^2$ at 200° C.

In view of the many possible embodiments to which the principles of the present disclosure may be applied, it should be recognized that the illustrated embodiments are only preferred examples and should not be taken as limiting. Rather, the scope of the present disclosure is defined by the following claims. We therefore claim as our invention all that comes within the scope and spirit of these claims.

We claim:
1. A polymer electrolyte, comprising:
a cationic-functionalized polymer comprising a polymer and least one cationic functional group, wherein the polymer is selected from a polyaryl polymer, a polyarylamide, a polyimide, a polystyrene, a polysulfone, a polyether, a polyether sulfone, a polyketone, a polyetherketone, a polyarylether, a polyolefin, or a polynitrile, and wherein the at least one cationic functional group (CFG) is selected from ammonium [—$NH_3^+$,

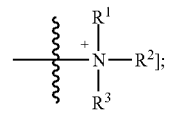

imidazolium

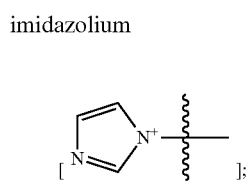

guanidinium

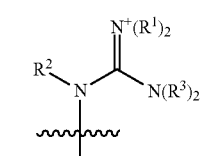

phosphazenium

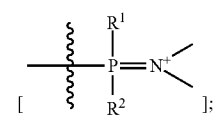

sulfonium [sulfonium

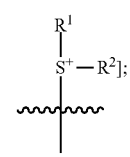

oxonium

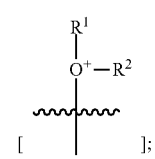

piperidinium

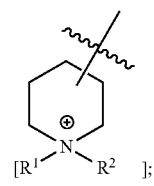

pyridinium

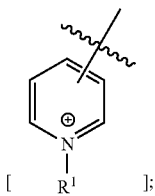

quinolinium

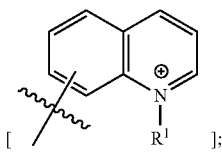

and phosphonium

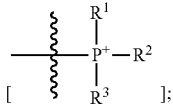

wherein $R^1$, $R^2$, and $R^3$ are independently hydrogen, aliphatic, aryl, or heteroaryl; and a polyacid dopant having a structure satisfying a formula $R-[PO(OH)_2]_n$ or $R-[S(O)_2OH]_n$ wherein R comprises an aliphatic or aromatic group and n is an integer selected from 2 to 4.

2. The polymer electrolyte of claim 1, wherein the cationic-functionalized polymer has a structure satisfying Formula I

[Polymer repeating unit]$_m$-[Optional Linker]$_s$-[Cationic Functional Group (CFG)]$_n$      Formula I where m is an integer ranging from two or more; s is an integer ranging from 0 up to m; and n of Formula I is an integer ranging from 1 to at least s.

3. The polymer electrolyte of claim 1, wherein the cationic-functionalized polymer has a structure satisfying Formula II or Formula III Formula II

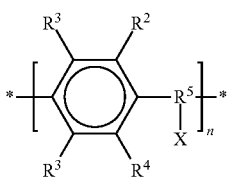

Formula III

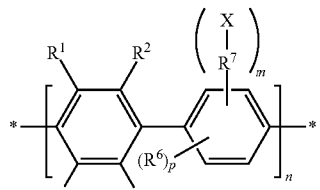

wherein each of $R^1$, $R^2$, $R^3$, $R^4$, and $R^6$ as recited in Formulas II and III independently is selected from hydrogen, fluoro, an aliphatic group, an aryl group, or a combination thereof; each $R^5$ independently is selected from an aliphatic group, an aryl group, or a combination thereof; each $R^7$ independently is selected from aliphatic, aryl, carbonyl, sulfonyl, or a combination thereof; each X independently is selected from ammonium, sulfonium, phosphonium, guanidinium, oxonium, imidazolium, quinolinium, piperidinium, pyridinium, phosphazinium, or combinations thereof; n of Formula II and/or Formula III ranges from 2 to 1000; m ranges from 1 to 4; and p ranges from 0 to 3.

4. The polymer electrolyte of claim 3, wherein the cationic-functionalized polymer is a polyphenylene having structure satisfying Formula IV or Formula IVC Formula IV

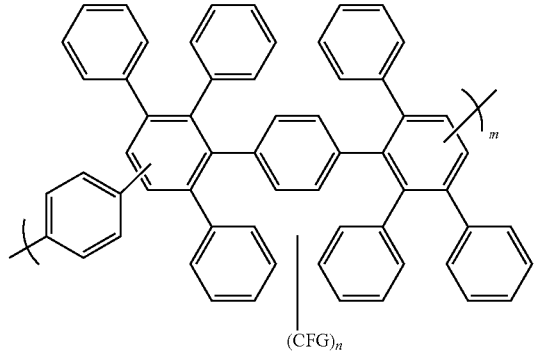

Formula IVC

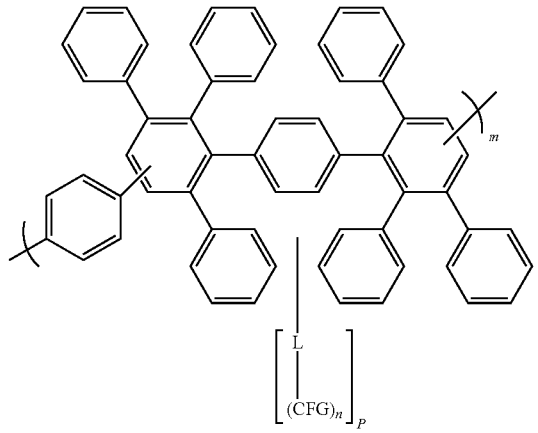

where m is 2 to 1000, n of Formula IV and/or Formula IVC is at least 1 up to the number of total positions available on each monomeric unit, CFG is the cationic functional group, which is coupled to the polyphenylene, and p is 1 to n as defined for Formula II and/or Formula III.

5. The polymer electrolyte of claim 3, wherein the cationic-functionalized polymer has a structure satisfying one or more of Formulas IVE-IVM
Formula IVE
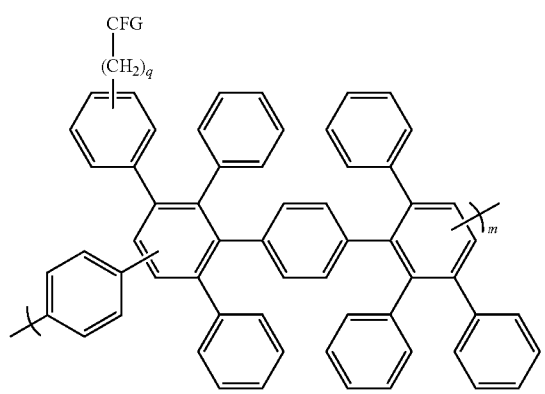
Formula IVF
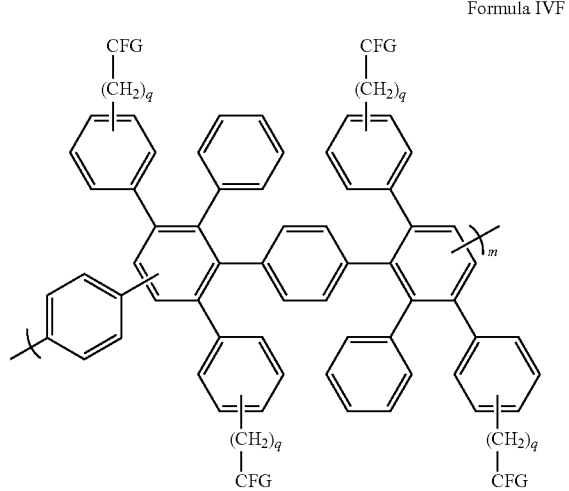
-continued
Formula IVH
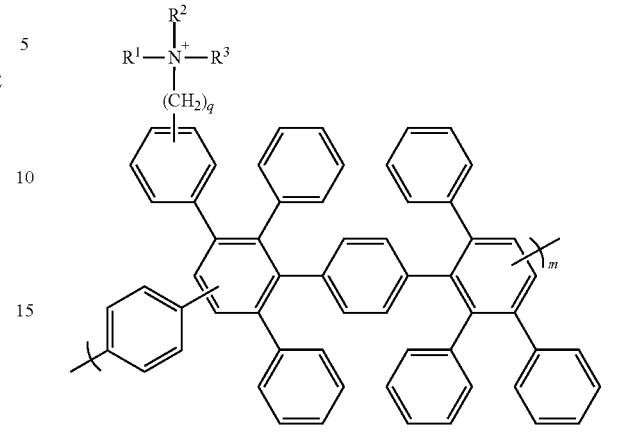
Formula IVI
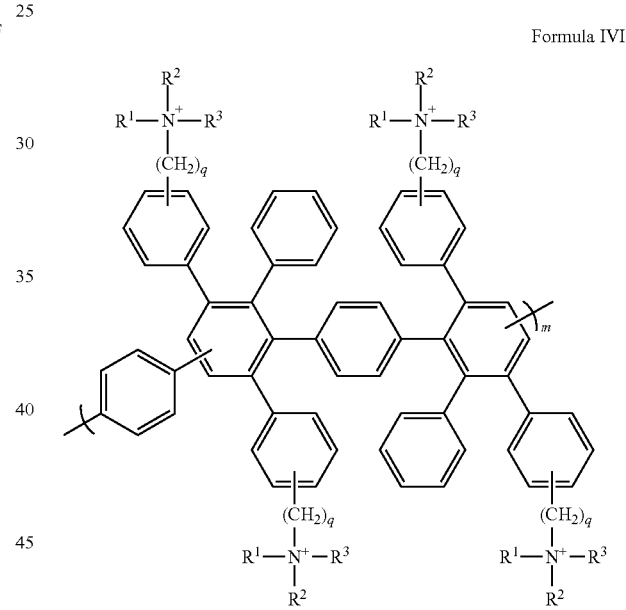
Formula IVG
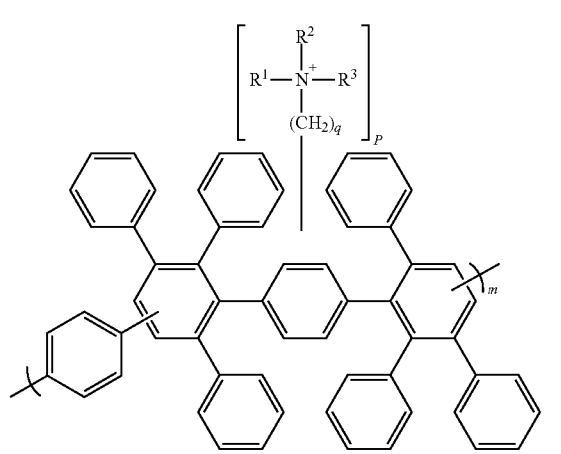
Formula IVJ
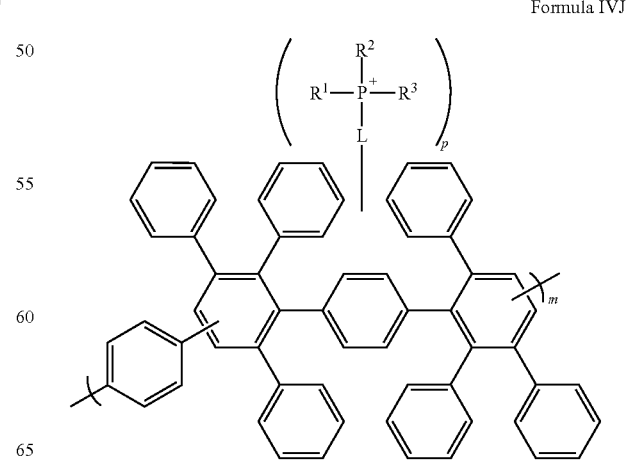

Formula IVK

Formula IVL

Formula IVM

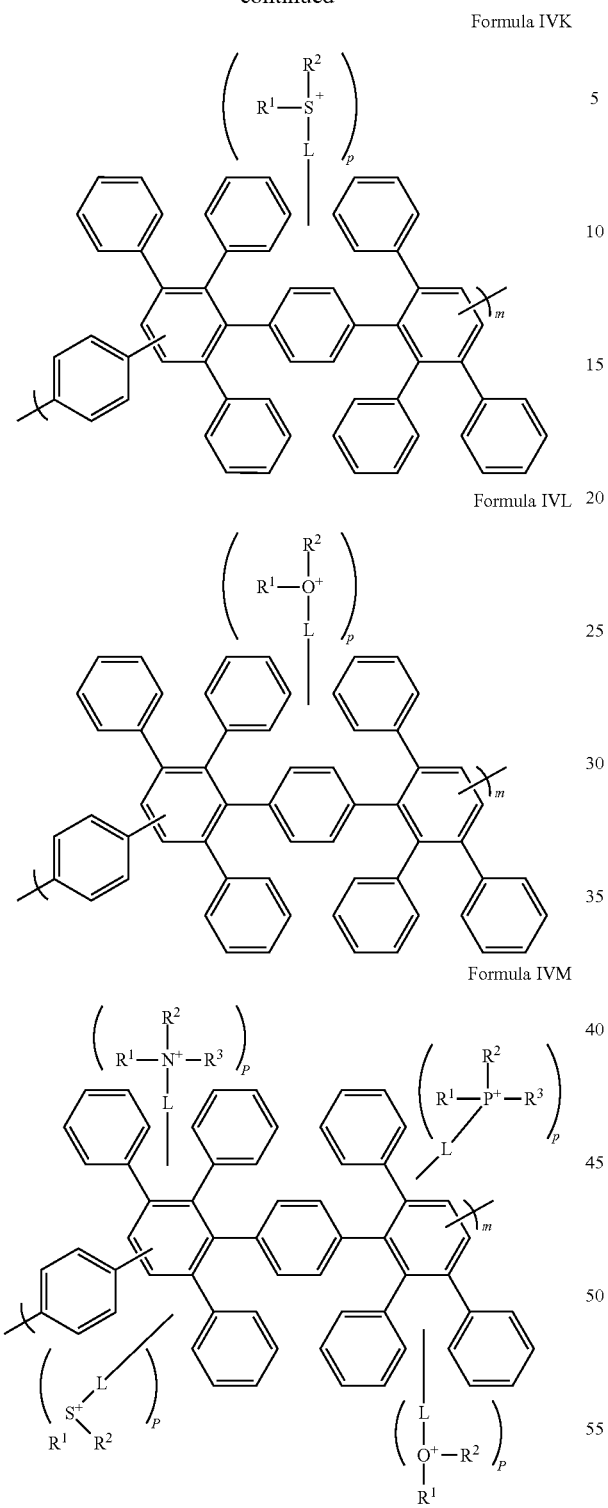

where q is from 1 to 10; p is 1 to n as defined for Formula II and/or Formula III; CFG is the cationic functional group; and $R^1$, $R^2$, and $R^3$ are independently hydrogen, $C_{1-10}$ alkyl, or benzyl.

6. The polymer electrolyte of claim 1, wherein the cationic-functionalized polymer has a structure satisfying any one or more of Formulas VA, VC, or VE Formula VA

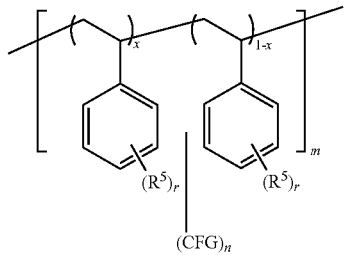

Formula VC

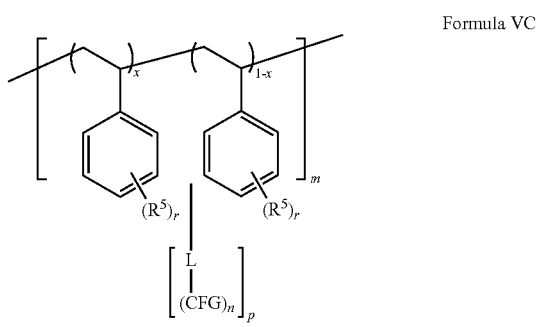

Formula VE

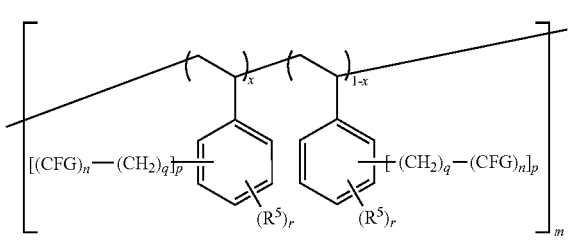

wherein:
  m is from two up to the number of monomeric subunits coupled to form a particular polymeric species;
  p is from 1 to the number of possible positions available on the monomeric unit;
  $R^5$ is a substituent selected from alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, nitrile, oxo, sulfonamide, sulfhydryl, or thioalkoxy;
  n of Formulas VA, VC, and/or VE is from 1 to at least m;
  r is 0 to 4; and
  x is from 0 to 0.99.

7. The polymer electrolyte according to claim 1, wherein the cationic-functionalized polymer is a polyether sulfone having a structure satisfying Formula VIIA

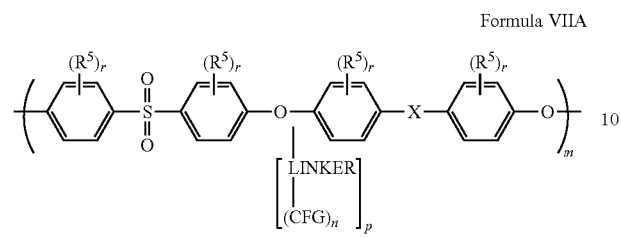

Formula VIIA wherein:
- $R^5$ is a substituent selected from alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, nitrile, oxo, sulfonamide, sulfhydryl, or, thioalkoxy;
- m is two or more up to the number of monomeric subunits coupled to form a particular polymeric species;
- n of Formula VIIA is from 1 to at least m;
- p is from 1 to 5;
- r is from 0 to 4; and
- X is not present, or X is selected from SO, $SO_2$, CO, O, S

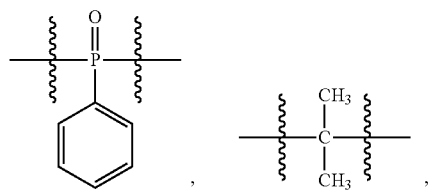

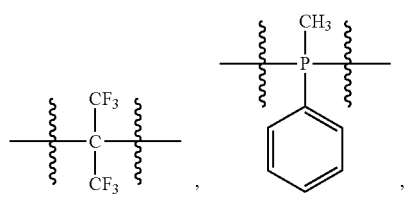

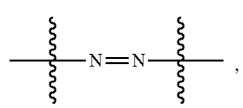

or combinations thereof.

8. The polymer electrolyte according to claim 1, wherein the cationic-functionalized polymer is a polyketone having a structure satisfying Formula VIIIB

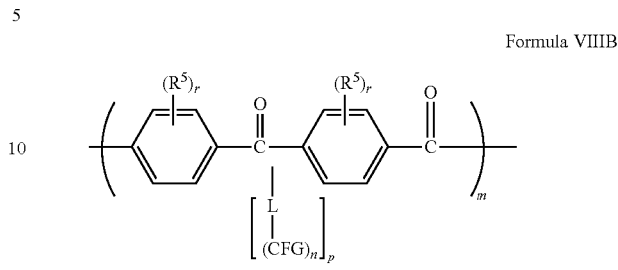

Formula VIIIB or a polyetherketone having a structure satisfying Formula VIIID

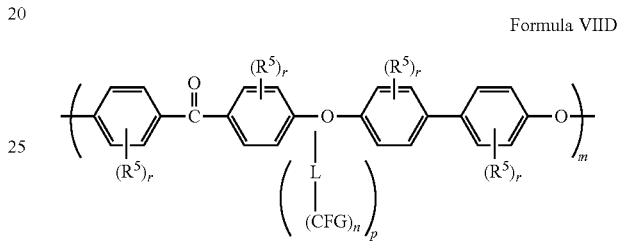

Formula VIIID wherein:
- L is a linker;
- $R^5$ is a substituent selected from alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, nitrile, oxo, sulfonamide, sulfhydryl, or thioalkoxy;
- m is two or more up to the number of monomeric subunits coupled to form a particular polymeric species;
- n of Formulas VIIIB and/or VIIID is from 1 to at least m;
- p is 1 to 5; and
- r is from 0 to 4.

9. The polymer electrolyte of claim 1, wherein the cationic-functionalized polymer comprises a halogenated polyarylether or a nitrile-containing polyaryl ether having a structure satisfying Formula XB

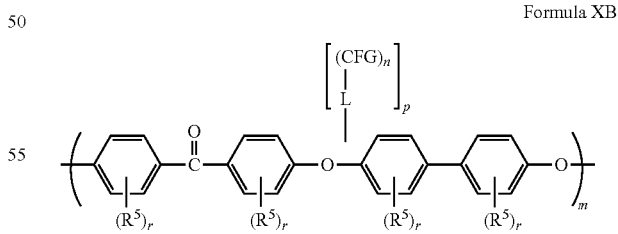

Formula XB wherein:
- L is a linker;
- $R^5$ is a halogen or nitrile;
- m is two or more up to the number of monomeric subunits coupled to form a particular polymeric species;
- n of Formula XB is from 1 to at least m;
- p is from 1 to 5; and
- r is from 0 to 4.

10. The polymer electrolyte according to claim 9, wherein the cationic-functionalized polymer has a structure satisfying a Formula IXC, XC, or XD Formula IXC

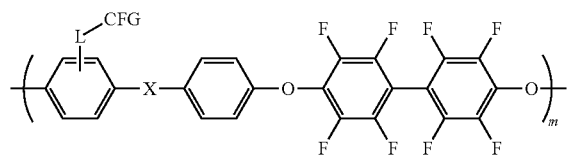

Formula XC

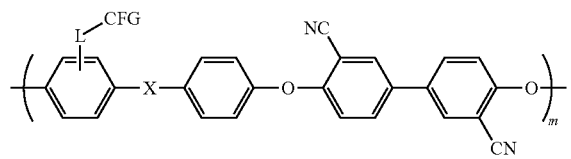

Formula XD

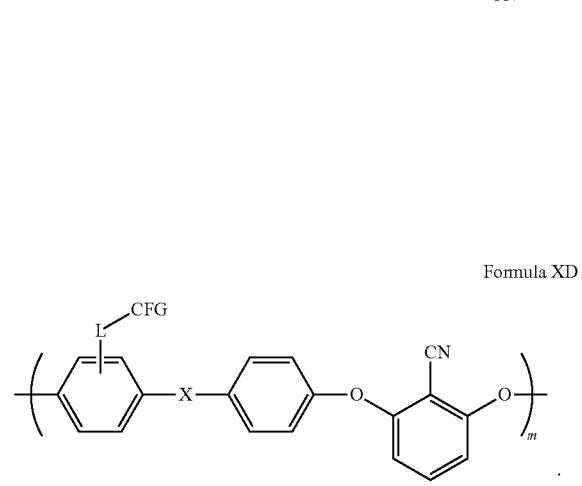

11. The polymer electrolyte according to claim 1, wherein the cationic-functionalized polymer has a structure satisfying a Formula XIA or XIB Formula XIA

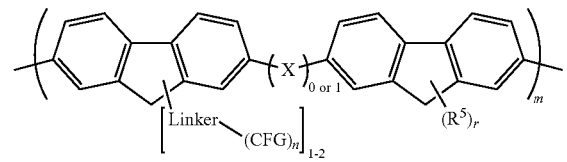

Formula XIB

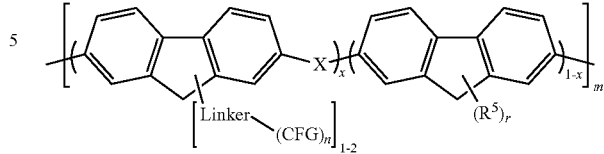

wherein:
R$^5$ is aliphatic;
m is two or more up to the number of monomeric subunits coupled to form a particular polymeric species;
n of Formulas XIA and/or XIB is from 1 to at least m;
x is 0 to 0.99; and
r is from 0 to 4.

12. The polymer electrolyte of claim 1, wherein the cationic-functionalized polymer is crosslinked.

13. The polymer electrolyte of claim 1, wherein the polyacid is a diacid having structure satisfying a Formula XII or XIII Formula XII

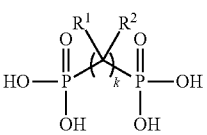

Formula XIII

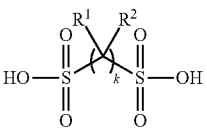

wherein R$^1$ and R$^2$ independently are H, F, OH, aliphatic, alkoxy, or aromatic; and k is an integer selected from 1 to 20.

14. The polymer electrolyte of claim 1, wherein the polyacid dopant is present in an amount such that a mole of acid per cationic functional group is 1 to 15.

15. The polymer electrolyte of claim 1, comprising
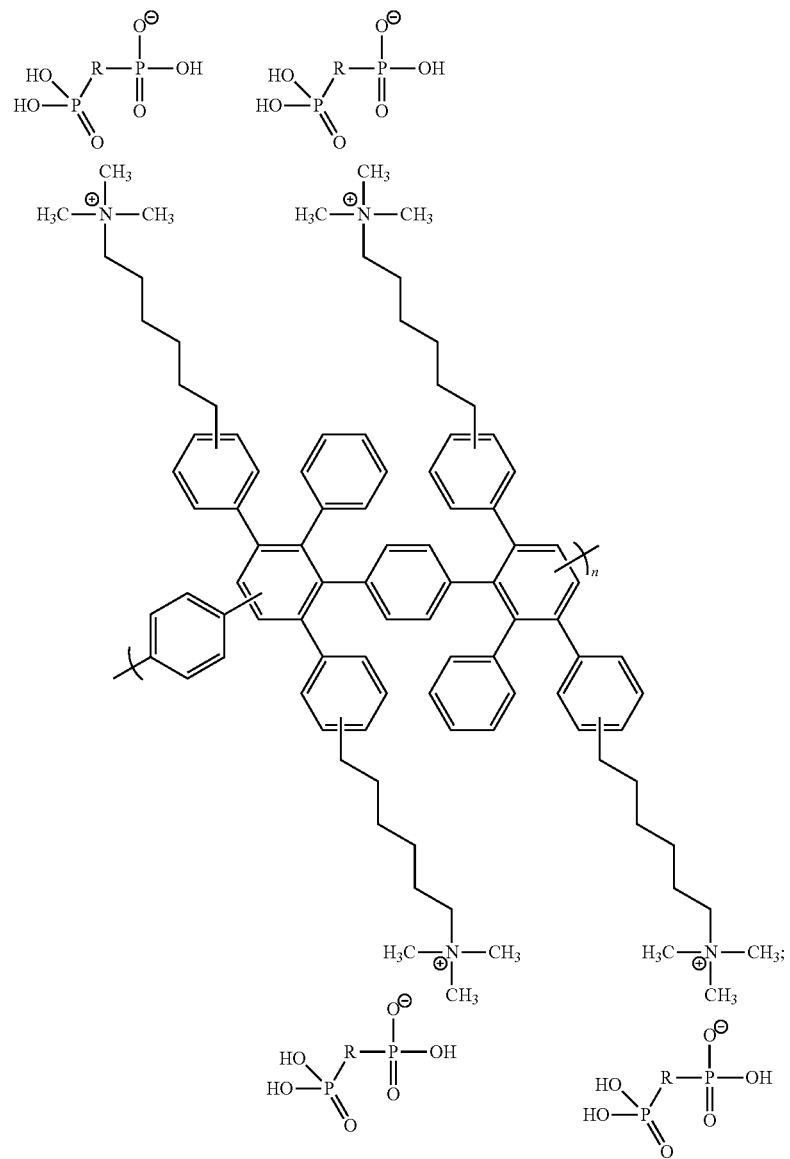

-continued
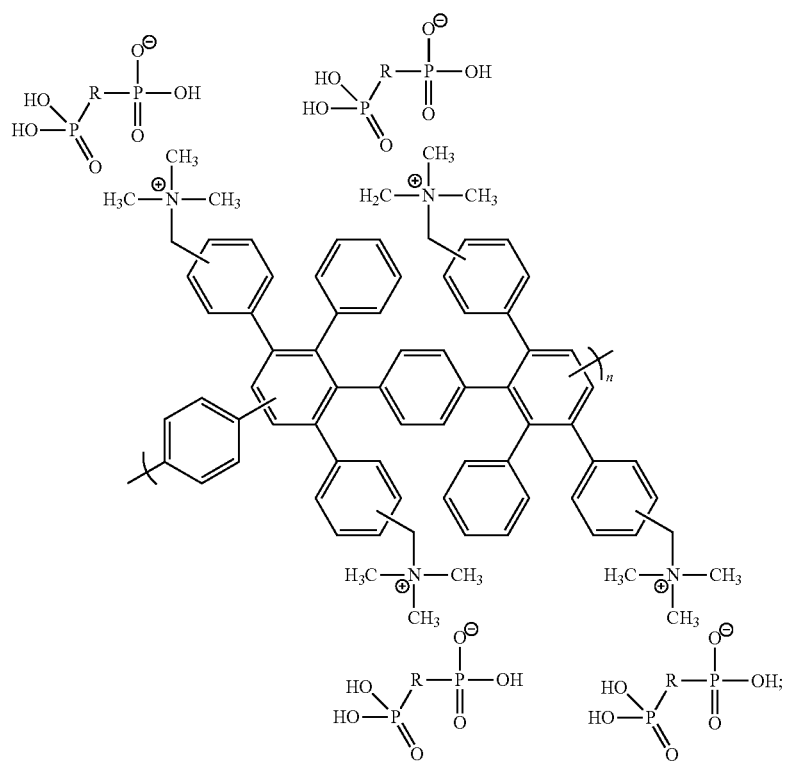

-continued
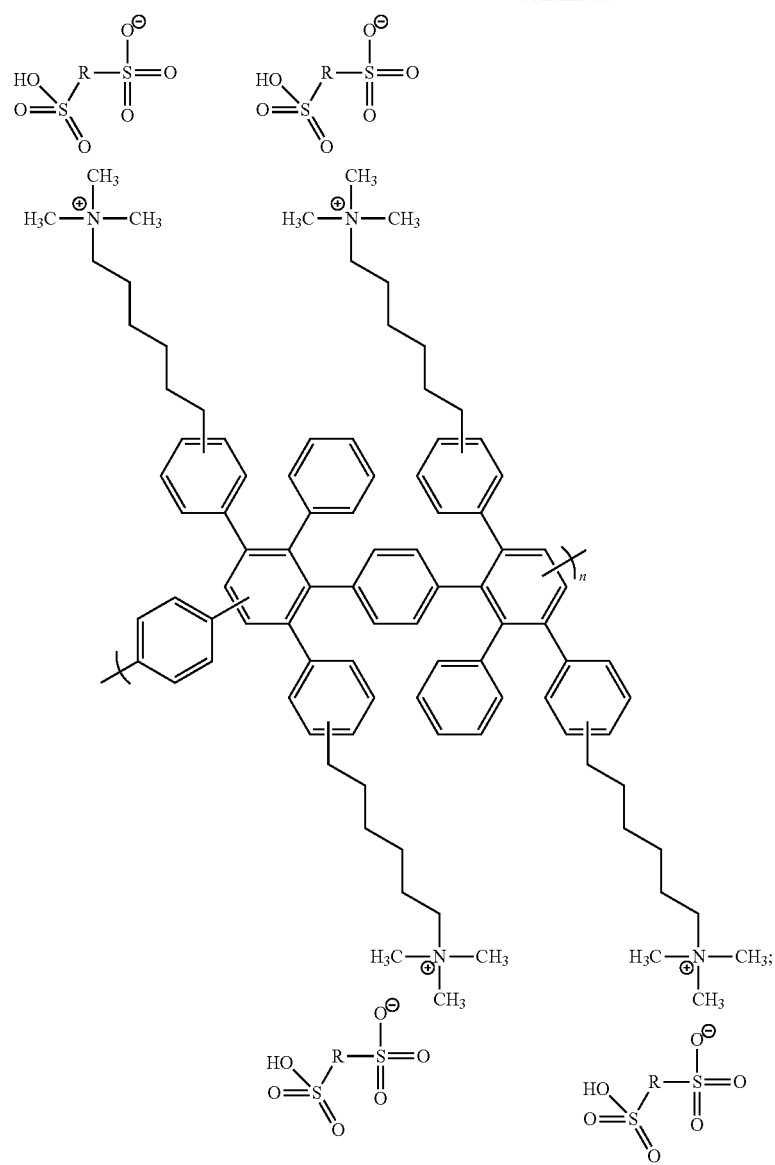

-continued
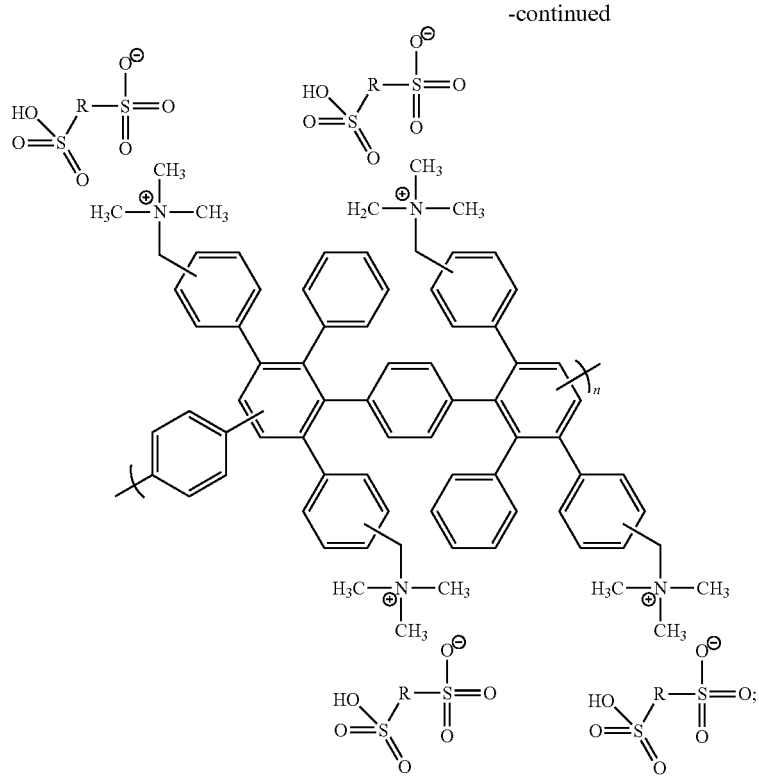
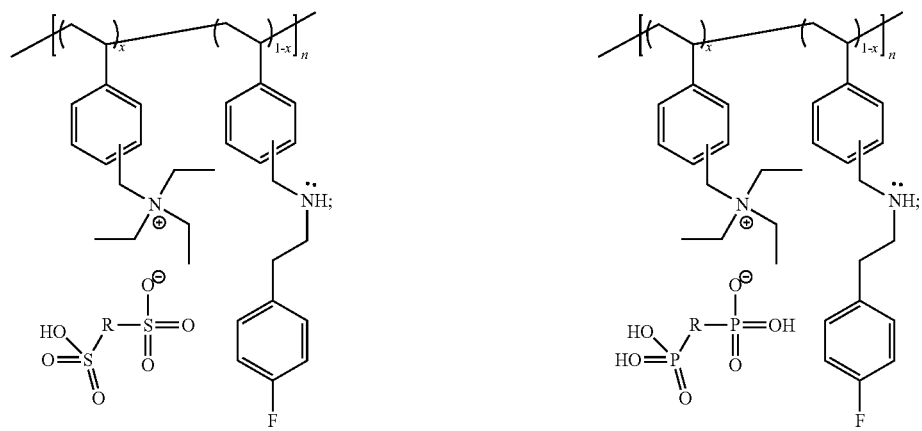
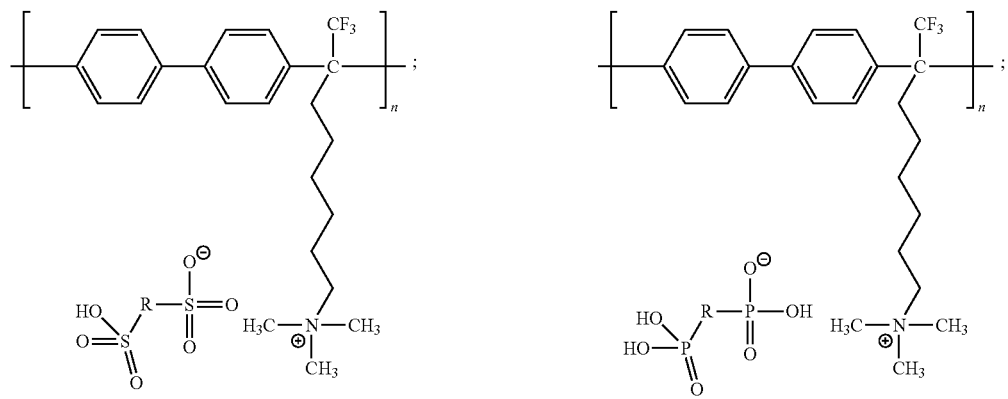

-continued
95
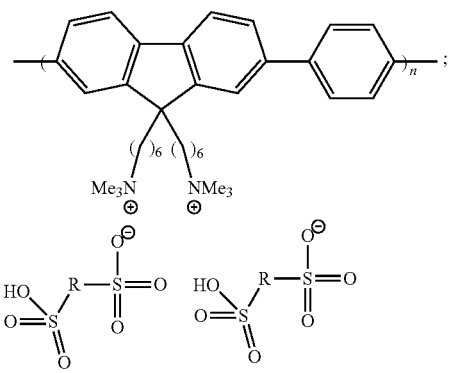
96
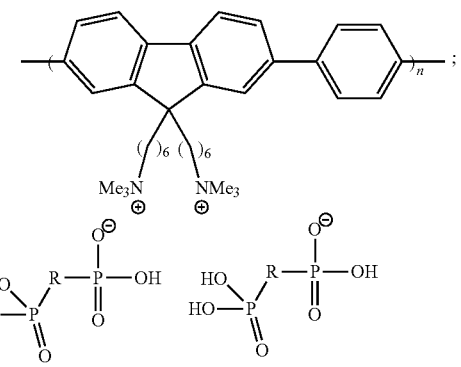
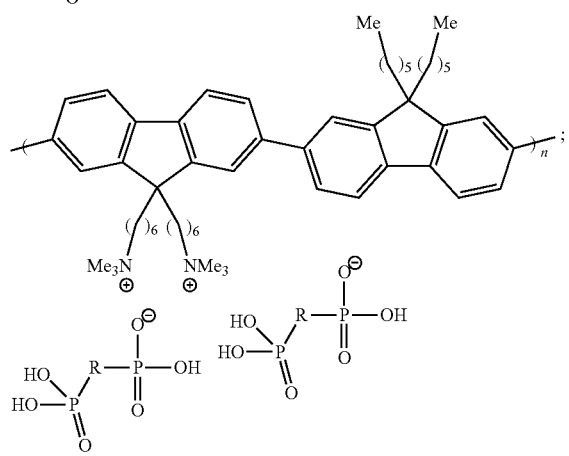
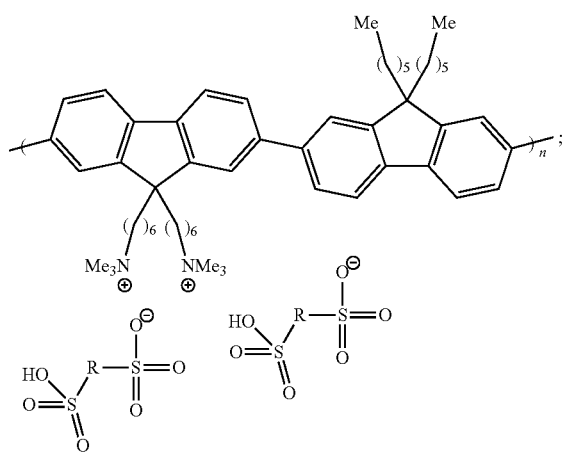
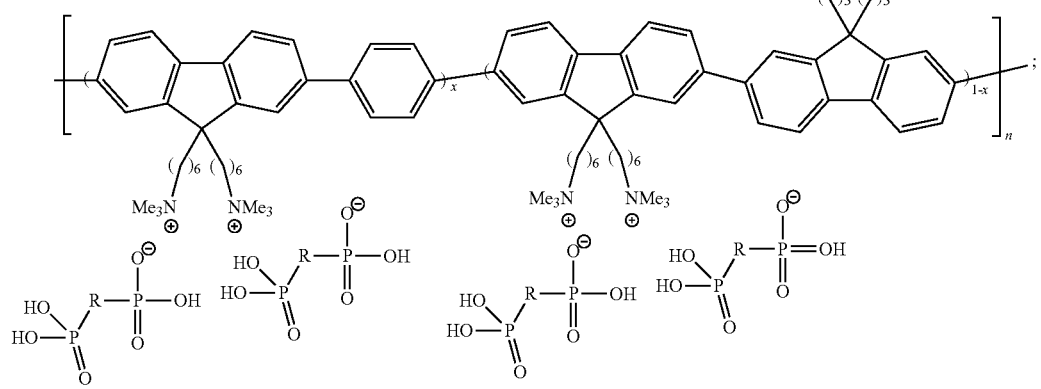
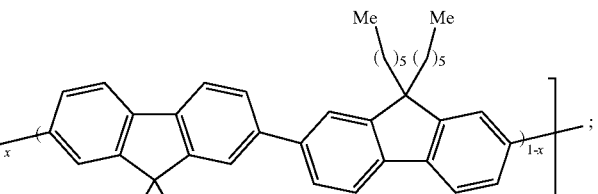
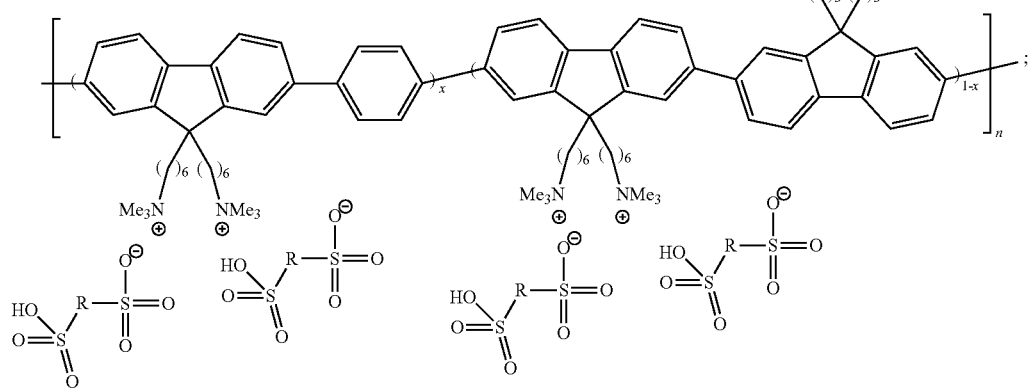

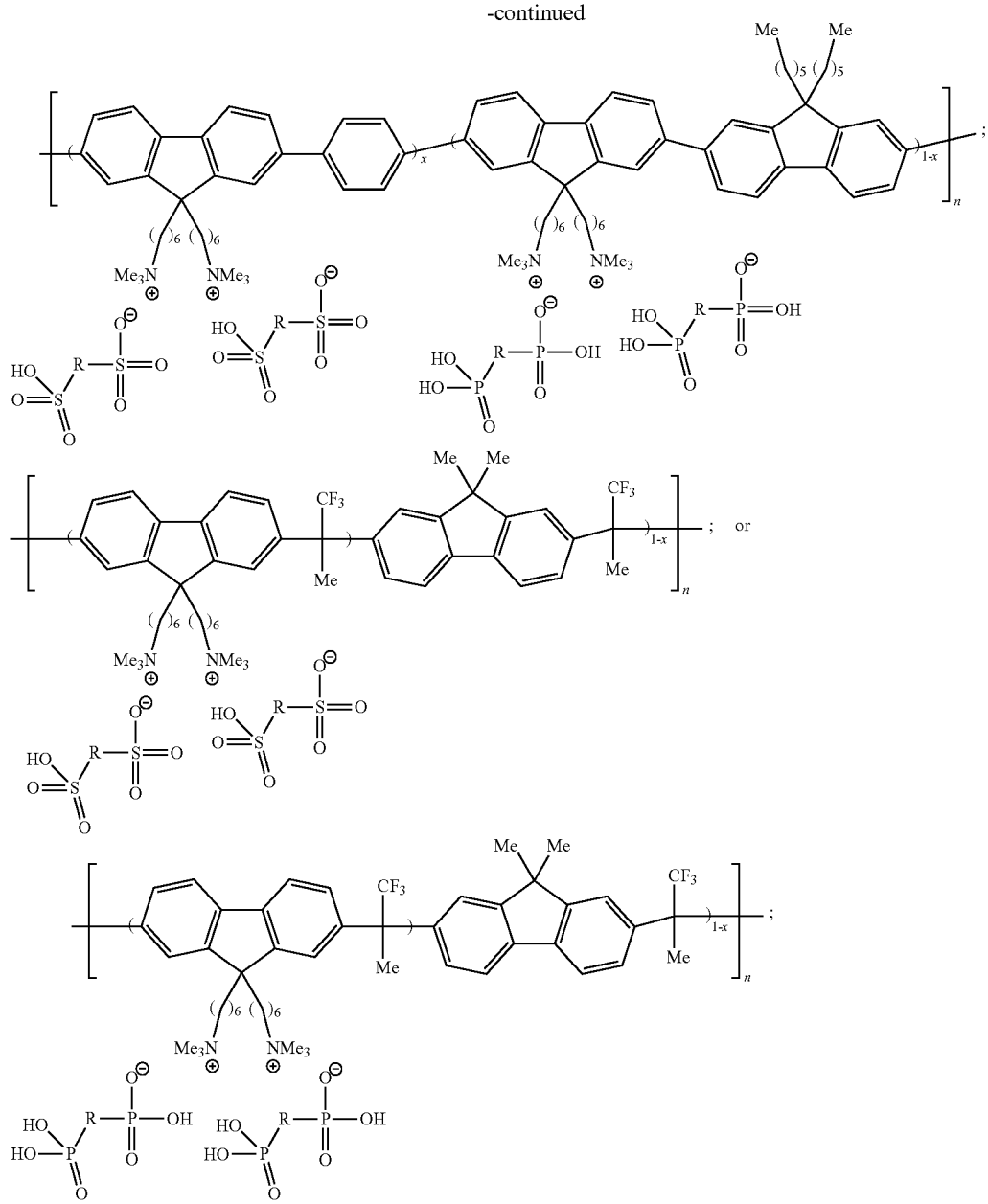

wherein each R independently is $CH_2$, $(CH_2)_3$, $CF_2$, $C(Me)(OH)$, or any combination thereof; n is an integer selected from one or higher; and x ranges from 0 to 0.99.

16. A fuel cell, comprising:
- an anode;
- a cathode; and
- a polymer electrolyte comprising a cationic-functionalized polymer comprising a polymer and least one cationic functional group, wherein the polymer is selected from a polyaryl polymer, a polyarylamide, a polyimide, a polystyrene, a polysulfone, a polyether, a polyether sulfone, a polyketone, a polyetherketone, a polyarylether, a polyolefin, or a polynitrile, and wherein the at least one cationic functional group (CFG) is selected from ammonium [—$NH_3^+$

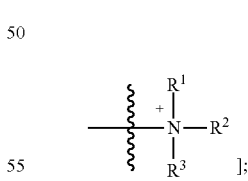

imidazolium

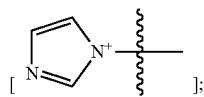

guanidinium

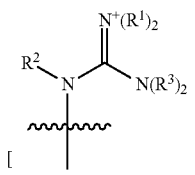

phosphazenium

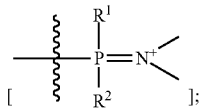

sulfonium [sulfonium

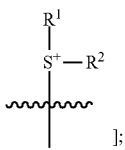

oxonium

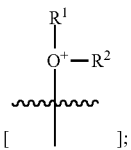

piperidinium

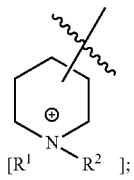

pyridinium

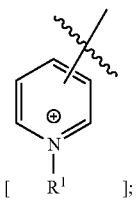

quinolinium

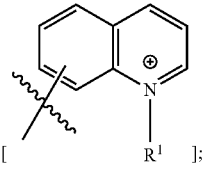

and phosphonium

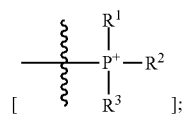

wherein $R^1$, $R^2$, and $R^3$ are independently hydrogen, aliphatic, aryl, or heteroaryl; and a polyacid dopant having a structure satisfying a formula $R-[PO(OH)_2]_n$ or $R-[S(O)_2OH]_n$ wherein R comprises an aliphatic group or an aromatic group and n is an integer selected from 2 to 4.

17. The fuel cell of claim 16, further comprising a phosphonated poly(pentafluorostyrene) polymer.

18. A polymer electrolyte, comprising:
a cationic-functionalized polymer comprising a polymer and least one cationic functional group, wherein the polymer is selected from a polyaryl polymer, a polyarylamide, a polyimide, a polystyrene, a polysulfone, a polyether, a polyether sulfone, a polyketone, a polyetherketone, a polyarylether, a polyolefin, or a polynitrile, and wherein the at least one cationic functional group (CFG) is selected from ammonium [—NH$_3^+$,

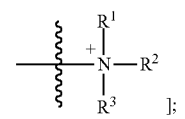

imidazolium

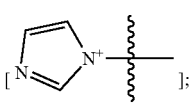

guanidinium

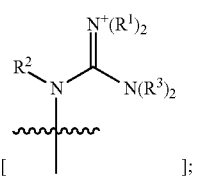

101 phosphazenium

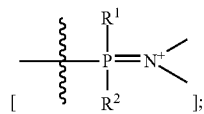

sulfonium [sulfonium

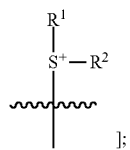

oxonium

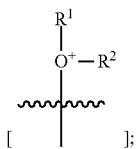

piperidinium

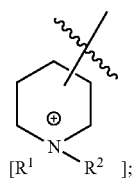

102 pyridinium

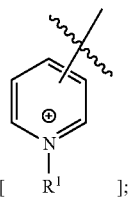

quinolinium

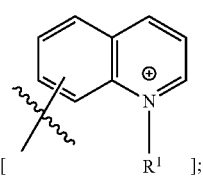

and phosphonium

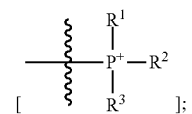

wherein $R^1$, $R^2$, and $R^3$ are independently hydrogen, aliphatic, aryl, or heteroaryl; and a polyacid dopant having a structure satisfying a formula R—[PO(OH)$_2$]$_n$ or R—[S(O)$_2$OH]$_n$ wherein R comprises an aliphatic or aromatic group and n is an integer selected from 2 to 4; and wherein the polymer electrolyte provides an ion conductivity of 10 mS/cm or greater at temperatures above 120° C.

* * * * *